United States Patent
Vangati et al.

(10) Patent No.: US 12,206,660 B2
(45) Date of Patent: *Jan. 21, 2025

(54) ACCESS AND MESSAGING IN A MULTI CLIENT NETWORK

(71) Applicant: View, Inc., Milpitas, CA (US)

(72) Inventors: Mahender Reddy Vangati, San Jose, CA (US); Darrel Q. Pham, San Jose, CA (US); Daniel Dah Tai, San Jose, CA (US); Michael Edgar Larson, Los Gatos, CA (US)

(73) Assignee: View, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,707

(22) Filed: Nov. 20, 2023

(65) Prior Publication Data

US 2024/0171566 A1 May 23, 2024

Related U.S. Application Data

(63) Continuation of application No. 17/909,925, filed as application No. PCT/US2021/023834 on Mar. 24, 2021, now Pat. No. 11,882,111.

(Continued)

(51) Int. Cl.
*H04L 9/40* (2022.01)
*H04L 51/214* (2022.01)
(Continued)

(52) U.S. Cl.
CPC ........ *H04L 63/0823* (2013.01); *H04L 51/214* (2022.05); *H04L 63/0428* (2013.01);
(Continued)

(58) Field of Classification Search
CPC ............... H04L 63/0823; H04L 51/214; H04L 63/0428
See application file for complete search history.

(56) References Cited

U.S. PATENT DOCUMENTS

| | | | |
|---|---|---|---|
| 4,129,861 | A | 12/1978 | Giglia |
| 4,553,085 | A | 11/1985 | Canzano |

(Continued)

FOREIGN PATENT DOCUMENTS

| | | | |
|---|---|---|---|
| CN | 1161092 A | 10/1997 | |
| CN | 1219251 A | 6/1999 | |

(Continued)

OTHER PUBLICATIONS

Aamidor, J., "Blockchain: coming to a smart building near you?", GreenTechMedia.com, Sep. 19, 2017, 5 pp. https://www.greentechmedia.com/articles/read/blockchain-coming-to-a-smart-building-near-you#gs.0jk23x retrieved Jan. 25, 2021.

(Continued)

*Primary Examiner* — Chau Le
(74) *Attorney, Agent, or Firm* — Weaver Austin Villeneuve & Sampson LLP; Brian D. Griedel

(57) ABSTRACT

A messaging system for exchanging messages between nodes in a network via a broker that uses a publish-subscribe message protocol, which nodes have object identifications (IDs). Messages between the nodes are routed using the object IDs of the nodes. Secure communication is provided using authentication according to digital certificates being used as first and second tiers by a commissioning broker and a data broker, respectively, in which the second tier certificate used by the data broker has a shorter lived expiration time.

14 Claims, 20 Drawing Sheets

Related U.S. Application Data

(60) Provisional application No. 63/121,561, filed on Dec. 4, 2020, provisional application No. 63/000,342, filed on Mar. 26, 2020.

(51) Int. Cl.
*H04L 67/10* (2022.01)
*H04L 67/55* (2022.01)

(52) U.S. Cl.
CPC .......... *H04L 63/101* (2013.01); *H04L 63/108* (2013.01); *H04L 67/10* (2013.01); *H04L 67/55* (2022.05)

(56) References Cited

U.S. PATENT DOCUMENTS

| | | |
|---|---|---|
| 5,384,653 A | 1/1995 | Benson et al. |
| 5,416,617 A | 5/1995 | Loiseaux et al. |
| 5,440,317 A | 8/1995 | Jalloul et al. |
| 5,477,152 A | 12/1995 | Hayhurst |
| 5,579,149 A | 11/1996 | Moret et al. |
| 5,867,495 A | 2/1999 | Elliott et al. |
| 6,032,020 A | 2/2000 | Cook et al. |
| 6,039,390 A | 3/2000 | Agrawal et al. |
| 6,055,089 A | 4/2000 | Schulz et al. |
| 6,066,801 A | 5/2000 | Kodaira et al. |
| 6,262,831 B1 | 7/2001 | Bauer et al. |
| 6,344,748 B1 | 2/2002 | Gannon |
| 6,407,847 B1 | 6/2002 | Poll et al. |
| 6,567,708 B1 | 5/2003 | Bechtel et al. |
| 6,707,590 B1 | 3/2004 | Bartsch |
| 6,897,936 B1 | 5/2005 | Li et al. |
| 6,965,813 B2 | 11/2005 | Granqvist et al. |
| 7,133,181 B2 | 11/2006 | Greer |
| 7,391,420 B1 | 6/2008 | Coyne |
| 7,536,370 B2 | 5/2009 | Masurkar |
| 7,610,910 B2 | 11/2009 | Ahmed |
| 7,684,105 B2 | 3/2010 | Lamontagne et al. |
| 7,739,138 B2 | 6/2010 | Chauhan et al. |
| 7,797,367 B1 | 9/2010 | Gelvin et al. |
| 7,800,812 B2 | 9/2010 | Moskowitz |
| 7,941,245 B1 | 5/2011 | Popat |
| 7,966,078 B2 | 6/2011 | Hoffberg et al. |
| 8,024,073 B2 | 9/2011 | Imes et al. |
| 8,143,832 B2 | 3/2012 | Holzmann et al. |
| 8,149,756 B2 | 4/2012 | Hottinen |
| 8,213,074 B1 | 7/2012 | Shrivastava et al. |
| 8,214,494 B1 | 7/2012 | Slavin |
| 8,254,013 B2 | 8/2012 | Mehtani et al. |
| 8,290,627 B2 | 10/2012 | Richards et al. |
| 8,509,400 B2 | 8/2013 | Liu et al. |
| 8,705,162 B2 | 4/2014 | Brown et al. |
| 8,724,202 B2 | 5/2014 | Floyd et al. |
| 8,764,950 B2 | 7/2014 | Wang et al. |
| 8,843,238 B2 | 9/2014 | Wenzel et al. |
| 8,963,378 B1 | 2/2015 | Fornage et al. |
| 8,976,440 B2 | 3/2015 | Berland et al. |
| 9,081,246 B2 | 7/2015 | Rozbicki |
| 9,128,346 B2 | 9/2015 | Shrivastava et al. |
| 9,170,008 B2 | 10/2015 | Reul et al. |
| 9,225,286 B1 | 12/2015 | Tweedie |
| 9,300,581 B1 | 3/2016 | Hui et al. |
| 9,348,192 B2 | 5/2016 | Brown et al. |
| 9,442,338 B2 | 9/2016 | Uhm et al. |
| 9,442,341 B2 | 9/2016 | Shrivastava et al. |
| 9,454,055 B2 | 9/2016 | Brown et al. |
| 9,470,947 B2 | 10/2016 | Nagel et al. |
| 9,494,055 B2 | 11/2016 | Rusche |
| 9,546,515 B2 | 1/2017 | Hall et al. |
| 9,551,913 B2 | 1/2017 | Kim et al. |
| 9,677,327 B1 | 6/2017 | Nagel et al. |
| 9,690,174 B2 | 6/2017 | Wang |
| 9,709,869 B2 | 7/2017 | Baumann et al. |
| 9,740,074 B2 | 8/2017 | Agrawal et al. |
| 9,778,533 B2 | 10/2017 | Bertolini |
| 9,898,912 B1 | 2/2018 | Jordan, II et al. |
| 9,906,956 B1 | 2/2018 | Huang |
| 9,946,138 B2 | 4/2018 | Shrivastava et al. |
| 9,948,387 B2 | 4/2018 | Frankel et al. |
| 10,001,691 B2 | 6/2018 | Shrivastava et al. |
| 10,031,356 B2 | 7/2018 | Van Oosten et al. |
| 10,110,631 B2 | 10/2018 | Bauer et al. |
| 10,137,764 B2 | 11/2018 | Driscoll et al. |
| 10,253,558 B2 | 4/2019 | Vigano et al. |
| 10,268,098 B2 | 4/2019 | Shrivastava et al. |
| 10,286,839 B1 | 5/2019 | Mazuir et al. |
| 10,288,971 B2 | 5/2019 | Phillips et al. |
| 10,303,035 B2 | 5/2019 | Brown et al. |
| 10,329,839 B2 | 6/2019 | Fasi et al. |
| 10,365,531 B2 | 7/2019 | Shrivastava et al. |
| 10,387,221 B2 | 8/2019 | Shrivastava et al. |
| 10,409,652 B2 | 9/2019 | Shrivastava et al. |
| 10,481,459 B2 | 11/2019 | Shrivastava et al. |
| 10,488,837 B2 | 11/2019 | Cirino |
| 10,505,751 B2 | 12/2019 | Casilli |
| 10,514,963 B2 | 12/2019 | Shrivastava et al. |
| 10,532,268 B2 | 1/2020 | Tran et al. |
| 10,704,322 B2 | 7/2020 | Vigano et al. |
| 10,720,766 B2 | 7/2020 | Krammer et al. |
| 10,746,761 B2 | 8/2020 | Rayman et al. |
| 10,747,082 B2 | 8/2020 | Shrivastava et al. |
| 10,768,582 B2 | 9/2020 | Shrivastava et al. |
| 10,859,983 B2 | 12/2020 | Shrivastava et al. |
| 10,917,259 B1 | 2/2021 | Chein et al. |
| 10,921,675 B2 | 2/2021 | Barnum et al. |
| 10,935,864 B2 | 3/2021 | Shrivastava et al. |
| 10,949,267 B2 | 3/2021 | Shrivastava et al. |
| 10,954,677 B1 | 3/2021 | Scanlin |
| 10,956,231 B2 | 3/2021 | Shrivastava et al. |
| 10,989,976 B2 | 4/2021 | Shrivastava et al. |
| 10,989,977 B2 | 4/2021 | Shrivastava et al. |
| 11,016,357 B2 | 5/2021 | Brown et al. |
| 11,054,792 B2 | 7/2021 | Shrivastava et al. |
| 11,073,800 B2 | 7/2021 | Shrivastava et al. |
| 11,137,659 B2 | 10/2021 | Shrivastava et al. |
| 11,150,616 B2 | 10/2021 | Shrivastava et al. |
| 11,168,910 B2 | 11/2021 | Alcala Perez |
| 11,182,970 B1 | 11/2021 | Kathol |
| 11,255,120 B2 | 2/2022 | Shrivastava et al. |
| 11,294,254 B2 | 4/2022 | Patterson et al. |
| 11,384,596 B2 | 7/2022 | Shrivastava et al. |
| 11,405,465 B2 | 8/2022 | Shrivastava et al. |
| 11,436,061 B2 | 9/2022 | Shrivastava et al. |
| 11,566,468 B2 | 1/2023 | Vigano et al. |
| 11,579,571 B2 | 2/2023 | Shrivastava et al. |
| 11,668,992 B2 | 6/2023 | Shrivastava et al. |
| 11,681,197 B2 | 6/2023 | Shrivastava et al. |
| 11,687,045 B2 | 6/2023 | Shrivastava et al. |
| 11,733,660 B2 | 8/2023 | Shrivastava et al. |
| 11,740,948 B2 | 8/2023 | Shrivastava et al. |
| 11,750,594 B2 | 9/2023 | Vangati et al. |
| 11,754,902 B2 | 9/2023 | Brown et al. |
| 11,822,159 B2 | 11/2023 | Brown et al. |
| 11,868,103 B2 | 1/2024 | Shrivastava et al. |
| 11,882,111 B2 | 1/2024 | Vangati et al. |
| 11,892,737 B2 | 2/2024 | Shrivastava et al. |
| 11,927,866 B2 | 3/2024 | Brown et al. |
| 11,948,015 B2 | 4/2024 | Shrivastava et al. |
| 12,078,906 B2 | 9/2024 | Shrivastava et al. |
| 12,087,997 B2 | 9/2024 | Brown et al. |
| 12,105,394 B2 | 10/2024 | Shrivastava et al. |
| 2001/0005083 A1 | 6/2001 | Serizawa et al. |
| 2002/0024424 A1 | 2/2002 | Burns et al. |
| 2002/0027504 A1 | 3/2002 | Davis et al. |
| 2002/0072868 A1 | 6/2002 | Bartone et al. |
| 2002/0113168 A1 | 8/2002 | Rukavina et al. |
| 2002/0149829 A1 | 10/2002 | Mochizuka et al. |
| 2002/0152298 A1 | 10/2002 | Kikta et al. |
| 2003/0007462 A1 | 1/2003 | Makinen et al. |
| 2003/0101154 A1 | 5/2003 | Hisano et al. |
| 2003/0169574 A1 | 9/2003 | Maruyama et al. |
| 2003/0191546 A1 | 10/2003 | Bechtel et al. |
| 2003/0210450 A1 | 11/2003 | Yu et al. |
| 2003/0227663 A1 | 12/2003 | Agrawal et al. |

(56) References Cited

U.S. PATENT DOCUMENTS

| | | |
|---|---|---|
| 2004/0001056 A1 | 1/2004 | Atherton et al. |
| 2004/0054789 A1 | 3/2004 | Breh et al. |
| 2004/0215520 A1 | 10/2004 | Butler et al. |
| 2004/0236620 A1 | 11/2004 | Chauhan et al. |
| 2005/0032531 A1 | 2/2005 | Gong et al. |
| 2005/0063036 A1 | 3/2005 | Bechtel et al. |
| 2005/0157675 A1 | 7/2005 | Feder et al. |
| 2005/0193160 A1 | 9/2005 | Bhatt et al. |
| 2005/0200937 A1 | 9/2005 | Weidner |
| 2005/0254442 A1 | 11/2005 | Proctor et al. |
| 2005/0270620 A1 | 12/2005 | Bauer et al. |
| 2005/0270621 A1 | 12/2005 | Bauer et al. |
| 2006/0001683 A1 | 1/2006 | May et al. |
| 2006/0018000 A1 | 1/2006 | Greer |
| 2006/0077511 A1 | 4/2006 | Poll et al. |
| 2006/0107616 A1 | 5/2006 | Ratti et al. |
| 2006/0145833 A1 | 7/2006 | Brandt et al. |
| 2006/0174333 A1 | 8/2006 | Thomas et al. |
| 2006/0279527 A1 | 12/2006 | Zehner et al. |
| 2007/0008603 A1 | 1/2007 | Sotzing et al. |
| 2007/0053053 A1 | 3/2007 | Moskowitz |
| 2007/0067048 A1 | 3/2007 | Bechtel et al. |
| 2007/0097484 A1 | 5/2007 | Libretto et al. |
| 2007/0109989 A1 | 5/2007 | Nakagawa et al. |
| 2007/0115979 A1 | 5/2007 | Balay et al. |
| 2007/0118831 A1 | 5/2007 | Kondo |
| 2007/0128899 A1 | 6/2007 | Mayer |
| 2007/0285759 A1 | 12/2007 | Ash et al. |
| 2008/0018979 A1 | 1/2008 | Mahe et al. |
| 2008/0042012 A1 | 2/2008 | Callahan et al. |
| 2008/0043316 A2 | 2/2008 | Moskowitz |
| 2008/0048101 A1 | 2/2008 | Romig et al. |
| 2008/0147847 A1 | 6/2008 | Pitkow et al. |
| 2008/0172312 A1 | 7/2008 | Synesiou et al. |
| 2008/0184350 A1 | 7/2008 | Chu |
| 2008/0186562 A2 | 8/2008 | Moskowitz |
| 2008/0211682 A1 | 9/2008 | Hyland et al. |
| 2008/0238706 A1 | 10/2008 | Kenwright |
| 2009/0015740 A1 | 1/2009 | Sagitov et al. |
| 2009/0163170 A1 | 6/2009 | Norp et al. |
| 2009/0168185 A1 | 7/2009 | Augustine |
| 2009/0257576 A1 | 10/2009 | Wellard et al. |
| 2009/0271042 A1 | 10/2009 | Voysey |
| 2009/0319807 A1 | 12/2009 | Chasen et al. |
| 2009/0323160 A1 | 12/2009 | Egerton et al. |
| 2010/0039410 A1 | 2/2010 | Becker et al. |
| 2010/0052844 A1 | 3/2010 | Wesby |
| 2010/0066484 A1 | 3/2010 | Hanwright et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0218010 A1 | 8/2010 | Musti et al. |
| 2010/0228854 A1 | 9/2010 | Morrison et al. |
| 2010/0243427 A1 | 9/2010 | Kozlowski et al. |
| 2010/0245973 A1 | 9/2010 | Wang et al. |
| 2010/0274366 A1 | 10/2010 | Fata et al. |
| 2010/0286839 A1 | 11/2010 | Iaquinangelo et al. |
| 2010/0286937 A1 | 11/2010 | Hedley et al. |
| 2010/0315693 A1 | 12/2010 | Lam et al. |
| 2011/0050756 A1 | 3/2011 | Cassidy et al. |
| 2011/0071685 A1 | 3/2011 | Huneycutt et al. |
| 2011/0083152 A1 | 4/2011 | Centore, III et al. |
| 2011/0097081 A1 | 4/2011 | Gupta et al. |
| 2011/0124313 A1 | 5/2011 | Jones |
| 2011/0148218 A1 | 6/2011 | Rozbicki |
| 2011/0154022 A1 | 6/2011 | Cheng et al. |
| 2011/0164317 A1 | 7/2011 | Vergohl et al. |
| 2011/0184561 A1 | 7/2011 | Klasson et al. |
| 2011/0223886 A1 | 9/2011 | Nasielski et al. |
| 2011/0261429 A1 | 10/2011 | Sbar et al. |
| 2011/0307112 A1 | 12/2011 | Barrilleaux |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0086363 A1 | 4/2012 | Golding et al. |
| 2012/0089488 A1 | 4/2012 | Letchford |
| 2012/0133315 A1 | 5/2012 | Berman et al. |
| 2012/0139801 A1 | 6/2012 | Oshima et al. |
| 2012/0140492 A1 | 6/2012 | Alvarez |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0215874 A1 | 8/2012 | Sequeira et al. |
| 2012/0229275 A1 | 9/2012 | Mattern |
| 2012/0232969 A1 | 9/2012 | Fadell et al. |
| 2012/0235493 A1 | 9/2012 | Kiuchi et al. |
| 2012/0239209 A1 | 9/2012 | Brown et al. |
| 2012/0259583 A1 | 10/2012 | Noboa et al. |
| 2012/0268369 A1 | 10/2012 | Kikkeri |
| 2012/0293855 A1 | 11/2012 | Shrivastava et al. |
| 2013/0013921 A1 | 1/2013 | Bhathena et al. |
| 2013/0024029 A1 | 1/2013 | Tran et al. |
| 2013/0054033 A1 | 2/2013 | Casilli |
| 2013/0060357 A1 | 3/2013 | Li et al. |
| 2013/0073681 A1 | 3/2013 | Jiang et al. |
| 2013/0085614 A1 | 4/2013 | Wenzel et al. |
| 2013/0085615 A1 | 4/2013 | Barker |
| 2013/0085616 A1 | 4/2013 | Wenzel |
| 2013/0088331 A1 | 4/2013 | Cho et al. |
| 2013/0131869 A1 | 5/2013 | Majewski et al. |
| 2013/0157493 A1 | 6/2013 | Brown |
| 2013/0158790 A1 | 6/2013 | McIntyre, Jr. et al. |
| 2013/0182308 A1 | 7/2013 | Guarr et al. |
| 2013/0196600 A1 | 8/2013 | Capers et al. |
| 2013/0241299 A1 | 9/2013 | Snyker et al. |
| 2013/0243425 A1 | 9/2013 | Franklin |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0278989 A1 | 10/2013 | Lam et al. |
| 2013/0306615 A1 | 11/2013 | Rozbicki et al. |
| 2014/0001977 A1 | 1/2014 | Zacharchuk et al. |
| 2014/0101573 A1 | 4/2014 | Kuo |
| 2014/0108647 A1 | 4/2014 | Bleess et al. |
| 2014/0156097 A1 | 6/2014 | Nesler et al. |
| 2014/0160550 A1 | 6/2014 | Brown et al. |
| 2014/0167927 A1 | 6/2014 | Rush |
| 2014/0170863 A1 | 6/2014 | Brown |
| 2014/0171016 A1 | 6/2014 | Sennett et al. |
| 2014/0172557 A1 | 6/2014 | Eden et al. |
| 2014/0177028 A1 | 6/2014 | Shrivastava et al. |
| 2014/0182350 A1 | 7/2014 | Bhavaraju et al. |
| 2014/0236323 A1 | 8/2014 | Brown et al. |
| 2014/0243033 A1 | 8/2014 | Wala et al. |
| 2014/0249876 A1 | 9/2014 | Wu et al. |
| 2014/0273911 A1 | 9/2014 | Dunn et al. |
| 2014/0274458 A1 | 9/2014 | Kronenberg et al. |
| 2014/0300945 A1 | 10/2014 | Parker |
| 2014/0303788 A1 | 10/2014 | Sanders et al. |
| 2014/0317514 A1 | 10/2014 | Bokotey |
| 2014/0330538 A1 | 11/2014 | Conklin et al. |
| 2014/0347190 A1 | 11/2014 | Grimm |
| 2014/0349497 A1 | 11/2014 | Brown et al. |
| 2014/0367057 A1 | 12/2014 | Feldstein |
| 2014/0368899 A1 | 12/2014 | Greer |
| 2014/0371931 A1 | 12/2014 | Lin et al. |
| 2015/0002919 A1 | 1/2015 | Jack et al. |
| 2015/0003822 A1 | 1/2015 | Fukada et al. |
| 2015/0023661 A1 | 1/2015 | Borkenhagen et al. |
| 2015/0070745 A1 | 3/2015 | Pradhan |
| 2015/0098121 A1 | 4/2015 | Turnbull et al. |
| 2015/0103389 A1 | 4/2015 | Klawuhn et al. |
| 2015/0116811 A1 | 4/2015 | Shrivastava et al. |
| 2015/0120297 A1 | 4/2015 | Meruva |
| 2015/0129140 A1 | 5/2015 | Dean et al. |
| 2015/0137792 A1 | 5/2015 | Filippi et al. |
| 2015/0160525 A1 | 6/2015 | Shi |
| 2015/0160965 A1 | 6/2015 | Archer et al. |
| 2015/0285535 A1 | 10/2015 | Hall et al. |
| 2015/0378230 A1 | 12/2015 | Gudmunson et al. |
| 2015/0378231 A1 | 12/2015 | Greer et al. |
| 2015/0378715 A1 | 12/2015 | Solnit et al. |
| 2016/0052446 A1 | 2/2016 | Frey et al. |

(56) References Cited

U.S. PATENT DOCUMENTS

| | | |
|---|---|---|
| 2016/0054633 A1 | 2/2016 | Brown et al. |
| 2016/0054634 A1 | 2/2016 | Brown et al. |
| 2016/0070151 A1 | 3/2016 | Shrivastava et al. |
| 2016/0109778 A1 | 4/2016 | Shrivastava et al. |
| 2016/0134932 A1 | 5/2016 | Karp et al. |
| 2016/0135175 A1 | 5/2016 | Tarlazzi |
| 2016/0147100 A1 | 5/2016 | Van Oosten et al. |
| 2016/0154290 A1 | 6/2016 | Brown et al. |
| 2016/0170402 A1 | 6/2016 | Lindström |
| 2016/0202589 A1 | 7/2016 | Nagel et al. |
| 2016/0203403 A1 | 7/2016 | Nagel et al. |
| 2016/0225832 A1 | 8/2016 | Kwon et al. |
| 2016/0231354 A1 | 8/2016 | Rayman et al. |
| 2016/0261837 A1 | 9/2016 | Thompson et al. |
| 2016/0299210 A1 | 10/2016 | Zeine |
| 2016/0359965 A1 | 12/2016 | Murphy et al. |
| 2016/0377948 A1 | 12/2016 | Rozbicki et al. |
| 2017/0010880 A1 | 1/2017 | Yamazaki |
| 2017/0063429 A1 | 3/2017 | Flask |
| 2017/0068414 A1 | 3/2017 | Plumb |
| 2017/0070457 A1 | 3/2017 | Sachs |
| 2017/0075183 A1 | 3/2017 | Brown |
| 2017/0075323 A1 | 3/2017 | Shrivastava et al. |
| 2017/0077988 A1 | 3/2017 | Flask |
| 2017/0080341 A1 | 3/2017 | Mao et al. |
| 2017/0082903 A1 | 3/2017 | Vigano et al. |
| 2017/0085834 A1 | 3/2017 | Kim et al. |
| 2017/0097259 A1 | 4/2017 | Brown et al. |
| 2017/0097553 A1 | 4/2017 | Jack et al. |
| 2017/0139301 A1 | 5/2017 | Messere et al. |
| 2017/0147023 A1 | 5/2017 | Kumar et al. |
| 2017/0197494 A1 | 7/2017 | Li |
| 2017/0200424 A1 | 7/2017 | Xu et al. |
| 2017/0212400 A1 | 7/2017 | Shrivastava et al. |
| 2017/0223312 A1 | 8/2017 | McNelley et al. |
| 2017/0234067 A1 | 8/2017 | Fasi et al. |
| 2017/0243122 A1 | 8/2017 | Komatsu et al. |
| 2017/0251488 A1 | 8/2017 | Urban et al. |
| 2017/0253801 A1 | 9/2017 | Bae et al. |
| 2017/0264865 A1 | 9/2017 | Huangfu |
| 2017/0272317 A1 | 9/2017 | Singla et al. |
| 2017/0279930 A1 | 9/2017 | Zhang |
| 2017/0284691 A1 | 10/2017 | Sinha et al. |
| 2017/0285432 A1 | 10/2017 | Shrivastava et al. |
| 2017/0285433 A1 | 10/2017 | Shrivastava et al. |
| 2017/0328121 A1 | 11/2017 | Purdy et al. |
| 2017/0347129 A1 | 11/2017 | Levi et al. |
| 2017/0364046 A1* | 12/2017 | Westrick, Jr. .......... G05B 15/02 |
| 2017/0364395 A1 | 12/2017 | Shrivastava et al. |
| 2018/0004059 A1 | 1/2018 | Jovanovic |
| 2018/0076978 A1 | 3/2018 | Schubert et al. |
| 2018/0088432 A1 | 3/2018 | Shrivastava et al. |
| 2018/0090992 A1 | 3/2018 | Shrivastava et al. |
| 2018/0106098 A1 | 4/2018 | Unveren et al. |
| 2018/0129172 A1 | 5/2018 | Shrivastava et al. |
| 2018/0144712 A1 | 5/2018 | Threlkel et al. |
| 2018/0176799 A1 | 6/2018 | Lange et al. |
| 2018/0189117 A1 | 7/2018 | Shrivastava et al. |
| 2018/0241587 A1 | 8/2018 | Bull et al. |
| 2018/0252423 A1 | 9/2018 | Hieke et al. |
| 2018/0267380 A1 | 9/2018 | Shrivastava et al. |
| 2018/0284555 A1 | 10/2018 | Klawuhn et al. |
| 2018/0287780 A1 | 10/2018 | Safford et al. |
| 2018/0321042 A1 | 11/2018 | Brewer et al. |
| 2018/0335939 A1 | 11/2018 | Karunamuni et al. |
| 2019/0028287 A1 | 1/2019 | Jin et al. |
| 2019/0036209 A1 | 1/2019 | Au |
| 2019/0049811 A9 | 2/2019 | Shrivastava et al. |
| 2019/0155122 A1 | 5/2019 | Brown et al. |
| 2019/0215694 A1 | 7/2019 | Rubin et al. |
| 2019/0235451 A1 | 8/2019 | Shrivastava et al. |
| 2019/0257151 A1 | 8/2019 | Fasi et al. |
| 2019/0263231 A1 | 8/2019 | Jabour et al. |
| 2019/0271895 A1 | 9/2019 | Shrivastava et al. |
| 2019/0294018 A1 | 9/2019 | Shrivastava et al. |
| 2019/0320033 A1 | 10/2019 | Nagata et al. |
| 2019/0327320 A1 | 10/2019 | Rubin et al. |
| 2019/0331978 A1 | 10/2019 | Shrivastava et al. |
| 2019/0347141 A1 | 11/2019 | Shrivastava et al. |
| 2019/0353972 A1 | 11/2019 | Shrivastava et al. |
| 2019/0361411 A1 | 11/2019 | Park et al. |
| 2019/0384652 A1 | 12/2019 | Shrivastava et al. |
| 2020/0019622 A1 | 1/2020 | Lu et al. |
| 2020/0041963 A1 | 2/2020 | Shrivastava et al. |
| 2020/0041967 A1 | 2/2020 | Shrivastava et al. |
| 2020/0045261 A1 | 2/2020 | Lim et al. |
| 2020/0057421 A1 | 2/2020 | Trikha et al. |
| 2020/0067865 A1 | 2/2020 | Jiménez et al. |
| 2020/0080364 A1 | 3/2020 | Shrivastava et al. |
| 2020/0084638 A1 | 3/2020 | Kronewitter, III et al. |
| 2020/0103841 A1 | 4/2020 | Pillai et al. |
| 2020/0150508 A1 | 5/2020 | Patterson et al. |
| 2020/0162856 A1* | 5/2020 | Ziv .......................... H04W 4/08 |
| 2020/0241379 A1 | 7/2020 | Barnum et al. |
| 2020/0257179 A1 | 8/2020 | Barnum et al. |
| 2020/0270939 A1 | 8/2020 | Wang et al. |
| 2020/0310213 A1 | 10/2020 | Shrivastava et al. |
| 2020/0387041 A1 | 12/2020 | Shrivastava et al. |
| 2021/0021788 A1 | 1/2021 | McNelley et al. |
| 2021/0063836 A1 | 3/2021 | Patterson et al. |
| 2021/0116769 A1 | 4/2021 | Shrivastava et al. |
| 2021/0132458 A1 | 5/2021 | Trikha et al. |
| 2021/0165696 A1 | 6/2021 | Shrivastava et al. |
| 2021/0191221 A1 | 6/2021 | Shrivastava et al. |
| 2021/0208467 A1 | 7/2021 | Shrivastava et al. |
| 2021/0210053 A1 | 7/2021 | Ng et al. |
| 2021/0232015 A1 | 7/2021 | Brown et al. |
| 2021/0246719 A1 | 8/2021 | Shrivastava et al. |
| 2021/0302799 A1 | 9/2021 | Khanna |
| 2021/0373402 A1 | 12/2021 | Shrivastava et al. |
| 2021/0373511 A1 | 12/2021 | Shrivastava et al. |
| 2021/0383804 A1 | 12/2021 | Makker et al. |
| 2021/0390953 A1 | 12/2021 | Makker et al. |
| 2022/0011729 A1 | 1/2022 | Shrivastava et al. |
| 2022/0121078 A1 | 4/2022 | Vollen et al. |
| 2022/0136319 A1 | 5/2022 | Shrivastava et al. |
| 2022/0159077 A1 | 5/2022 | Shrivastava et al. |
| 2022/0171248 A1 | 6/2022 | Shrivastava et al. |
| 2022/0179275 A1 | 6/2022 | Patterson et al. |
| 2022/0214652 A1 | 7/2022 | Trikha et al. |
| 2022/0231399 A1 | 7/2022 | Brown et al. |
| 2022/0298850 A1 | 9/2022 | Shrivastava et al. |
| 2022/0316269 A1 | 10/2022 | Shrivastava et al. |
| 2022/0337596 A1 | 10/2022 | Smith et al. |
| 2022/0365494 A1 | 11/2022 | Shrivastava et al. |
| 2022/0365830 A1 | 11/2022 | Shrivastava et al. |
| 2023/0041490 A1 | 2/2023 | Vangati et al. |
| 2023/0048423 A1 | 2/2023 | Deixler et al. |
| 2023/0050614 A1 | 2/2023 | Yao et al. |
| 2023/0074720 A1 | 3/2023 | Brown et al. |
| 2023/0111311 A1 | 4/2023 | Shrivastava et al. |
| 2023/0113718 A1 | 4/2023 | Khanna et al. |
| 2023/0120049 A1 | 4/2023 | Vangati et al. |
| 2023/0305353 A1 | 9/2023 | Shrivastava et al. |
| 2023/0333520 A1 | 10/2023 | Shrivastava et al. |
| 2023/0341740 A1 | 10/2023 | Shrivastava et al. |
| 2023/0367584 A1 | 11/2023 | Tai et al. |
| 2023/0393443 A1 | 12/2023 | Marquez et al. |
| 2023/0393542 A1 | 12/2023 | Shrivastava et al. |
| 2024/0152019 A1 | 5/2024 | Shrivastava et al. |
| 2024/0192563 A1 | 6/2024 | Hur et al. |
| 2024/0201553 A1 | 6/2024 | Shrivastava et al. |
| 2024/0220337 A1 | 7/2024 | Shrivastava et al. |
| 2024/0242717 A1 | 7/2024 | Makker et al. |
| 2024/0276204 A1 | 8/2024 | Lee et al. |
| 2024/0284155 A1 | 8/2024 | Lee et al. |
| 2024/0329484 A1 | 10/2024 | Trikha et al. |

FOREIGN PATENT DOCUMENTS

| | | |
|---|---|---|
| CN | 1311935 A | 9/2001 |
| CN | 1599280 A | 3/2005 |
| CN | 1692348 A | 11/2005 |
| CN | 1723658 A | 1/2006 |

(56) References Cited

FOREIGN PATENT DOCUMENTS

| | | |
|---|---|---|
| CN | 1808505 A | 7/2006 |
| CN | 101013211 A | 8/2007 |
| CN | 101023711 A | 8/2007 |
| CN | 101154104 A | 4/2008 |
| CN | 101213788 A | 7/2008 |
| CN | 101253460 A | 8/2008 |
| CN | 101501757 A | 8/2009 |
| CN | 101510078 A | 8/2009 |
| CN | 101856193 A | 10/2010 |
| CN | 102325326 A | 1/2012 |
| CN | 102414601 A | 4/2012 |
| CN | 102598469 A | 7/2012 |
| CN | 202443309 U | 9/2012 |
| CN | 103051737 A | 4/2013 |
| CN | 103168269 A | 6/2013 |
| CN | 203019761 U | 6/2013 |
| CN | 103238107 A | 8/2013 |
| CN | 103282841 A | 9/2013 |
| CN | 103327126 A | 9/2013 |
| CN | 103345236 A | 10/2013 |
| CN | 103547965 A | 1/2014 |
| CN | 103649826 A | 3/2014 |
| CN | 103842735 A | 6/2014 |
| CN | 103987909 A | 8/2014 |
| CN | 104114804 A | 10/2014 |
| CN | 104321497 A | 1/2015 |
| CN | 104335595 A | 2/2015 |
| CN | 104364706 A | 2/2015 |
| CN | 105143586 A | 12/2015 |
| CN | 105974160 A | 9/2016 |
| CN | 106125444 A | 11/2016 |
| CN | 106164973 A | 11/2016 |
| CN | 106462023 A | 2/2017 |
| CN | 205992531 U | 3/2017 |
| CN | 106575064 A | 4/2017 |
| CN | 106837094 A | 6/2017 |
| CN | 107111287 A | 8/2017 |
| CN | 107850815 A | 3/2018 |
| CN | 108139644 A | 6/2018 |
| CN | 108769186 A | 11/2018 |
| EP | 0917667 A1 | 5/1999 |
| EP | 0920210 A1 | 6/1999 |
| EP | 0676058 B1 | 4/2003 |
| EP | 1929701 A2 | 6/2008 |
| EP | 2090961 A1 | 8/2009 |
| EP | 2267966 A2 | 12/2010 |
| EP | 2357544 A2 | 8/2011 |
| EP | 2648086 A2 | 10/2013 |
| EP | 2733998 A1 | 5/2014 |
| EP | 2764998 A1 | 8/2014 |
| EP | 2357544 B1 | 10/2014 |
| EP | 3015915 A1 | 5/2016 |
| EP | 2837205 B1 | 2/2017 |
| EP | 3293941 A1 | 3/2018 |
| EP | 3299957 A1 | 3/2018 |
| EP | 3352053 A1 | 7/2018 |
| EP | 3230943 B1 | 7/2021 |
| JP | H10215492 A | 8/1998 |
| JP | H10246078 A | 9/1998 |
| JP | H11500838 A | 1/1999 |
| JP | 2003284160 A | 10/2003 |
| JP | 2004505298 A | 2/2004 |
| JP | 2004332350 A | 11/2004 |
| JP | 2005115409 A | 4/2005 |
| JP | 2006287729 A | 10/2006 |
| JP | 2007156909 A | 6/2007 |
| JP | 4139109 B2 | 8/2008 |
| JP | 2009005116 A | 1/2009 |
| JP | 2009508387 A | 2/2009 |
| JP | 2010152646 A | 7/2010 |
| JP | 2012017614 A | 1/2012 |
| JP | 2012533060 A | 12/2012 |
| JP | 3184348 U | 6/2013 |
| JP | 2013538305 A | 10/2013 |
| JP | 2016516621 A | 6/2016 |
| JP | 2018050290 A | 3/2018 |
| JP | 2018507337 A | 3/2018 |
| JP | 2019508946 A | 3/2019 |
| JP | 2019186771 A | 10/2019 |
| KR | 19990088613 A | 12/1999 |
| KR | 20030040361 A | 5/2003 |
| KR | 20030073121 A | 9/2003 |
| KR | 20070089370 A | 8/2007 |
| KR | 20090066107 A | 6/2009 |
| KR | 20120045915 A | 5/2012 |
| KR | 20120092921 A | 8/2012 |
| KR | 20120117409 A | 10/2012 |
| KR | 20130023668 A | 3/2013 |
| KR | 20130026740 A | 3/2013 |
| KR | 20130112693 A | 10/2013 |
| KR | 101323668 B1 | 11/2013 |
| KR | 101346862 B1 | 1/2014 |
| KR | 20140004175 A | 1/2014 |
| KR | 101799323 B1 | 12/2017 |
| KR | 20190142032 A | 12/2019 |
| KR | 20210032133 A | 3/2021 |
| KR | 20210039721 A | 4/2021 |
| RU | 2378672 C2 | 1/2010 |
| RU | 2009132962 A | 3/2011 |
| RU | 104808 U1 | 5/2011 |
| RU | 2012107324 A | 9/2013 |
| TW | 200532346 A | 10/2005 |
| TW | 201029838 A | 8/2010 |
| TW | 201115503 A | 5/2011 |
| TW | 201307975 A | 2/2013 |
| TW | 201351010 A | 12/2013 |
| TW | 201510605 A | 3/2015 |
| TW | 201606409 A | 2/2016 |
| TW | 201631551 A | 9/2016 |
| TW | 201635840 A | 10/2016 |
| TW | I607269 B | 12/2017 |
| TW | 202248837 A | 12/2022 |
| WO | WO-0065770 A1 | 11/2000 |
| WO | WO-0124700 A1 | 4/2001 |
| WO | WO-0209338 A2 | 1/2002 |
| WO | WO-0213052 A2 | 2/2002 |
| WO | WO-03092309 A1 | 11/2003 |
| WO | WO-2004098953 A2 | 11/2004 |
| WO | WO-2007029215 A2 | 3/2007 |
| WO | WO-2007146862 A2 | 12/2007 |
| WO | WO-2008122906 A1 | 10/2008 |
| WO | WO-2009042359 A1 | 4/2009 |
| WO | WO-2010120771 A1 | 10/2010 |
| WO | WO-2012079159 A1 | 6/2012 |
| WO | WO-2012101878 A1 | 8/2012 |
| WO | WO-2012125332 A2 | 9/2012 |
| WO | WO-2012125348 A2 | 9/2012 |
| WO | WO-2012130262 A1 | 10/2012 |
| WO | WO-2013046112 A1 | 4/2013 |
| WO | WO-2013090264 A1 | 6/2013 |
| WO | WO-2013155467 A1 | 10/2013 |
| WO | WO-2013158464 A1 | 10/2013 |
| WO | WO-2013177575 A1 | 11/2013 |
| WO | WO-2014059268 A2 | 4/2014 |
| WO | WO-2014082092 A1 | 5/2014 |
| WO | WO-2014121809 A1 | 8/2014 |
| WO | WO-2014124701 A1 | 8/2014 |
| WO | WO-2014124710 A1 | 8/2014 |
| WO | WO-2014130471 A1 | 8/2014 |
| WO | WO-2015051262 A1 | 4/2015 |
| WO | WO-2015113592 A1 | 8/2015 |
| WO | WO-2015134789 A1 | 9/2015 |
| WO | WO-2015168626 A1 | 11/2015 |
| WO | WO-2015171886 A1 | 11/2015 |
| WO | WO-2016004109 A1 | 1/2016 |
| WO | WO-2016085964 A1 | 6/2016 |
| WO | WO-2016094445 A1 | 6/2016 |
| WO | WO-2016107285 A1 | 7/2016 |
| WO | WO-2016153467 A1 | 9/2016 |
| WO | WO-2016183059 A1 | 11/2016 |
| WO | WO-2017007841 A1 | 1/2017 |
| WO | WO-2017007942 A1 | 1/2017 |
| WO | WO-2017059362 A1 | 4/2017 |
| WO | WO-2017075059 A1 | 5/2017 |

(56) References Cited

FOREIGN PATENT DOCUMENTS

| WO | WO-2017155833 A1 | 9/2017 |
|---|---|---|
| WO | WO-2017189618 A1 | 11/2017 |
| WO | WO-2017192881 A1 | 11/2017 |
| WO | WO-2018067377 A1 | 4/2018 |
| WO | WO-2018098089 A1 | 5/2018 |
| WO | WO-2018200702 A1 | 11/2018 |
| WO | WO-2018200740 A2 | 11/2018 |
| WO | WO-2018200752 A1 | 11/2018 |
| WO | WO-2019157602 A1 | 8/2019 |
| WO | WO-2019203931 A1 | 10/2019 |
| WO | WO-2019204205 A1 | 10/2019 |
| WO | WO-2019213441 A1 | 11/2019 |
| WO | WO-2020172187 A1 | 8/2020 |
| WO | WO-2020185941 A1 | 9/2020 |
| WO | WO-2021211798 A1 | 10/2021 |

OTHER PUBLICATIONS

"Sage Product Highlights" screenshot, accessed Aug. 28, 2015, 1 page.
"SageGlass Mobile App" screenshot, accessed Aug. 28, 2015, 1 page.
"SageGlass Unplugged" screenshot, accessed Aug. 28, 2015, 1 page.
"SageGlass Unplugged™—wireless dynamic glass", 2014, 2 pages.
Alguindigue. I., et al., "Monitoring and Diagnosis of Rolling Element Bearings Using Artificial Neural Networks," IEEE Transactions on Industrial Electronics, 1993, vol. 40 (2), pp. 209-217.
APC by Schneider Electric, Smart-UPS 120V Product Brochure, 2013, 8 pp.
AU Office Action dated Jan. 11, 2022, in Application No. AU2021201145.
AU Office action dated Sep. 30, 2022, in AU Application No. AU2021215134.
AU Office action dated Apr. 4, 2022, in AU Application No. AU2020226999.
AU Office action dated Dec. 5, 2022, in AU Application No. AU2017363581.
AU Office action dated Mar. 20, 2023, in AU Application No. AU20210215134.
AU Office action dated Oct. 12, 2022, in AU Application No. AU2020226999.
AU Office action dated Oct. 22, 2021, in AU Application No. AU2020226999.
Australian Examination Report dated Dec. 24, 2019 in AU Application No. 2015227056.
Australian Examination Report dated Mar. 2, 2020 in AU Application No. 2015353569.
Australian Office Action dated Aug. 10, 2020 in AU Application No. 2015360714.
Australian Office Action dated Aug. 9, 2021 in AU Application No. 2015360714.
Australian Office Action dated Dec. 4, 2020 in AU Application No. 2015360714.
Australian Office Action dated Jun. 4, 2021 in AU Application No. 2015360714.
Bannat, A., et al., "Artificial Cognition in Production Systems", IEEE Transactions on Automation Science and Engineering, 2011, vol. 8, No. 1, pp. 148-174.
"Blockchain and the internet of things: the IoT blockchain opportunity and challenge," I-Scoop, Sep. 2016, rev. Feb. 2018, 16 pp. https://www.i-scoop.eu/blockchain-distributed-ledger-technology/blockchain-iot/ retrieved Feb. 20, 2019.
Bucci, G., et al., "Digital Measurement Station for Power Quality Analysis in Distributed Environments," IEEE Transactions on Instrumentation and Measurement, 2003, vol. 52(1), pp. 75-84.
Byun, J. et al., "Development of a Self-adapting Intelligent System for Building Energy Saving and Context-aware Smart Services", IEEE Transactions on Consumer Electronics, Feb. 2011, vol. 57, No. 1, pp. 90-98.

CA Office Action dated Apr. 4, 2023, in Application No. CA3017138.
CA Office Action dated Dec. 5, 2023 in Application No. 2970300.
CA Office Action dated Dec. 13, 2021, in Application No. CA2970300.
CA Office Action dated Dec. 23, 2021, in Application No. CA2941526.
CA Office Action dated Dec. 27, 2023 in CA Application No. 3172227.
CA Office Action dated Feb. 22, 2023, in Application No. CA2970300.
CA Office Action dated Jul. 31, 2023, in Application No. CA3156883.
CA Office Action dated Nov. 9, 2023, in CA Application No. 3139813.
CA Office Action dated Oct. 11, 2023 in CA Application No. CA3169935.
CA Office Action dated Oct. 23, 2023, in CA Application No. 3044823.
CA Office Action dated Oct. 26, 2023, in CA Application No. 3039342.
CA Office Action dated Oct. 31, 2023, in Application No. CA3129952.
CA Office Action dated Sep. 13, 2022, in Application No. CA2970300.
CA Office Action dated Sep. 28, 2023, in Application No. CA3062817.
Cecilio, J., et al., "A Configurable Middleware for Processing Heterogenous Industrial Intelligent Sensors," IEEE 16th International Conference on Intelligent Engineering Systems (INES), Jun. 15, 2012, pp. 145-149.
Chen, H. et al. "The Design and Implementation of a Smart Building Control System", 2009 IEEE International Conference on e-Business Engineering, pp. 255-262.
Chinese Office Action dated Jan. 15, 2018 in CN Application No. 201380025802.1.
Chinese Office Action dated Jan. 4, 2021 in CN Application No. 201780079165.4.
Chinese Office Action dated Jun. 21, 2017 in CN Application No. 201380025802.1.
Chinese Office Action dated Jun. 3, 2021 in CN Application No. 201780079165.4.
Chinese Office Action dated May 20, 2020 in CN Application No. 201810932986.4.
Chinese Office Action dated May 26, 2020 in CN Application No. 201780079165.4.
Chinese Office Action dated Nov. 23, 2020 in CN Application No. 201810932986.4.
CN Office Action dated Dec. 29, 2021, in application No. 202010466929.9 with English translation.
CN Notice of Allowance with Supplemental Search Report (w/translation) dated Mar. 1, 2021 in CN Application No. 201580040461.4.
CN Office Action dated Apr. 18, 2022, in Application No. CN202011547257.0 with English translation.
CN Office Action dated Aug. 1, 2022, in Application No. CN201880037591.6 With English translation.
CN Office Action dated Aug. 16, 2019 in CN Application No. 201580015979.2.
CN Office Action dated Aug. 19, 2022, in Application No. CN202080022001.X with English translation.
CN Office action dated Aug. 22, 2022 in Application No. CN202011547257.0 With English translation.
CN Office Action dated Aug. 28, 2018 in CN Application No. 201580070776.3.
CN Office Action dated Aug. 31, 2022 in Application No. CN201780069604.3 with English translation.
CN Office Action dated Dec. 1, 2021, in application No. CN201780069604.3 with English translation.
CN Office Action dated Dec. 12, 2023 in CN Application No. 201980003232.3.
CN Office Action dated Feb. 2, 2019 in CN Application No. 201580015979.2.
CN Office Action dated Feb. 3, 2020 in CN Application No. 201580072749.X.
CN Office Action dated Jan. 10, 2023, in Application No. CN202080022001.X with English translation.
CN Office Action dated Jan. 12, 2023 in CN Application No. CN202011547257 with English translation.
CN Office Action dated Jan. 13, 2021 in CN Application No. 201780082949.2.

(56) References Cited

OTHER PUBLICATIONS

CN Office Action dated Jan. 15, 2020 in CN Application No. 201580015979.2.
CN Office Action dated Jul. 21, 2021 in CN Application No. 201780082949.2.
CN Office Action dated Jul. 28, 2023, in Application No. CN201980031543 with English translation.
CN Office Action dated Jun. 29, 2021 in CN Application No. 202010466929.9.
CN Office Action dated Jun. 3, 2020 in CN Application No. 201580015979.2.
CN Office Action dated Jun. 3, 2021 in CN Application No. 201580072749.X.
CN Office Action dated Mar. 16, 2023, in Application No. CN202080022001.X with English translation.
CN Office Action dated Mar. 19, 2019 in CN Application No. 201580070776.3.
CN Office Action dated Mar. 2, 2022, in Application No. CN201880037591.6 with English translation.
CN Office Action dated Mar. 30, 2023 in Application No. CN201980031543 with English translation.
CN Office Action dated Mar. 8, 2021 in CN Application No. 201580072749.X.
CN Office Action dated Mar. 9, 2020 in CN Application No. 201580040461.4.
CN Office Action dated May 17, 2022, in Application No. CN201780069604.3 With English Translation.
CN Office Action dated May 20, 2022, in Application No. CN202010466929.9 with English translation.
CN Office Action dated May 24, 2023, in Application No. CN202080022001.X with English translation.
CN Office Action dated May 26, 2020 in CN Application No. 201780082949.2.
CN Office Action dated Nov. 1, 2022, in Application No. CN201880037591.6 with English translation.
CN Office Action dated Nov. 12, 2021, in Application No. CN20158072749 with English translation.
CN Office Action dated Oct. 21, 2020 in CN Application No. 201580040461.4.
CN Office Action dated Oct. 9, 2019 in CN Application No. 201580070776.3.
CN Office Action dated Sep. 28, 2022 in Application No. CN202010466929.9 with English translation.
CN Office Action dated Sep. 30, 2020 in CN Application No. 201580072749.X.
Dang, T. et al., "An Approach to Data Privacy in Smart Home using Blockchain Technology", International Conference on Advanced Computing and Applications, IEEE, Nov. 27, 2018, pp. 58-64.
Duchon, Claude E. et al., "Estimating Cloud Type from Pyranometer Observations," Journal of Applied Meteorology, vol. 38, Jan. 1999, pp. 132-141.
EP Office Action dated Jul. 13, 2022 in Application No. EP20170858928.
EP Office Action dated Sep. 12, 2022 in Application No. EP20180791117.7.
EP Examination Report dated Mar. 4, 2019 in EP Application No. 15814233.1.
EP Extended European search report dated Jan. 3, 2023 in Application No. EP22198532.8.
EP Extended European search report dated Oct. 13, 2022, in Application No. EP22182320.6.
EP Extended European Search report dated Oct. 24, 2023, in Application No. EP23161161.7.
EP Extended European Search Report mailed on Sep. 14, 2021, in the application EP21182449.7.
EP Extended Search Report dated Dec. 17, 2019 in EP Application No. 19202054.
EP Extended Search Report dated Feb. 15, 2018 in EP Application No. 15814233.1.
EP Extended Search Report dated Jun. 19, 2017 in EP Application No. 15758538.1.
EP Extended Search Report dated Jun. 5, 2018 in EP Application No. 15868003.3.
EP Extended Search Report dated Nov. 11, 2020 in EP Application No. 18791117.7.
EP Extended Search Report dated Nov. 28, 2019 in EP Application No. 19188907.0.
EP Extended Search Report dated Nov. 8, 2018 in EP Application No. 15863112.7.
EP Extended Search Report dated Oct. 1, 2020 in EP Application No. 17858928.9.
EP Office Action dated Jan. 17, 2022, in Application No. 17858928.9.
EP Office Action dated Jun. 30, 2022 in Application No. EP20190727174.
EP Office Action dated Apr. 13, 2022, in Application No. EP17874769.7.
EP office action dated Apr. 24, 2023, in application No. EP21182448.7.
EP Office Action dated Aug. 21, 2018 in EP Application No. 15758538.1.
EP office action dated Aug. 25, 2021, in EP Application No. EP19202054.3.
EP Office Action dated Feb. 15, 2022, in Application No. EP19188907.0.
EP Office Action dated Jan. 29, 2021 in EP Application No. 15868003.3.
EP office action dated Jul. 3, 2023, in application No. EP17858928.9.
EP Office Action dated Jul. 4, 2023, in application No. EP17874769.7.
EP Office Action dated Jun. 19, 2023 in Application No. EP19727174.5.
EP office action dated Jun. 29, 2023, in application No. EP19787808.5.
EP office action dated Mar. 10, 2023, in application No. EP20712740.8.
EP Office Action dated May 14, 2020 in EP Application No. 15868003.3.
EP Office Action dated May 20, 2022, in Application No. EP20170880595.8.
EP Office Action dated Nov. 19, 2020 in EP Application No. 15758538.1.
EP Office Action dated Oct. 5, 2021, in application No. EP17874769.7.
EP Search Report dated Dec. 10, 2021, in Application No. EP19787808.5.
European (Extended) Search Report dated Aug. 25, 2017 in European Application No. 17156033.7.
European (extended) Search Report dated Dec. 4, 2015 in European Application No. 13775052.7.
European (extended) Search Report dated Nov. 28, 2019 in European Application No. 17763804.6.
European Office Action dated Apr. 25, 2023 in Application No. EP19188907.
European Office Action dated Feb. 25, 2021 in EP Application No. 15863112.7.
European Office Action dated Sep. 22, 2023 in Application No. EP20743039.8.
Extended European Search Report dated Nov. 2, 2020 in EP Application No. 17880595.8.
Hadziosmanovic, D., et al., "Through the Eye of the Plc: Semantic Security Monitoring for Industrial Processes," Proceedings of the 30th Annual Computer Security Applications Conference, 2014, pp. 126-135.
Hameed, Z. et al., "Condition Monitoring and Fault Detection of Wind Turbines and Related Algorithms: a Review.", Renewable and Sustainable energy reviews, 2009, vol. 13, pp. 1-39.
IN Office Action dated Aug. 5, 2022 In Application No. IN201937050525.
IN First Examination Report dated Sep. 17, 2021, in Application No. IN202038045168.
IN Office Action dated Jan. 13, 2022, in Application No. 201937044701.

(56) References Cited

OTHER PUBLICATIONS

IN Office Action dated Aug. 2, 2021 in IN Application No. 201637028587.
IN Office Action dated Nov. 24, 2020 in IN Application No. 201737020192.
Indian Office Action dated Feb. 24, 2021 in IN Application No. 201737021981.
Indian Office Action dated Jul. 6, 2022, in IN Application No. 201917018642.
Indian Office Action dated Sep. 17, 2019 in Indian Application No. 2533/KOLNP/2014.
International Preliminary Report on Patentability dated Mar. 3, 2022, in Application No. PCT/US2020/070427.
International Preliminary Report on Patentability dated Oct. 6, 2022 in PCT Application PCT/US2021/023834.
International Search Report and Written Opinion dated Mar. 25, 2022 in Application No. PCT/US2021/062774.
International Preliminary Report on Patentability and Written Opinion dated Nov. 23, 2023 in PCT Application No. PCT/US2022/024999.
International Preliminary Report on Patentability and Written Opinion dated Nov. 23, 2023 in PCT Application No. PCT/US2022/028850.
International Preliminary Report on Patentability dated Apr. 18, 2019 in PCT Application No. PCT/US17/54120.
International Preliminary Report on Patentability dated Aug. 25, 2022, in PCT Application No. PCT/US2021/017946.
International Preliminary Report on Patentability dated Dec. 16, 2021, for International Application No. PCT/US2020/070123.
International Preliminary Report on Patentability dated Jan. 12, 2017 in PCT Application No. PCT/US15/38667.
International Preliminary Report on Patentability dated Jun. 22, 2017 in PCT Application No. PCT/US15/64555.
International Preliminary Report on Patentability dated Jun. 22, 2023, in Application No. PCT/US2021/062774.
International Preliminary Report on Patentability dated Jun. 27, 2019 for PCT/US2017/066486.
International Preliminary Report on Patentability dated Jun. 8, 2017 in PCT/US2015/062480.
International Preliminary Report on Patentability dated Nov. 12, 2020 in PCT Application No. PCT/US2019/030467.
International Preliminary Report on Patentability dated Nov. 7, 2019 in PCT Application No. PCT/US2018/029406.
International Preliminary Report on Patentability dated Nov. 7, 2019 in PCT Application No. PCT/US2018/029460.
International Preliminary Report on Patentability dated Oct. 23, 2014 issued in PCT/US2013/036456.
International Preliminary Report on Patentability dated Oct. 26, 2023, in Application No. PCT/US2022/024812.
International Preliminary Report on Patentability dated Oct. 29, 2020 in PCT/US2019/019455.
International Preliminary Report on Patentability dated Sep. 15, 2016 in Application No. PCT/US2015/019031.
International Preliminary Report on Patentability dated Sep. 20, 2018, issued in PCT/US17/20805.
International Preliminary Report on Patentability dated Sep. 22, 2022, in PCT Application No. PCT/US2021/021833.
International Preliminary Reporton Patentability dated Sep. 28, 2023, in PCT Application No. PCT/US2022/020730.
International Search Report and Written Opinion dated Apr. 28, 2020 in PCT Application No. PCT/US2020/018677.
International Search Report and Written Opinion dated Apr. 13, 2018 for PCT/US2017/066486.
International Search Report and Written Opinion dated Feb. 15, 2016 in PCT/US2015/062480.
International Search Report and Written Opinion dated Jul. 6, 2022, in PCT Application No. PCT/US2022/020730.
International Search Report and Written Opinion dated Jul. 1, 2021 in PCT/US2021/021833.
International Search Report and Written Opinion dated Jul. 11, 2019 in PCT Application No. PCT/US2019/030467.
International Search Report and Written Opinion dated Jul. 26, 2013, issued in PCT/US2013/036456.
International Search Report and Written Opinion dated Jul. 26, 2022 in Application No. PCT/US2022/024999.
International Search Report and Written Opinion dated Jun. 5, 2017, issued in PCT/US17/20805.
International Search Report and Written Opinion dated Mar. 29, 2016 in PCT Application No. PCT/US15/64555.
International Search Report and Written Opinion dated May 29, 2015 in Application No. PCT/US2015/019031.
International Search Report and Written Opinion dated Nov. 16, 2018 in PCT Application No. PCT/US2018/029460.
International Search Report and Written Opinion dated Nov. 16, 2022 in PCT Application No. PCT/US2022/074162.
International Search Report and Written Opinion dated Nov. 23, 2020 in PCT/US2020/070123.
International Search Report and Written Opinion dated Oct. 15, 2018 in PCT Application No. PCT/US2018/029406.
International Search Report and Written Opinion dated Oct. 16, 2015 in PCT Application No. PCT/US15/38667.
International Search Report and Written Opinion dated Sep. 1, 2022, in Application No. PCT/US2022/024812.
International Search Report and Written Opinion dated Sep. 1, 2022 in Application No. PCT/US2022/028850.
International Search Report and Written Opinion (ISA/KR) dated Jan. 9, 2018 in PCT Application No. PCT/US17/54120.
International Search Report and Written Opinion (ISA/KR) dated Jun. 14, 2019 in PCT/US2019/019455.
Invitation to Pay Additional Fees dated Sep. 14, 2020 in PCT/US2020/070123.
Japanese Decision to Grant (w/cited references) dated Aug. 3, 2021 in JP Application No. 2019-526561.
JP Examination Report dated Nov. 26, 2020 in JP Application No. 2017-549175.
JP Office Action dated Dec. 7, 2021, in Application No. JP20170549175 with English translation.
JP Office Action dated Jul. 20, 2021 in JP Application No. 2017-549175 [VIEWP073JP].
JP Office Action dated Jun. 6, 2023, in application No. JP2022-149815 with English translation.
JP Office Action dated Jun. 16, 2020 in JP Application No. 2017-549175.
JP Office Action dated Jun. 28, 2022 in Application No. JP2021154739 with English translation.
JP Office Action dated Jun. 6, 2023, in Application No. JP2020-560912 with English translation.
JP Office Action dated Mar. 1, 2022, in Application No. JP2020-175033 with translation.
JP Office Action dated Nov. 19, 2019 in JP Application No. 2017-549175.
JP office action dated Sep. 7, 2021, in JP Application No. 2020-175033 with English translation.
Kipp & Zonen, "Solar Radiation" (known as of Sep. 3, 2014) [http://www.kippzonen.com/Knowledge-Center/Theoretical-info/Solar-Radiation].
KR Office Action dated Apr. 13, 2022, in KR Application No. KR1020217028044 with English translation.
KR Office Action dated Apr. 25, 2023, in Application No. KR10-2017-7017128 with English translation.
KR Office Action dated Dec. 7, 2022 in Application No. KR10-2022-7036992 with English translation.
KR Office Action dated Dec. 22, 2021, in Application No. KR1020177018491 with English translation.
KR Office Action dated Jan. 22, 2021 in KR Application No. 10-2016-7025862.
KR Office Action dated Jul. 10, 2023, in application No. KR 10-2023-7021596 with English Translation.
KR Office Action dated Jul. 26, 2023, in Application No. KR10-2022-7037562 with English translation.
KR Office Action dated Jul. 31, 2021 in KR Application No. 10-2016-7025862.

(56) References Cited

OTHER PUBLICATIONS

KR Office Action dated May 12, 2023, in Application No. KR10-2022-7027386 with English translation.
KR Office Action dated Nov. 3, 2022, in Application No. KR10-2022-7027386 withEnglish Translation.
KR Office Action dated Oct. 26, 2021, in KR Application No. KR1020217028044 with English translation.
KR Office Action dated Sep. 25, 2023, in Application No. KR10-2022-7027386 withEnglish Translation.
Laskar, S.H., et al., "Power Quality Monitoring by Virtual Instrumentation using LabVIEW", 2011 46th International Universities' Power Engineering Conference (UPEC), 2011, pp. 1-6.
Mumaw, R.J et al., "There is More to Monitoring a Nuclear Power Plant Than Meets the Eye", Human factors, 2000, vol. 42, No. 1, pp. 36-55.
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134 ].
Notice of Allowance dated Oct. 29, 2021 in U.S. Appl. No. 16/469,848.
"Ossia Wireless Charging", screenshot and picture of Cota device, accessed Apr. 20, 2015, 1 page.
PCT Application No. PCT/US2021/021833 filed Mar. 11, 2021.
Preliminary Amendment dated Jan. 18, 2017 in U.S. Appl. No. 15/123,069.
Rajiv, "How does Cloud Radio Access Network (C-RAN) works," RF Page, Apr. 16, 2018, 5 pp. https://www.rfpage.com/how-cloud-radio-access-network-works/ Accessed May 19, 2021.
"Remote Radio Head for CPRI and 4G, 5G & LTE Networks," CableFree by Wireless Excellence Limited, 2020, 8 pp., https://www.cablefree.net/wirelesstechnology/4glte/remote-radio-head/ Accessed May 19, 2021.
RU Office Action dated Sep. 24, 2018 in RU Application No. 2016139012.
Russian Office Action dated Jul. 10, 2019 in RU Application No. 2017123902.
Russian Office Action dated Mar. 9, 2017 in RU Application No. 2014145565.
Sim, S., et al., "Next Generation Data Interchange: Tool-to-tool Application Programming Interfaces," IEEE Working Conference on Reverse Engineering, Nov. 25, 2000, pp. 278-280.
Taiwanese Office Action dated Apr. 16, 2021 in TW Application No. 106140690.
Taiwanese Office Action dated Dec. 12, 2018 in TW Application No. 107129150.
Taiwanese Office Action dated Feb. 27, 2020 in TW Application No. 108126548.
Taiwanese Office Action dated May 13, 2019 in TW Application No. 104139217.
Taiwanese Office Action dated Nov. 23, 2020 in TW Application No. 106107498.
Tuokko, R., et al., "Micro and Desktop Factory Road Map", Tampere University of Technology, 2012, pp. 1-114.
TW Notice of Allowance & Search Report (translated) dated Jul. 30, 2021 in TW Application No. 106133985.
TW Office Action dated Jun. 6, 2022 in Application No. TW108115291 With English Translation.
TW Office Action dated Apr. 27, 2023, in application No. TW20220142122 with Englishtranslation.
TW Office Action dated Apr. 29, 2022, in Application No. TW110140314 with English translation.
TW Office Action dated Aug. 30, 2023, in application No. TW111131479 with English Translation.
TW Office Action dated Feb. 17, 2022, in Application No. TW110135156 with English translation.
TW Office Action dated Jan. 12, 2023 in Application No. TW108115291 with English translation.
TW Office Action dated Jan. 28, 2022, in Application No. TW110109128 with English translation.
TW Office Action dated Jun. 17, 2023, in application No. TW107114217 with English translation.
TW Office Action dated Jun. 30, 2023, in application No. TW112118232 with English translation.
TW Office Action dated Mar. 15, 2022, in Application No. TW109112242 with Englishtranslation.
TW Office Action dated Nov. 23, 2022 in Application No. TW107114217 with English translation.
TW Office Action dated Oct. 26, 2021, in application No. 106144418 with English translation.
U.S. Non-Final office Action dated Sep. 21, 2022 in U.S. Appl. No. 17/211,697.
U.S. Non-Final office Action dated Sep. 21, 2022 in U.S. Appl. No. 17/301,026.
U.S. Notice of Allowance dated May 12, 2022, in U.S. Appl. No. 17/171,667.
U.S Advisory Action dated Aug. 23, 2023 in U.S. Appl. No. 17/194,795.
U.S Advisory Action dated Mar. 20, 2023 in U.S. Appl. No. 17/247,662.
U.S. Appl. No. U.S. Appl. No. 62/988,861, inventors Khanna et al., filed Mar. 12, 2020.
U.S. Appl. No. U.S. Appl. No. 63/000,342, inventors Larson, filed Mar. 26, 2020.
U.S. Appl. No. U.S. Appl. No. 63/121,561, inventors Larson et al., filed Dec. 4, 2020.
U.S. Corrected Notice of Allowance dated Jan. 6, 2023 in U.S. Appl. No. 16/655,032.
U.S. Corrected Notice of Allowance dated Jun. 27, 2022 in U.S. Appl. No. 16/527,554.
US Corrected Notice of Allowability dated Jun. 4, 2020 in U.S. Appl. No. 16/298,776.
US Corrected Notice of Allowability dated May 3, 2021 in U.S. Appl. No. 16/253,971.
U.S Corrected Notice of Allowability dated Sep. 1, 2021 in U.S. Appl. No. 16/298,776.
US Corrected Notice of Allowability dated Sep. 23, 2021, in U.S. Appl. No. 16/338,403.
U.S. Corrected Notice of Allowance dated Apr. 28, 2022, in U.S. Appl. No. 15/733,765.
U.S. Corrected Notice of Allowance dated Dec. 4, 2023 in U.S. Appl. No. 17/453,469.
U.S. Corrected Notice of Allowance dated Jul. 17, 2023, in U.S. Appl. No. 17/301,026.
U.S. Corrected Notice of Allowance dated Jun. 12, 2023, in U.S. Appl. No. 17/453,469.
U.S. Corrected Notice of Allowance dated May 19, 2022, in U.S. Appl. No. 16/438,177.
U.S. Corrected Notice of Allowance dated May 26, 2023 in U.S. Appl. No. 17/355,086.
U.S. Corrected Notice of Allowance dated Oct. 31, 2023, in U.S. Appl. No. 17/453,469.
U.S. Final Office Action dated Dec. 6, 2022 in U.S. Appl. No. 17/247,662.
US Final Office Action dated Dec. 23, 2020 in U.S. Appl. No. 16/338,403.
US Final Office Action dated Feb. 26, 2015 in U.S. Appl. No. 13/479,137.
US Final Office Action dated Feb. 5, 2020 in U.S. Appl. No. 15/727,258.
US Final Office Action dated Feb. 8, 2018 in U.S. Appl. No. 14/391,122.
US Final Office Action dated Jan. 27, 2014 in U.S. Appl. No. 13/479,137.
US Final Office Action dated Jan. 31, 2019 in U.S. Appl. No. 15/534,175.
US Final Office Action dated Jul. 2, 2019 in U.S. Appl. No. 15/691,468.
US Final Office Action dated Jul. 3, 2017 in U.S. Appl. No. 14/391,122.
US Final Office Action dated Jul. 3, 2019 in U.S. Appl. No. 15/623,237.

(56) References Cited

OTHER PUBLICATIONS

US Final Office Action dated Mar. 15, 2018 in U.S. Appl. No. 14/951,410.
US Final Office Action dated Mar. 17, 2017 in U.S. Appl. No. 14/887,178.
US Final Office Action dated Mar. 18, 2020 in U.S. Appl. No. 16/253,971.
US Final Office Action dated Mar. 3, 2020 in U.S. Appl. No. 16/508,099.
U.S. Final office Action dated May 19, 2023 in U.S. Appl. No. 17/194,795.
U.S. Final Office Action dated Nov. 15, 2023 in U.S. Appl. No. 17/609,671.
US Final Office Action dated Nov. 20, 2018 in U.S. Appl. No. 14/391,122.
US Final Office Action dated Sep. 19, 2016 in U.S. Appl. No. 14/887,178.
U.S. Non-Final office Action dated Jan. 23, 2023 in U.S. Appl. No. 17/869,725.
U.S. Non-Final office Action dated Nov. 14, 2022 in U.S. Appl. No. 17/804,802.
U.S. Non-Final office Action dated Nov. 15, 2022 in U.S. Appl. No. 17/355,086.
U.S. Non-Final office Action dated Sep. 9, 2022 in U.S. Appl. No. 17/249,442.
U.S. Non-Final Office Action dated Apr. 18, 2023 in U.S. Appl. No. 17/609,671.
U.S. Non-Final Office Action dated Aug. 4, 2023, in U.S. Appl. No. 17/247,823.
U.S. Non-Final Office Action dated Aug. 12, 2022, in U.S. Appl. No. 16/655,032.
U.S. Non-Final Office Action dated Aug. 28, 2023, in U.S. Appl. No. 17/400,596.
U.S. Non-Final Office Action dated Aug. 31, 2023, in U.S. Appl. No. 17/194,795.
U.S. Non-Final Office Action dated Dec. 6, 2022 in U.S. Appl. No. 17/453,469.
U.S. Non-Final office Action dated Dec. 21, 2022 in U.S. Appl. No. 17/194,795.
U.S. Non-Final Office Action dated Dec. 28, 2023 in U.S. Appl. No. 18/310,443.
U.S. Non-Final Office Action dated Jan. 11, 2024 in U.S. Appl. No. 18/139,842.
U.S. Non-Final Office Action dated Jan. 24, 2024 in U.S. Appl. No. 17/609,671.
U.S. Non-Final Office Action dated Jul. 20, 2023, in U.S. Appl. No. 17/804,802.
U.S. Non-final Office Action dated Jul. 28, 2022 in U.S. Appl. No. 16/655,032.
U.S. Non-Final Office Action dated Jun. 1, 2023 in U.S. Appl. No. 17/247,662.
U.S. Non-Final office Action dated Mar. 9, 2023 in U.S. Appl. No. 17/909,925.
U.S. Non-Final Office Action dated Nov. 16, 2023 in U.S. Appl. No. 17/194,795.
U.S. Non-Final Office Action dated Oct. 5, 2023, in U.S. Appl. No. 17/576,862.
U.S. Non-Final Office Action dated Oct. 24, 2022, in U.S. Appl. No. 17/486,716.
U.S. Non-Final Office Action dated Oct. 28, 2021 in U.S. Appl. No. 15/733,765.
U.S. Non-Final Office Action dated Oct. 29, 2021 in U.S. Appl. No. 16/527,554.
U.S. Non-Final office Action dated Sep. 1, 2022 in U.S. Appl. No. 17/247,662.
U.S. Non-Final Office Action dated Sep. 29, 2023 in U.S. Appl. No. 17/989,603.
US Non-final Rejection dated Oct. 26, 2021, in U.S. Appl. No. 16/438,177.
US Notice of Allowability (supplemental) dated Sep. 30, 2020 in U.S. Appl. No. 15/123,069.
US Notice of Allowance (corrected) dated Apr. 18, 2019 in U.S. Appl. No. 15/320,725.
US Notice of Allowance dated Apr. 17, 2019 in U.S. Appl. No. 15/534,175.
US Notice of Allowance dated Apr. 17, 2019 in U.S. Appl. No. 15/910,936.
US Notice of Allowance dated Apr. 6, 2020 in U.S. Appl. No. 16/298,776.
U.S. Notice of Allowance dated Apr. 6, 2022, in U.S. Appl. No. 15/733,765.
US Notice of Allowance dated Apr. 9, 2020 in U.S. Appl. No. 15/123,069.
U.S. Notice of Allowance dated Aug. 3, 2023, in U.S. Appl. No. 17/869,725.
U.S. Notice of Allowance dated Aug. 10, 2023, in U.S. Appl. No. 17/301,026.
U.S. Notice of Allowance dated Aug. 23, 2023 in U.S. Appl. No. 17/909,925.
U.S. Notice of Allowance dated Aug. 29, 2023 in U.S. Appl. No. 17/486,716.
US Notice of Allowance dated Dec. 11, 2020 in U.S. Appl. No. 15/727,258.
U.S. Notice of Allowance dated Dec. 12, 2023 in U.S. Appl. No. 17/486,716.
US Notice of Allowance dated Dec. 13, 2018 in U.S. Appl. No. 15/978,029.
U.S. Notice of Allowance dated Dec. 13, 2023 in U.S. Appl. No. 17/247,662.
U.S. Notice of Allowance dated Dec. 13, 2023 in U.S. Appl. No. 17/453,469.
US Notice of Allowance dated Dec. 14, 2018 in U.S. Appl. No. 15/910,936.
U.S. Notice of Allowance dated Dec. 21, 2023 in U.S. Appl. No. 17/909,925.
U.S. Notice of Allowance dated Dec. 29, 2022 in U.S. Appl. No. 16/655,032.
US Notice of Allowance dated Dec. 31, 2020 in U.S. Appl. No. 16/523,624.
US Notice of Allowance dated Dec. 31, 2020 in U.S. Appl. No. 16/555,377.
US Notice of Allowance dated Dec. 7, 2020 in U.S. Appl. No. 16/508,099.
U.S. Notice of Allowance dated Feb. 7, 2023 in U.S. Appl. No. 17/249,442.
U.S. Notice of Allowance dated Feb. 14, 2023 in U.S. Appl. No. 17/355,086.
U.S. Notice of Allowance dated Feb. 16, 2022 in U.S. Appl. No. 16/664,089.
US Notice of Allowance dated Feb. 4, 2021 in U.S. Appl. No. 16/253,971.
U.S. Notice of Allowance dated Jan. 8, 2024 in U.S. Appl. No. 17/989,603.
U.S. Notice of Allowance dated Jan. 30, 2023 in U.S. Appl. No. 17/211,697.
U.S. Notice of Allowance dated Jul. 6, 2023 in U.S. Appl. No. 17/870,480.
US Notice of Allowance dated Jul. 1, 2020 in U.S. Appl. No. 15/623,237.
U.S. Notice of Allowance dated Jul. 13, 2023 in U.S. Appl. No. 17/940,951.
US Notice of Allowance dated Jul. 17, 2019 in U.S. Appl. No. 15/123,069.
US Notice of Allowance dated Jul. 17, 2019 in U.S. Appl. No. 15/320,725.
US Notice of Allowance dated Jul. 25, 2019 in U.S. Appl. No. 15/534,175.
U.S. Notice of Allowance dated Jun. 7, 2023 in U.S. Appl. No. 17/453,469.
U.S. Notice of Allowance dated Jun. 7, 2023 in U.S. Appl. No. 17/870,480.

(56) References Cited

OTHER PUBLICATIONS

U.S Notice of Allowance dated Jun. 8, 2022 in U.S. Appl. No. 15/733,765.
U.S. Notice of Allowance dated Jun. 12, 2023, in U.S. Appl. No. 17/940,951.
US Notice of Allowance dated Jun. 14, 2021 in U.S. Appl. No. 16/338,403.
U.S. Notice of Allowance dated Jun. 16, 2023, in U.S. Appl. No. 17/301,026.
U.S. Notice of Allowance dated Jun. 20, 2022 in U.S. Appl. No. 16/527,554.
US Notice of Allowance dated Mar. 10, 2021 in U.S. Appl. No. 15/691,468.
US Notice of Allowance dated Mar. 11, 2019 in U.S. Appl. No. 14/391,122.
US Notice of Allowance dated Mar. 20, 2019 in U.S. Appl. No. 15/320,725.
US Notice of Allowance dated Mar. 26, 2021 in U.S. Appl. No. 16/254,434.
U.S. Notice of Allowance dated Mar. 31, 2023 in U.S. Appl. No. 17/249,442.
US Notice of Allowance dated Mar. 9, 2018 in U.S. Appl. No. 14/887,178.
U.S. Notice of Allowance dated May 4, 2022 in U.S. Appl. No. 16/438,177.
US Notice of Allowance dated May 13, 2021in U.S. Appl. No. 16/462,916.
US Notice of Allowance dated May 14, 2015 in U.S. Appl. No. 13/479,137.
US Notice of Allowance dated May 14, 2019 in U.S. Appl. No. 15/623,235.
U.S. Notice of Allowance dated May 19, 2023 in U.S. Appl. No. 17/249,442.
U.S. Notice of Allowance dated May 22, 2023 in U.S. Appl. No. 17/486,716.
U.S. Notice of Allowance dated May 23, 2023 in U.S. Appl. No. 17/869,725.
U.S. Notice of Allowance dated May 26, 2023, in U.S. Appl. No. 17/453,469.
US Notice of Allowance dated May 6, 2020 in U.S. Appl. No. 15/623,237.
US Notice of Allowance dated Nov. 28, 2018 in U.S. Appl. No. 15/123,069.
US Notice of Allowance dated Nov. 3, 2020 in U.S. Appl. No. 15/691,468.
US Notice of Allowance dated Oct. 7, 2021 in U.S. Appl. No. 16/664,089.
US Notice of Allowance dated Oct. 14, 2021 in U.S. Appl. No. 16/664,089.
U.S. Notice of Allowance dated Oct. 18, 2021, in U.S. Appl. No. 16/469,848.
US Notice of Allowance dated Oct. 22, 2018 in U.S. Appl. No. 14/951,410.
U.S. Notice of Allowance dated Sep. 20, 2023, in U.S. Appl. No. 17/453,469.
US Notice of Allowance dated Sep. 30, 2020 in U.S. Appl. No. 16/082,793.
US Notice of Allowance (supplemental) dated Jun. 12, 2015 in U.S. Appl. No. 13/479,137.
US Office Action dated Apr. 27, 2018 in U.S. Appl. No. 15/123,069.
US Office Action dated Aug. 21, 2019 in U.S. Appl. No. 16/508,099.
US Office Action dated Aug. 22, 2019 in U.S. Appl. No. 16/298,776.
US Office Action dated Aug. 7, 2018 in U.S. Appl. No. 15/910,936.
US Office Action dated Aug. 7, 2020 in U.S. Appl. No. 16/338,403.
US Office Action dated Feb. 4, 2019 in U.S. Appl. No. 15/623,235.
US Office Action dated Feb. 7, 2019 in U.S. Appl. No. 15/623,237.
US Office Action dated Feb. 7, 2019 in U.S. Appl. No. 15/691,468.
US Office Action dated Jan. 7, 2021 in U.S. Appl. No. 16/469,848.
US Office Action dated Jul. 21, 2020 in U.S. Appl. No. 16/523,624.
US Office Action dated Jul. 21, 2020 in U.S. Appl. No. 16/555,377.
US Office Action dated Jul. 23, 2020 in U.S. Appl. No. 16/508,099.
US Office Action dated Jul. 24, 2018 in U.S. Appl. No. 15/978,029.
US Office Action dated Jul. 25, 2019 in U.S. Appl. No. 16/253,971.
US Office Action dated Jul. 29, 2020 in U.S. Appl. No. 16/253,971.
US Office Action dated Jul. 3, 2014 in U.S. Appl. No. 13/479,137.
US Office Action dated Jul. 6, 2018 in U.S. Appl. No. 15/534,175.
US Office Action dated Jun. 22, 2018 in U.S. Appl. No. 14/391,122.
US Office Action dated Jun. 5, 2020 in U.S. Appl. No. 15/727,258.
US Office Action dated Mar. 25, 2016 in U.S. Appl. No. 14/887,178.
US Office Action dated May 6, 2020 in U.S. Appl. No. 15/691,468.
US Office Action dated Nov. 18, 2016 in U.S. Appl. No. 14/391,122.
US Office Action dated Oct. 11, 2019 in U.S. Appl. No. 15/727,258.
US Office Action dated Oct. 23, 2017 in U.S. Appl. No. 14/887,178.
US Office Action dated Sep. 1, 2017 in U.S. Appl. No. 14/391,122.
US Office Action dated Sep. 11, 2017 in U.S. Appl. No. 14/951,410.
US Office Action dated Sep. 23, 2013 in U.S. Appl. No. 13/479,137.
US Office Action dated Sep. 30, 2020 in U.S. Appl. No. 16/254,434.
US Office Action dated Sep. 4, 2018 in U.S. Appl. No. 15/320,725.
U.S. Appl. No. 16/338,403, inventors Shrivastava et al., filed Mar. 29, 2019.
U.S. Appl. No. 62/102,515, inventors Nagar et al., filed Jan. 12, 2015.
U.S. Appl. No. 62/102,516, inventors Nagar et al., filed Jan. 12, 2015.
U.S. Appl. No. 63/124,673, inventors Tai et al., filed Dec. 11, 2020.
U.S. Appl. No. 63/146,365, inventors Brown et al., filed Feb. 5, 2021.
U.S. Appl. No. 63/163,305, inventors Trikha et al., filed Mar. 19, 2021.
U.S. Appl. No. 63/181,648, inventors Makker et al., filed Apr. 29, 2021.
U.S. Appl. No. 63/187,632, inventors Hur et al., filed May 12, 2021.
U.S. Appl. No. 63/226,127, inventors Lee et al., filed Jul. 21, 2021.
U.S. Appl. No. 63/109,306, Inventors Marquez et al., filed Nov. 3, 2020.
U.S. Appl. No. 63/214,741, inventors Marquez et al., filed Jun. 24, 2021.
U.S. Appl. No. 17/906,052, inventors Khanna et al., filed Sep. 9, 2022.
U.S. Appl. No. 17/909,925, inventors Vangati et al., filed Sep. 7, 2022.
U.S. Appl. No. 17/940,951, inventors Vangati et al., filed Sep. 8, 2022.
U.S. Appl. No. 17/989,603, Inventors Shrivastava et al., filed Nov. 17, 2022.
U.S. Appl. No. 18/037,067, inventors Tai et al., filed May 15, 2023.
U.S. Appl. No. 18/139,842, inventors Shrivastava D, et al., filed Apr. 26, 2023.
U.S. Appl. No. 18/281,913 inventors Trikha N, etaL, filed Sep. 13, 2023.
U.S. Appl. No. 18/410,636, inventor Shrivastava D, filed Jan. 10, 2024.
U.S. Appl. No. 18/417,679, inventors Shrivastava D, et al., filed Jan. 31, 2024.
U.S. Appl. No. 18/555,129, inventors MakkerT, et al., filed Oct. 12, 2023.
U.S. Appl. No. 18/555,275, inventors Hur Yerang et al., filed Oct. 13, 2023.
US Preliminary Amendment dated Jan. 23, 2020 in U.S. Appl. No. 16/469,848.
US Preliminary Amendment dated Dec. 31, 2019 in U.S. Appl. No. 16/608,159.
U.S. Restriction requirement dated May 4, 2023 in U.S. Appl. No. 17/400,596.
U.S. Supplemental Notice of Allowance dated Aug. 1, 2022 in U.S. Appl. No. 17/171,667.
US Supplemental Notice of Allowance dated Feb. 5, 2021 in U.S. Appl. No. 16/082,793.
Woods, D ., "The Alarm Problem and Directed Attention in Dynamic Fault Management.", Ergonomics, 1995, vol. 38, No. 11, pp. 2371-2393.
CN Office Action dated Apr. 11, 2024 in CN Application No. 201980003232.3 with English translation.

(56) References Cited

OTHER PUBLICATIONS

CN Office Action dated Sep. 25, 2024 in CN Application No. 201980003232.3 with English translation.
EP Extended European Search report dated Mar. 6, 2024 in EP Application No. 23214710.8.
EP Extended European Search Report dated May 28, 2024 in EP Application No. 21775725.1.
EP Office Action dated Feb. 21, 2024 in EP Application No. 20729442.2.
EP Office Action dated Jul. 2, 2024 in EP Application No. 19188907.0.
EP Partial Supplementary European Search report dated Mar. 6, 2024, in EP Application No. 21775725.1.
International Preliminary Report on Patentability and Written Opinion dated Feb. 8, 2024 in PCT Application No. PCT/US2022/074162.
International Search Report and Written Opinion dated Jun. 28, 2024 in PCT Application No. PCT/US2024/018692.
JP Office Action dated Feb. 13, 2024 in JP Application No. 2020-560912, with EnglishTranslation.
JP Office Action dated Jun. 11, 2024 in JP Application No. 2021-564914, with English Translation.
KR Office Action dated Aug. 28, 2024 in KR Application No. 10-2021-7040307, with English Translation.
Lee E., et al., "The Design and Evaluation of Integrated Envelope and Lighting Control Strategies for Commercial Buildings," Energy & Environment division, 1994, pp. 1-23.
U.S. Advisory Action dated Aug. 22, 2024 in U.S. Appl. No. 17/194,795.
U.S. Corrected Notice of Allowance dated Aug. 5, 2024 in U.S. Appl. No. 18/310,443.
U.S. Corrected Notice of Allowance dated Aug. 12, 2024 in U.S. Appl. No. 18/139,842.
U.S. Final Office Action dated Mar. 14, 2024 in U.S. Appl. No. 17/247,823.
U.S. Final Office Action dated May 8, 2024 in U.S. Appl. No. 17/194,795.
U.S. Non Final Office Action dated Mar. 21, 2024, in U.S. Appl. No. 17/634,150.
U.S. Non-Final Office Action dated Apr. 24, 2024 in U.S. Appl. No. 18/237,146.
U.S. Non-Final Office Action dated Aug. 5, 2024 in U.S. Appl. No. 18/417,679.
U.S. Non-Final Office Action dated Aug. 15, 2024 in U.S. Appl. No. 18/410,636.
U.S. Non-Final Office Action dated Aug. 28, 2024 in U.S. Appl. No. 18/428,413.
U.S. Non-Final Office Action dated Feb. 23, 2024 in U.S. Appl. No. 17/313,760.
U.S. Non-Final Office Action dated Jun. 12, 2024 in U.S. Appl. No. 17/300,303.
U.S. Non-Final Office Action dated Sep. 24, 2024 in U.S. Appl. No. 17/679,027.
U.S. Non-Final Office Action dated Sep. 26, 2024 in U.S. Appl. No. 18/555,129.
U.S. Notice of Allowance dated Feb. 14, 2024 in U.S. Appl. No. 17/247,662.
U.S. Notice of Allowance dated Feb. 14, 2024 in U.S. Appl. No. 17/989,603.
U.S. Notice of Allowance dated Feb. 28, 2024 in U.S. Appl. No. 17/989,603.
U.S. Notice of Allowance dated Jun. 17, 2024 in U.S. Appl. No. 18/139,842.
U.S. Notice of Allowance dated May 1, 2024 in U.S. Appl. No. 18/310,443.
U.S. Notice of Allowance dated May 10, 2024 in U.S. Appl. No. 17/609,671.
U.S. Notice of Allowance dated May 23, 2024 in U.S. Appl. No. 17/609,671.
U.S. Notice of Allowance dated Oct. 17, 2024 in U.S. Appl. No. 18/237,146.
U.S. Notice of Allowance dated Sep. 11, 2024 in U.S. Appl. No. 17/194,795.
U.S. Notice of Allowance dated Sep. 12, 2024 in U.S. Appl. No. 18/213,843.
U.S. Appl. No. 18/764,727, inventors Shrivastava D, et al., filed Jul. 5, 2024.
U.S. Appl. No. 18/797,037, inventors Brown S.C, et al., filed Aug. 7, 2024.
U.S. Restriction requirement dated Feb. 8, 2024, in U.S. Appl. No. 17/612,992.
Zheng, Z., et al., "Subscription to Multiple Stream Originators, Draft-zhou-netconf-multi-stream-originators-10," Internet Engineering Task Force, 2019, vol. 6, pp. 1-21.

* cited by examiner ently filed Application
ACCESS AND MESSAGING IN A MULTI CLIENT NETWORK

RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

In a communication network having a plurality of diverse client nodes (e.g., of different type), addressing messages to target client(s) may be cumbersome and challenging in terms of labor, security, and/or communication speed. The communication in the network can be facilitated by a publish-subscribe network protocol (e.g., MQTT or AMQP). Some currently used publish-subscribe network protocols are task specific rather than client specific. Such protocols can become increasingly cumbersome (i) the greater the number of devices correlated to a task (e.g., task type), and (ii) the more task types are performed by the various clients. Discovery of existing and/or new clients added to the network has been done manually, which can be slow, expensive, and/or prone to human error.

A private local area network (LAN) interconnecting the diverse node clients in a building may be connected to a public network (e.g., the internet or cloud) via one or more gateways. In order for authorized remote users (e.g., remote client) to access local clients on the LAN while preventing access by unauthorized third parties, various security measures (e.g., encryption using keys and/or user authentication using digital certificates) can be adopted to limit (e.g., prevent) damage that may be caused by unauthorized parties who may try to use the public network connection to access and/or alter the local (e.g., private) clients. For example, when encryption is being used and a third party manages to obtain (e.g., steal) an unauthorized copy of a digital certificate, the third party can cavesdrop on messages involving a client coupled to the network, e.g., in an attempt to break the encryption. The longer the traffic can be monitored by the unauthorized third party, the more data that becomes available to enable breaking the encryption. If the length of time that the unauthorized third party accesses the traffic is shortened, then the ability to break the encryption is curtailed.

SUMMARY

Various aspects disclosed herein alleviate as least part of the above referenced shortcomings related to publish-subscribe network protocols and/or the security of private networks having connections to a public network and/or to third party users.

In an aspect, the invention controls access to a network using a double broker system (e.g., including a commissioning broker and a building broker) that implements short lived access certificates from a local (e.g., secondary) Certificate Authority (CA) for local messaging to a data broker based at least in part on higher tier and/or longer-lived access certificates from a main CA outside the building. The combined two brokers can thus hinder prolonged access (and increasing degree of damage) to the local network by a compromising third party (e.g., unauthorized gathering, deletion, and/or manipulation of (e.g., large) data set). The double broker system may alleviate the process of specific device designation to a particular local network during the manufacturing and/or distribution process for the client node devices, thus simplifying the device commissioning process to a facility.

In an aspect, the invention provides a publish-subscribe network protocol that is client centric rather than task centric, e.g., by providing clients with a unique ID that is part of the addressing protocol. The task centric protocol allows for clients to acknowledge receipt of messages communicated to them through the (e.g., bidirectional) communication network. Such protocol could allow discovery of the clients that are operatively (e.g., communicatively) coupled to the network (e.g., a newly introduced client). Such communication protocol is desirable because it is bandwidth efficient, has low software overhead, low power requirements, and/or can support various network transports (e.g., TCP/IP, Bluetooth). Various levels of encryption can be implemented to achieve secure messaging (e.g., as modifications to existing software) through the network.

In another aspect, a system for message delivery in a network, the system comprises: a network configured for message communication: a first node having an object identification (ID), which first node is configured to: communicatively couple to the network, and receive a message communicated through the network, which message comprises a string (e.g., code) ID that comprises (i) the object ID or (ii) a group ID with which the object ID is associated with: a broker configured to communicatively couple to the network and route the message through the network to the first node, which broker considers the string ID in routing the message to the first node: and a second node configured to communicatively couple to the network and send the message using the network, wherein (I) the first node comprises circuitry, (II) the second node comprises circuitry, (II) the broker comprises circuitry, and/or (III) the network comprises a cable.

In some embodiments, the second node compiles the message. In some embodiments, the object ID and/or the group ID are in a routing address of the message. In some embodiments, the routing address comprises a logical ID that identifies at least one service of a node. In some embodiments, the routing address comprises a logical ID that is dynamically assigned. In some embodiments, the routing address comprises a logical ID that differentiates service instances of the same type. In some embodiments, the message comprises a routing address and a message data. In some embodiments, the first node is configured to send a confirmation confirming receipt of the message. In some embodiments, the confirmation is sent to the second node and/or to a router. In some embodiments, the object ID of the first node is a first object ID. In some embodiments, the data of the message comprises (i) a message header that comprises a second object ID of the second node, and/or (ii) a message content that comprises one or more values. In some embodiments, the message comprises several encryption levels. In some embodiments, data of the message comprises (i) a message header having a first encryption level, and (ii) a message content that comprises a second encryption level higher than the first encryption level. In some embodiments, the group is organized by proximity location, location in a facility portion, node type, connectivity, utilization, or assembly group. In some embodiments, the message comprises an acknowledgement, a request, or an announcement. In some embodiments, the message is sent to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or second node is a controller or is a portion of a controller. In some embodiments, the controller is part of a hierarchal control system. In some embodiments, the controller comprises a control scheme comprising a feedback, a feed forward, a close loop, or an open loop control scheme. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a method for message delivery in a network, the method comprises: (a) routing a message from a first node to a broker, which message (i) is intended for a second node and (ii) comprises a string identification (ID) comprising an object ID of the second node, or a group ID with which the second node is associated with; (b) receiving the message by the broker; and (c) using the broker to route the message to the second node by considering the object ID of the second node.

In some embodiments, the method further comprises using the first node to compile the message. In some embodiments, the object ID and/or the group ID are in a routing address of the message. In some embodiments, the method further comprises identifying at least one service of the second node in a logical ID delineated in the routing address. In some embodiments, the method further comprises dynamically assigning a logical ID of the second node, which logical ID is delineated in the routing address. In some embodiments, the method further comprises differentiating service instances of the same type in a logical ID of the second node, which logical ID is delineated in the routing address. In some embodiments, the message comprises (i) a routing address and (ii) a message data. In some embodiments, the method further comprises using the second node to send a confirmation confirming receipt of the message. In some embodiments, sending the confirmation is to the first node and/or to a router. In some embodiments, the object ID of the second node is a second object ID. In some embodiments, the data of the message comprises (i) a message header that comprises a first object ID of the first node, and/or (ii) a message content that comprises one or more values. In some embodiments, the message comprises several encryption levels. In some embodiments, data of the message comprises (i) a message header having a first encryption level, and (ii) a message content that comprises a second encryption level higher than the first encryption level. In some embodiments, the group is organized by proximity location, location in a facility portion, node type, connectivity, utilization, or assembly group. In some embodiments, the message comprises an acknowledgement, a request, or an announcement. In some embodiments, the message is routed to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or the second node is a controller or is a portion of a controller. In some embodiments, the controller is part of a hierarchal control system. In some embodiments, the method further comprises controlling one or more devices using the first node and/or the second node. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a non-transitory computer readable program instructions (e.g., embedded in one or more program products such as media or medium) for message delivery in a network, which non-transitory computer program instructions contains instructions inscribed thereon which, when executed by one or more processors, cause the one or more processors to execute operations, comprises: (a) routing a message from a first node to a broker, which message (i) is intended for a second node and (ii) comprises a string identification (ID) comprising an object ID of the second node, or a group ID with which the second node is associated with; (b) receiving the message by the broker; and (c) using the broker to route the message to the second node by considering the object ID of the second node.

In some embodiments, the executed operations comprise using the first node to compile the message. In some embodiments, the object ID and/or the group ID are in a routing address of the message. In some embodiments, the executed operations comprise identifying at least one service of the second node in a logical ID delineated in the routing address. In some embodiments, the executed operations comprise dynamically assigning a logical ID of the second node, which logical ID is delineated in the routing address. In some embodiments, the executed operations comprise differentiating service instances of the same type in a logical ID of the second node, which logical ID is delineated in the routing address. In some embodiments, the message comprises (i) a routing address and (ii) a message data. In some embodiments, the executed operations comprise using the second node to send a confirmation confirming receipt of the message. In some embodiments, the executed operations comprise sending the confirmation to the first node and/or to a router. In some embodiments, the object ID of the second node is a second object ID. In some embodiments, the data of the message comprises (i) a message header that comprises a first object ID of the first node, and/or (ii) a message content that comprises one or more values. In some embodiments, the message comprises several encryption levels. In some embodiments, data of the message comprises (i) a message header having a first encryption level, and (ii) a message content that comprises a second encryption level higher than the first encryption level. In some embodiments, the group is organized by proximity location, location in a facility portion, node type, connectivity, utilization, or assembly group. In some embodiments, the message comprises an acknowledgement, a request, or an announcement. In some embodiments, the message is routed to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or the second node is a controller or is a portion of a controller. In some embodiments, the controller is part of a hierarchal control system. In some embodiments, the executed operations comprise controlling one or more devices using the first node and/or the second node. In some embodiments, at least two of the operations are executed sequentially. In some embodiments, at least two of the operations are executed concurrently at least in part (e.g., overlap in time during their execution). In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a system for operating a device of a facility, the system comprises: a network configured for message communication; a first node comprising circuitry and having an object identification (ID), which first node is configured to: (I) communicatively couple to the network, and (II) receive a message communicated through the network, which message comprises a string ID that comprises (i) the object ID or (ii) a group ID with which the object ID is associated with, which first node is configured to operate, or direct operation of, a device of the facility by using the message that is routed to the first node by considering the string ID; and a second node configured to communicatively couple to the network and send the message to the first node by using the network.

In some embodiments, the system further comprises a broker configured to communicatively couple to the network and route the message through the network to the first node, which broker considers the string ID in routing the message to the first node. In some embodiments, the second node compiles the message. In some embodiments, the object ID and/or the group ID are in a routing address of the message. In some embodiments, the routing address comprises a logical ID that identifies at least one service of a node. In some embodiments, the routing address comprises a logical ID that is dynamically assigned. In some embodiments, the routing address comprises a logical ID that differentiates service instances of the same type. In some embodiments, the message comprises a routing address and a message data. In some embodiments, the first node is configured to send a confirmation confirming receipt of the message. In some embodiments, the confirmation is sent to the second node and/or to a router. In some embodiments, the object ID of the first node is a first object ID. In some embodiments, the data of the message comprises (i) a message header that comprises a second object ID of the second node, and/or (ii) a message content that comprises one or more values. In some embodiments, the message comprises several encryption levels. In some embodiments, data of the message comprises (i) a message header having a first encryption level, and (ii) a message content that comprises a second encryption level higher than the first encryption level. In some embodiments, the group is organized by proximity location, location in a facility portion, node type, connectivity, utilization, or assembly group. In some embodiments, the message comprises an acknowledgement, a request, or an announcement. In some embodiments, the message is sent to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or second node is a controller or is a portion of a controller. In some embodiments, the controller is part of a hierarchal control system. In some embodiments, the controller comprises a control scheme comprising a feedback, a feed forward, a close loop, or an open loop control scheme.

In another aspect, a method for operating a device of a facility, the method comprises: (a) sending a message from a first node to a second node, which message is communicated through a network, which second node has an object identification (ID), which message comprises a string ID that comprises (i) the object ID or (ii) a group ID with which the object ID is associated with; and (b) using the message to operate a device of the facility, which device is coupled to, or includes, the second node. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In some embodiments, the method further comprises using the first node to compile the message. In some embodiments, the object ID and/or the group ID are in a routing address of the message. In some embodiments, the method further comprises identifying at least one service of the second node in a logical ID delineated in the routing address. In some embodiments, the method further comprises dynamically assigning a logical ID of the second node, which logical ID is delineated in the routing address. In some embodiments, the method further comprises differentiating service instances of the same type in a logical ID of the second node, which logical ID is delineated in the routing address. In some embodiments, the message comprises (i) a routing address and (ii) a message data. In some embodiments, the method further comprises using the second node to send a confirmation confirming receipt of the message. In some embodiments, sending the confirmation is to the first node and/or to a router. In some embodiments, the object ID of the second node is a second object ID. In some embodiments, the data of the message comprises (i) a message header that comprises a first object ID of the first node, and/or (ii) a message content that comprises one or more values. In some embodiments, the message comprises several encryption levels. In some embodiments, data of the message comprises (i) a message header having a first encryption level, and (ii) a message content that comprises a second encryption level higher than the first encryption level. In some embodiments, the group is organized by proximity location, location in a facility portion, node type, connectivity, utilization, or assembly group. In some embodiments, the message comprises an acknowledgement, a request, or an announcement. In some embodiments, the message is routed to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or the second node is a controller or is a portion of a controller. In some embodiments, the controller is part of a hierarchal control system. In some embodiments, the method further comprises controlling one or more devices using the first node and/or the second node. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a non-transitory computer readable program instructions (e.g., embedded in one or more program products such as media or medium) for message delivery in a network, which non-transitory computer program instructions, when executed by one or more processors, cause the one or more processors to execute operations, comprises: (a) sending a message from a first node to a second node, which message is communicated through a network, which second node has an object identification (ID), which message comprises a string ID that comprises (i) the object ID or (ii) a group ID with which the object ID is associated with; and (b) using the message to operate a device of the facility, which device is coupled to, or includes, the second node.

In some embodiments, the executed operations comprise using the first node to compile the message. In some embodiments, the object ID and/or the group ID are in a routing address of the message. In some embodiments, the executed operations comprise identifying at least one service of the second node in a logical ID delineated in the routing address. In some embodiments, the executed operations comprise dynamically assigning a logical ID of the second node, which logical ID is delineated in the routing address. In some embodiments, the executed operations comprise differentiating service instances of the same type in a logical ID of the second node, which logical ID is delineated in the routing address. In some embodiments, the message comprises (i) a routing address and (ii) a message data. In some embodiments, the executed operations comprise using the second node to send a confirmation confirming receipt of the message. In some embodiments, the executed operations comprise sending the confirmation to the first node and/or to a router. In some embodiments, the object ID of the second node is a second object ID. In some embodiments, the data of the message comprises (i) a message header that comprises a first object ID of the first node, and/or (ii) a message content that comprises one or more values. In some embodiments, the message comprises several encryption levels. In some embodiments, data of the message comprises (i) a message header having a first encryption level, and (ii) a message content that comprises a second encryption level higher than the first encryption level. In some embodiments, the group is organized by proximity location, location in a facility portion, node type, connectivity, utilization, or assembly group. In some embodiments, the message comprises an acknowledgement, a request, or an announcement. In some embodiments, the message is routed to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or the second node is a controller or is included in (e.g., is a portion of) a controller. In some embodiments, the controller is part of a hierarchal control system. In some embodiments, the executed operations comprise controlling one or more devices using the first node and/or the second node. In some embodiments, at least two of the operations are executed sequentially. In some embodiments, at least two of the operations are executed concurrently at least in part (e.g., overlap in time during their execution). In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a system for message delivery in a network, the system comprises: a network configured for message communication; a first node having a first object identification (ID), which first node is configured to: (I) communicatively couple to the network, (II) receive a message communicated through the network, which message comprises (i) the first object ID or (ii) a group ID with which the first object ID is associated with, and (III) send an acknowledgement for receiving the message; and a second node configured to communicatively couple to the network and send the message using the network, which message comprises a second ID of the second node, wherein (a) the first node comprises circuitry, (b) the second node comprises circuitry, (c) the broker comprises circuitry, and/or (d) the network comprises a cable.

In some embodiments, the first node is configured to send the acknowledgement to the second node. In some embodiments, the first node is configured to send the acknowledgement to a broker that mediates messages sent between the second node and the first node. In some embodiments, the second node compiles the message. In some embodiments, the object ID and/or the group ID are in a routing address of the message. In some embodiments, the routing address comprises a logical ID that identifies at least one service of a node. In some embodiments, the routing address comprises a logical ID that is dynamically assigned. In some embodiments, the routing address comprises a logical ID that differentiates service instances of the same type. In some embodiments, the message comprises a routing address and a message data. In some embodiments, the first node is configured to send a confirmation confirming receipt of the message. In some embodiments, the confirmation is sent to the second node and/or to a router. In some embodiments, the object ID of the first node is a first object ID. In some embodiments, the data of the message comprises (i) a message header that comprises a second object ID of the second node, and/or (ii) a message content that comprises one or more values. In some embodiments, the message comprises several encryption levels. In some embodiments, data of the message comprises (i) a message header having a first encryption level, and (ii) a message content that comprises a second encryption level higher than the first encryption level. In some embodiments, the group is organized by proximity location, location in a facility portion, node type, connectivity, utilization, or assembly group. In some embodiments, the message comprises a request, or an announcement. In some embodiments, the message is sent to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or second node is a controller or is included in (e.g., is a portion of) a controller. In some embodiments, the controller is part of a hierarchal control system. In some embodiments, the controller comprises a control scheme comprising a feedback, a feed forward, a close loop, or an open loop control scheme. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a method for message delivery in a network, the method comprises: (a) routing a message from a first node to a second node, which message comprises: (i) a first object ID of the first node and (ii) a second object ID of the second node or a group ID with which the second node is associated with; (b) receiving the message by the second node; and (c) using the second node to issue an acknowledgement of the message received by the second node.

In some embodiments, the second node routes the acknowledgement to the first node. In some embodiments, the first node routes the acknowledgement to a broker that mediates any messages sent between the second node and the first node. In some embodiments, the method further comprises using the first node to compile the message. In some embodiments, the object ID and/or the group ID are in a routing address of the message. In some embodiments, the method further comprises identifying at least one service of the second node in a logical ID delineated in the routing address. In some embodiments, the system further comprises dynamically assigning a logical ID of the second node, which logical ID is delineated in the routing address. In some embodiments, the method further comprises differentiating service instances of the same type in a logical ID of the second node, which logical ID is delineated in the routing address. In some embodiments, the message comprises (i) a routing address and (ii) a message data. In some embodiments, the method further comprises using the second node to send a confirmation confirming receipt of the message. In some embodiments, sending the confirmation is to the first node and/or to a router. In some embodiments, the object ID of the second node is a second object ID. In some embodiments, the data of the message comprises (i) a message header that comprises a first object ID of the first node, and/or (ii) a message content that comprises one or more values. In some embodiments, the message comprises several encryption levels. In some embodiments, data of the message comprises (i) a message header having a first encryption level, and (ii) a message content that comprises a second encryption level higher than the first encryption level. In some embodiments, the group is organized by proximity location, location in a facility portion, node type, connectivity, utilization, or assembly group. In some embodiments, the message comprises a request, or an announcement. In some embodiments, the message is routed to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or the second node is a controller or is included in (e.g., a portion of) a controller. In some embodiments, the controller is part of a hierarchal control system. In some embodiments, the method further comprises controlling one or more devices using the first node and/or the second node. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a non-transitory computer readable program instructions (e.g., embedded in one or more program products such as media or medium) for message delivery in a network, which non-transitory computer program instructions (e.g., program product containing instructions inscribed thereon which), when executed by one or more processors, cause the one or more processors to execute operations, comprises: (a) routing a message from a first node to a second node, which message comprises: (i) a first object ID of the first node and (ii) a second object ID of the second node or a group ID with which the second node is associated with; (b) receiving the message by the second node; and (c) using the second node to issue an acknowledgement of the message received by the second node.

In some embodiments, the executed operations comprise routing the acknowledgement from the second node to the first node. In some embodiments, the executed operations comprise routing the acknowledgement to a broker that mediates any messages sent between the second node and the first node. In some embodiments, the executed operations comprise using the first node to compile the message. In some embodiments, the object ID and/or the group ID are in a routing address of the message. In some embodiments, the executed operations comprise identifying at least one service of the second node in a logical ID delineated in the routing address. In some embodiments, the executed operations comprise dynamically assigning a logical ID of the second node, which logical ID is delineated in the routing address. In some embodiments, the executed operations comprise differentiating service instances of the same type in a logical ID of the second node, which logical ID is delineated in the routing address. In some embodiments, the message comprises (i) a routing address and (ii) a message data. In some embodiments, the executed operations comprise using the second node to send a confirmation confirming receipt of the message. In some embodiments, the executed operations comprise sending the confirmation to the first node and/or to a router. In some embodiments, the object ID of the second node is a second object ID. In some embodiments, the data of the message comprises (i) a message header that comprises a first object ID of the first node, and/or (ii) a message content that comprises one or more values. In some embodiments, the message comprises several encryption levels. In some embodiments, data of the message comprises (i) a message header having a first encryption level, and (ii) a message content that comprises a second encryption level higher than the first encryption level. In some embodiments, the group is organized by proximity location, location in a facility portion, node type, connectivity, utilization, or assembly group. In some embodiments, the message comprises a request, or an announcement. In some embodiments, the message is routed to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or the second node is a controller or is included in (e.g., is a portion of) a controller. In some embodiments, the controller is part of a hierarchal control system. In some embodiments, the executed operations comprise controlling one or more devices using the first node and/or the second node. In some embodiments, at least two of the operations are executed sequentially. In some embodiments, at least two of the operations are executed concurrently at least in part (e.g., overlap in time during their execution). In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a system for message delivery in a network, the system comprises: a network configured for message communication; a first node having a first object identification (ID), which first node is configured to: (A) communicatively couple to the network, and (B) receive a message communicated through the network; a second node having a second object ID, which first node is configured to:

(I) communicatively couple to the network, and (II) receive the message communicated through the network, which message comprises: (i) the first object ID of the first node in a header of the message having a first encryption level and (ii) the second object ID of the second node in a routing address, and (ii) a content of the message having a second encryption level higher than the first encryption level; a broker configured to communicatively couple to the network and route the message through the network from the first node the second node, which broker is unauthorized for the second encryption level is unable to decipher the content of the message, wherein (a) the first node comprises circuitry, (b) the second node comprises circuitry, (c) the broker comprises circuitry, and/or (d) the network comprises a cable.

In some embodiments, the second node is configured to send an acknowledgement to the first node upon or after receipt of the message. In some embodiments, the second node is configured to send an acknowledgement to the broker upon or after receipt of the message. In some embodiments, the second node compiles the message. In some embodiments, the object ID and/or the group ID are in a routing address of the message. In some embodiments, the routing address comprises a logical ID that identifies at least one service of a node. In some embodiments, the routing address comprises a logical ID that is dynamically assigned. In some embodiments, the routing address comprises a logical ID that differentiates service instances of the same type. In some embodiments, the message comprises a routing address and a message data. In some embodiments, the first node is configured to send a confirmation confirming receipt of the message. In some embodiments, the confirmation is sent to the second node and/or to a router. In some embodiments, the object ID of the first node is a first object ID. In some embodiments, the data of the message comprises (i) a message header that comprises a second object ID of the second node, and/or (ii) a message content that comprises one or more values. In some embodiments, the group is organized by proximity location, location in a facility portion, node type, connectivity, utilization, or assembly group. In some embodiments, the message comprises an acknowledgement, a request, or an announcement. In some embodiments, the message is sent to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or second node is a controller or is included in (e.g., is a portion of) a controller. In some embodiments, the controller is part of a hierarchal control system. In some embodiments, the controller comprises a control scheme comprising a feedback, a feed forward, a close loop, or an open loop control scheme. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g, cabling) network installed in an envelope of the facility (e.g., in an envelope of a building included in the facility).

In another aspect, a method for message delivery in a network, the method comprises: (a) routing a message from a first node to a second node through a broker, which message comprises: (i) a first object ID of the first node in a header of the message having a first encryption level and (ii) a second object ID of the second node in a routing address, and (ii) a content of the message having a second encryption level higher than the first encryption level; (b) receiving the message by the broker that is unauthorized for the second encryption level; and (c) using the broker to route the message to the second mode, which broker is unable to decipher the content of the message.

In some embodiments, the second node routes an acknowledgement to the first node upon or after receipt of the message. In some embodiments, upon or after receipt of the message, the first node routes an acknowledgement to a broker that mediates any messages sent between the second node and the first node. In some embodiments, the method further comprises using the first node to compile the message. In some embodiments, the object ID and/or the group ID are in a routing address of the message. In some embodiments, the method further comprises identifying at least one service of the second node in a logical ID delineated in the routing address. In some embodiments, the method further comprises dynamically assigning a logical ID of the second node, which logical ID is delineated in the routing address. In some embodiments, the method further comprises differentiating service instances of the same type in a logical ID of the second node, which logical ID is delineated in the routing address. In some embodiments, the message comprises (i) a routing address and (ii) a message data. In some embodiments, the method further comprises using the second node to send a confirmation confirming receipt of the message. In some embodiments, sending the confirmation is to the first node and/or to a router. In some embodiments, the object ID of the second node is a second object ID. In some embodiments, the data of the message comprises (i) a message header that comprises a first object ID of the first node, and/or (ii) a message content that comprises one or more values. In some embodiments, the group is organized by proximity location, location in a facility portion, node type, connectivity, utilization, or assembly group. In some embodiments, the message comprises an acknowledgement, a request, or an announcement.

In some embodiments, the message is routed to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or the second node is a controller or is included in (e.g., is a portion of) a controller. In some embodiments, the controller is part of a hierarchal control system. In some embodiments, the method further comprises controlling one or more devices using the first node and/or the second node. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a non-transitory computer readable program instructions (e.g., embedded in one or more program products such as media or medium) for message delivery in a network, which non-transitory computer program instructions (e.g., embedded in program product(s) that contain instructions inscribed thereon which), when executed by one or more processors, cause the one or more processors to execute operations, comprises: (a) routing a message from a first node to a second node through a broker, which message comprises: (i) a first object ID of the first node in a header of the message having a first encryption level and (ii) a second object ID of the second node in a routing address, and (ii) a content of the message having a second encryption level higher than the first encryption level; (b) receiving the message by the broker that is unauthorized for the second encryption level; and (c) using the broker to route the message to the second mode, which broker is unable to decipher the content of the message.

In some embodiments, the executed operations comprise routing an acknowledgement from the second node to the first node upon or after receipt of the message. In some embodiments, upon or after receipt of the message, the executed operations comprise routing an acknowledgement to a broker that mediates any messages sent between the second node and the first node. In some embodiments, the executed operations comprise using the first node to compile the message. In some embodiments, the object ID and/or the group ID are in a routing address of the message. In some embodiments, the executed operations comprise identifying at least one service of the second node in a logical ID delineated in the routing address. In some embodiments, the executed operations comprise dynamically assigning a logical ID of the second node, which logical ID is delineated in the routing address. In some embodiments, the executed operations comprise differentiating service instances of the same type in a logical ID of the second node, which logical ID is delineated in the routing address. In some embodiments, the message comprises (i) a routing address and (ii) a message data. In some embodiments, the executed operations comprise using the second node to send a confirmation confirming receipt of the message. In some embodiments, the executed operations comprise sending the confirmation to the first node and/or to a router. In some embodiments, the object ID of the second node is a second object ID. In some embodiments, the data of the message comprises (i) a message header that comprises a first object ID of the first node, and/or (ii) a message content that comprises one or more values. In some embodiments, the group is organized by proximity location, location in a facility portion, node type, connectivity, utilization, or assembly group. In some embodiments, the message comprises an acknowledgement, a request, or an announcement. In some embodiments, the message is routed to a single node, a plurality of nodes in a group of nodes. In some embodiments, the group includes all the nodes communicatively coupled to the network, or a portion of the nodes communicatively coupled to the network. In some embodiments, the first node and/or the second node is a device or a non-transitory computer readable program instructions (e.g., embedded in one or more program products such as media or medium). In some embodiments, the device comprises a sensor, an emitter, an antenna, or a tintable window. In some embodiments, the device comprises lighting, a heater, a cooler, a vent, an audio device, a heating ventilation and air conditioning system. In some embodiments, the audio device comprises a loudspeaker or a microphone. In some embodiments, the network comprises a building management system. In some embodiments, the network is disposed in a facility. In some embodiments, the network comprises a cable that includes a twisted cable, coaxial cable, and/or optical cable. In some embodiments, the network is disposed in the envelope of the building, in an electrical shaft, communication shaft, elevator shaft, and/or in an electrical room. In some embodiments, the circuitry is included in a processor. In some embodiments, the first node and/or the second node is a controller or is included in (e.g., is a portion of) a controller. In some embodiments, the controller is part of a hierarchal control system. In some embodiments, the executed operations comprise controlling one or more devices using the first node and/or the second node. In some embodiments, at least two of the operations are executed sequentially. In some embodiments, at least two of the operations are executed concurrently at least in part (e.g., overlap in time during their execution). In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, the present disclosure provides a system configured to be connected as a node within a network for exchanging messages with other nodes in the network via a publish-subscribe messaging system having a broker. In some embodiments, the circuitry of the controller is configured to (a) store a unique object ID corresponding to the node, and (b) exchange a message with the broker. In some embodiments, the message includes a topic string stored in the broker comprising an address flag sub-topic segment and an ID sub-topic segment compliant with a topic format of the broker. In some embodiments, the address flag sub-topic segment provides an object flag indicating that the ID sub-topic segment has a device value identifying a node in the network for peer-to-peer exchange of the message. In some embodiments, the device value can be comprised of the unique object ID corresponding to the node, and/or the device value can be comprised of another unique object ID corresponding to one of the other nodes. In some embodiments, the topic string includes a logical ID sub-topic segment identifying one of a plurality of services available on the node identified by the device value. The device value can include a MAC address. In some embodiments, the address flag sub-topic segment can provide a group flag indicating that the ID sub-topic segment has a group value identifying a group of nodes in the network for exchanging the message. In some embodiments, the topic string includes an acknowledgement sub-topic segment, and the message provides acknowledgement of receipt of an earlier message. The message can further include message data which includes a header comprising source address information corresponding to a source node of the message. In some embodiments, the source address information includes a logical identifier (logical ID) corresponding to one of a plurality of services available on the source node. The message header can comprise destination address information corresponding to a destination node of the message, and the destination address information can include a logical identifier corresponding to one of a plurality of services available on the destination node. At least a portion of the header can be encrypted. In some embodiments, the circuitry is further configured to (c) send a broadcast message to the messaging system requesting acknowledgement, and (d) receive acknowledgement messages to discover the other nodes and a plurality of services available from the other nodes. In some examples, the circuitry is configured to send a subscribe message to the broker to subscribe to a topic comprised of the topic string. The messaging system can be comprised of a message queuing telemetry transport (MQTT) messaging system or an advanced message queuing protocol (AMQP) messaging system. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, the invention provides a method for exchanging messages between a node within a network with other nodes in the network via a publish-subscribe messaging system having a broker, comprising: (a) storing a unique object ID corresponding to the node, and (b) exchanging a message with the broker. In some embodiments, the message includes a topic string stored in the broker comprising an address flag sub-topic segment and an ID sub-topic segment compliant with a topic format of the broker.

In another aspect, the invention provides system configured to be connected as a node within a network for sending messages to other nodes in the network via a publish-subscribe messaging system having a broker. In some embodiments, the system comprises circuitry configured to (a) store a destination ID corresponding to at least one of the other nodes, and (b) assemble a message including a topic string comprising an address flag sub-topic segment and an ID sub-topic segment compliant with a topic format of the broker, wherein the ID sub-topic segment includes the destination ID; and (c) publish the message to the broker.

In another aspect, the present disclosure provides a system configured to be connected as a node within a network for exchanging messages with other nodes in the network via a publish-subscribe messaging system having a broker. In some embodiments, the system comprises circuitry configured to (a) store a unique object ID corresponding to the node, (b) send a subscribe message to the broker to subscribe to a topic having a topic string comprising an address flag sub-topic segment and an ID sub-topic segment compliant with a topic format of the broker. In some embodiments, the ID sub-topic element comprises the unique object ID corresponding to the node, and (c) receive published messages from the broker that have been published to the broker by the other nodes using the topic string.

In another aspect, the present disclosure provides a method for brokering messages in a broker coupled to nodes in a network according to a publish-subscribe messaging protocol, comprising (a) receiving subscribe messages from nodes, wherein each subscribe message includes a topic string comprising an address flag sub-topic segment and an ID sub-topic segment compliant with the protocol, wherein when the address flag sub-topic segment has an object flag then the ID sub-topic includes a unique object ID corresponding to a respective node sending the respective subscribe message, (b) establishing a topic according to the received topic strings, (c) receiving published messages from the nodes which are published to the established topics, and (d) distributing the published messages according to the respective ID sub-topic of the published messages.

In another aspect, a method of controlling access to a local network comprises: (A) using a commissioning broker and/or a local certification authority to issue a second tier certificate to a client seeking entry into the local network at least in part by verifying (i) an identity of the client included in a first tier certificate and (ii) a first permission of the client to enter the local network, which first tier certificate is provided to the client by a certificate authority outside the local network and for a period having a first expiration time, which second tier certificate allows the client a limited access to the local network by accessing a data broker of the local network, which second tier certificate is issued for a period having a second expiration time shorter than the first expiration time; and (B) using the data broker to issue a second permission to the client at least in part by verifying the second tier certificate, which second permission allows the client an expanded access to the local network as compared to the first permission, which second permission expires at the second expiration time.

In some embodiments, the method further comprises using the commissioning broker to block the client from entering into the local network beyond the commissioning broker, before the client receives the second tier certificate. In some embodiments, the method further comprises using the data broker to block the client from entering into the local network beyond the data broker, before the client receives the second permission. In some embodiments, the commissioning broker and the local certification authority are included in one entity. In some embodiments, the commissioning broker and the local certification authority are included in different entities. In some embodiments, the method further comprises using the commissioning broker to verify (i) an identity of the client included in a first tier certificate and/or (ii) a first permission of the client to enter the local network. In some embodiments, the method further comprises using the local certification authority to verify (i) an identity of the client included in a first tier certificate and/or (ii) a first permission of the client to enter the local network. In some embodiments, the method further comprises using the local certification authority to issue the second tier certificate to the client seeking entry into the local network. In some embodiments, the second tier certificate includes a local authorization. In some embodiments, the second tier certificate comprises a local authentication by the commissioning broker. In some embodiments, the commissioning broker serves as a local certificate authority. In some embodiments, the commissioning broker is a first controller and/or data broker is a second controller. In some embodiments, the local network includes a plurality of clients operatively coupled to the local network, and wherein the method further comprises exchanging messages between the client seeking entry into the local network and the plurality of clients via the data broker. In some embodiments, the method further comprises using a publish-subscribe network protocol to exchange the messages. In some embodiments, the local network is disposed in a facility, and wherein the plurality of clients includes a sensor, an emitter, an actuator, a controller, and/or a processor. In some embodiments, the controller comprises a microcontroller. In some embodiments, the first permission is granted according to the client seeking entry being listed is a list and/or ledger of clients configured to be given access to the local network. In some embodiments, the second tier certificate is comprised of a local first tier certificate. In some embodiments, the second tier certificate only allows the client access to the data broker. In some embodiments, verifying the second tier certificate by the data broker is comprised of (i) verifying an authenticity of the second tier certificate and (ii) ascertaining that the second tier certificate has not exceeded its second expiration time. In some embodiments, the method further comprises the data broker exchanging data messages with the client after the data broker verifies (i) an identity of the client included in the second permission, (ii) an identity and/or privileges of the client to access the data broker, and (iii) that the second tier certificate has not exceeded its second expiration time. In some embodiments, the expanded access includes permission to access the local network beyond the data broker. In some embodiments, the method further comprises using the commissioning broker to issue another second tier certificate to the client seeking another entry into the local network, after the second permission expires at the second expiration time. In some embodiments, the certificate authority outside the local network is associated with a primary manufacturer of the client seeking entry, which primary manufacturer issues a root certificate included in the first tier certificate. In some embodiments, the commissioning broker issues the second tier certificate at least in part by verifying the root certificate. In some embodiments, the certificate authority outside the local network comprises a subordinate manufacturer of the client seeking entry, which subordinate manufacturer issues a manufacturing certificate included in the first tier certificate, which subordinate manufacturer is subordinate to the primary manufacturer. In some embodiments, the manufacturing certificate comprises the root certificate. In some embodiments, the commissioning broker issues the second tier certificate at least in part by verifying the root certificate. In some embodiments, the certificate authority outside the local network is associated with a manufacturing facility. In some embodiments, the client is provided and/or manufactured by an establishment generating and/or maintaining the local network. In some embodiments, the client is provided and/or manufactured by an establishment different from the establishment generating and/or maintaining the local network. In some embodiments, the method further comprises authenticating messages among the certification authority outside the local network, the commissioning broker within the local network, and the data broker within the local network, wherein authenticating the messages is based at least in part on one or more certificates (i) issued by the certification authority and/or (i) which are verified based at least in part on a root certificate. In some embodiments, the method further comprises authenticating messages among the certification authority, the commissioning broker, and the client seeking entry, wherein authenticating the messages is based at least in part on the first tier certificate issued by the certification authority to the client. In some embodiments, the method further comprises authenticating messages between the client and the local certification authority in the local network via the commissioning broker, to provide the second tier certificate to the client, wherein authenticating the messages is based at least in part on the first tier certificate. In some embodiments, the method further comprises authenticating messages between the client and at least one of a plurality of other clients via the data broker based at least in part on the second tier certificate. In some embodiments, the local network comprises a control system which controls at least one apparatus in a facility in which the local network is disposed and/or which the local network services. In some embodiments, the control system comprises a hierarchy of controllers. In some embodiments, the at least one apparatus includes the client seeking entry.

In some embodiments, the at least one apparatus includes a client operatively coupled to the local network. In some embodiments, the at least one apparatus comprises a lighting device, a tintable window, a sensor, an emitter, a media display, a dispenser, a processor, a controller, a headend, a radar, an antenna, a power source, a security system, a fire alarm system, a sound media, a heater, a cooler, a vent, or a heating ventilation and air conditioning system (HVAC). In some embodiments, the at least one apparatus comprises a target of the client. In some embodiments, the at least one apparatus comprises an internal client that is internal to the local network. In some embodiments, the at least one apparatus comprises a device ensemble comprising (i) a plurality of sensors or (ii) a sensor and an emitter. In some embodiments, the control system comprises a building management system. In some embodiments, the control system comprises a plurality of controllers residing locally in the facility and/or remote from the facility. In some embodiments, remotely comprise cloud computing. In some embodiments, the control system comprises a database saving information pertinent to control of the at least one apparatus. In some embodiments, the local network is configured for (i) power and data transmission on a cable, and/or (ii) installation on an envelope structure of a facility in which the local network is disposed and/or which the local network services. In some embodiments, the data comprises (i) at least a fourth generation (4G) or a fifth generation (5G) cellular communication protocol, (ii) media, and/or (iii) control protocol. In some embodiments, the local network is configured for wired and/or communication. In some embodiments, the local network includes coaxial and/or optical cables. In some embodiments, the local network is configured to facilitate adjustment of an internal environment of a facility in which the local network is disposed and/or which the local network services. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, an apparatus for controlling access to a local network comprises at least one controller comprising circuitry, which at least one controller is configured to: (A) operatively couple to a commissioning broker and/or a local certification authority, a data broker, a client, and to the local network; (B) use, or direct usage of, the commissioning broker and/or a local certification authority to issue a second tier certificate to the client seeking entry into the local network at least in part by verifying (i) an identity of the client included in a first tier certificate and (ii) a first permission of the client to enter the local network which first tier certificate is provided to the client by a certificate authority outside the local network and for a period having a first expiration time, which second tier certificate allows the client a limited access to the local network by accessing the data broker of the local network, which second tier certificate is issued for a period having a second expiration time shorter than the first expiration time; and (C) use, or direct usage of, the data broker to issue a second permission to the client at least in part by verifying the second tier certificate, which second permission allows the client an expanded access to the local network as compared to the first permission, which second permission expires at the second expiration time.

In some embodiments, the at least one controller is configured to use, or direct usage of, the commissioning broker to block the client from entering into the local network beyond the commissioning broker, before the client receives the second tier certificate. In some embodiments, the at least one controller is configured to use, or direct usage of, the commissioning broker to block the client from entering into the local network beyond the commissioning broker, before the client receives the second tier certificate. In some embodiments, the at least one controller is configured to use, or direct usage of, the data broker to block the client from entering into the local network beyond the data broker, before the client receives the second permission. In some embodiments, the commissioning broker and the local certification authority are included in one entity. In some embodiments, the commissioning broker and the local certification authority are included in different entities. In some embodiments, the at least one controller is configured to use, or direct usage of, the commissioning broker to verify (i) an identity of the client included in a first tier certificate and/or (ii) a first permission of the client to enter the local network. In some embodiments, the at least one controller is configured to use, or direct usage of, the local certification authority to verify (i) an identity of the client included in a first tier certificate and/or (ii) a first permission of the client to enter the local network. In some embodiments, the at least one controller is configured to use, or direct usage of, the local certification authority to issue the second tier certificate to the client seeking entry into the local network. In some embodiments, the second tier certificate includes a local authorization. In some embodiments, the second tier certificate comprises a local authentication by the commissioning broker. In some embodiments, the commissioning broker is configured to serve as a local certificate authority. In some embodiments, the commissioning broker is a first controller and/or data broker is a second controller. In some embodiments, the local network includes a plurality of clients operatively coupled to the local network, and wherein the client seeking entry into the local network is configured to exchange messages with the plurality of clients via the data broker. In some embodiments, the exchange of messages uses a publish-subscribe network protocol. In some embodiments, the local network is disposed in a facility, and wherein the plurality of clients includes a sensor, an emitter, an actuator, a controller, and/or a processor. In some embodiments, the at least one controller comprises a microcontroller. In some embodiments, the at least one controller is configured to grant, or direct grant of, the first permission according to the client seeking entry being listed is a list and/or ledger of clients configured to be given access to the local network. In some embodiments, the second tier certificate is comprised of a local first tier certificate. In some embodiments, the second tier certificate only allows the client access of the client to the data broker. In some embodiments, the at least one controller is configured to verify, or direct verification of, the second tier certificate by the data broker at least in part by (i) verifying an authenticity of the second tier certificate and (ii) ascertaining that the second tier certificate has not exceeded its second expiration time. In some embodiments, the at least one controller is configured to exchange, or direct exchange of, data messages with the client by the data broker after the data broker verifies (i) an identity of the client included in the second permission, (ii) an identity and/or privileges of the client to access the data broker, and (iii) that the second tier certificate has not exceeded its second expiration time. In some embodiments, the expanded access includes permission to access the local network beyond the data broker. In some embodiments, the at least one controller is configured to use, or direct usage of, the commissioning broker to issue another second tier certificate to the client seeking another entry into the local network, after the second permission expires at the second expiration time. In some embodiments, the certificate authority outside the local network is associated with a primary manufacturer of the client seeking entry, which primary manufacturer issues a root certificate included in the first tier certificate. In some embodiments, the commissioning broker is configured to issue the second tier certificate at least in part by verifying the root certificate. In some embodiments, the certificate authority outside the local network comprises a subordinate manufacturer of the client seeking entry, which subordinate manufacturer is configured to issue a manufacturing certificate included in the first tier certificate, which subordinate manufacturer is subordinate to the primary manufacturer. In some embodiments, the manufacturing certificate comprises the root certificate. In some embodiments, the commissioning broker is configured to issue the second tier certificate at least in part by verifying the root certificate. In some embodiments, the certificate authority outside the local network is associated with a manufacturing facility. In some embodiments, the client is provided and/or manufactured by an establishment generating and/or maintaining the local network. In some embodiments, the client is provided and/or manufactured by an establishment different from the establishment generating and/or maintaining the local network. In some embodiments, the at least one controller is configured to authenticate, or direct authentication of, messages among the certification authority outside the local network, the commissioning broker within the local network, and the data broker within the local network, wherein authenticating the messages is based at least in part on one or more certificates (i) issued by the certification authority and/or (i) which are verified based at least in part on a root certificate. In some embodiments, the at least one controller is configured to authenticate, or direct authentication of, messages among the certification authority, the commissioning broker, and the client seeking entry, wherein authenticating the messages is based at least in part on the first tier certificate issued by the certification authority to the client. In some embodiments, the at least one controller is configured to authenticate, or direct authentication of, messages between the client and the local certification authority in the local network via the commissioning broker, to provide the second tier certificate to the client, wherein authenticating the messages is based at least in part on the first tier certificate. In some embodiments, the at least one controller is configured to authenticate, or direct authentication of, messages between the client and at least one of a plurality of other clients via the data broker based at least in part on the second tier certificate. In some embodiments, the local network is configured to include a control system which controls at least one apparatus in a facility in which the local network is disposed and/or which the local network services, which control system includes or is operatively coupled to the at least one controller. In some embodiments, the control system is configured to include a hierarchy of controllers. In some embodiments, the at least one apparatus includes the client seeking entry. In some embodiments, the at least one apparatus includes a client operatively coupled to the local network. In some embodiments, the at least one apparatus comprises a lighting device, a tintable window, a sensor, an emitter, a media display, a dispenser, a processor, a controller, a headend, a radar, an antenna, a power source, a security system, a fire alarm system, a sound media, a heater, a cooler, a vent, or a heating ventilation and air conditioning system (HVAC). In some embodiments, the at least one apparatus comprises a target of the client. In some embodiments, the at least one apparatus comprises an internal client that is internal to the local network. In some embodiments, the at least one apparatus comprises a device ensemble comprising (i) a plurality of sensors or (ii) a sensor and an emitter. In some embodiments, the control system is configured to include a building management system. In some embodiments, the control system is configured to include a plurality of controllers residing locally in the facility and/or remote from the facility. In some embodiments, remotely comprise cloud computing. In some embodiments, the control system is configured to include a database saving information pertinent to control of the at least one apparatus. In some embodiments, the local network is configured for (i) power and data transmission on a cable, and/or (ii) installation on an envelope structure of a facility in which the local network is disposed and/or which the local network services. In some embodiments, the data comprises (i) at least a fourth generation (4G) or a fifth generation (5G) cellular communication protocol, (ii) media, and/or (iii) control protocol. In some embodiments, the local network is configured for wired and/or communication. In some embodiments, the local network includes coaxial and/or optical cables. In some embodiments, the local network is configured to facilitate adjustment of an internal environment of a facility in which the local network is disposed and/or which the local network services. In some embodiments, the at least one controller is configured to execute at least two of the operations sequentially. In some embodiments, the at least one controller is configured to execute at least two of the operations concurrently at least in part (e.g., overlap in time during their execution). In some embodiments, the at least one controller is configured to direct at least two of the operations sequentially. In some embodiments, the at least one controller is configured to direct at least two of the operations concurrently at least in part (e.g., overlap in time during their execution). In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, disclosed herein is a non-transitory computer readable program instructions (e.g., embedded in one or more program products such as media or medium) for controlling access to a local network, the non-transitory computer readable program instructions, when read by one or more processors, cause the one or more processors to execute operations comprising: (A) using, or directing using of, a commissioning broker and/or a local certification authority to issue a second tier certificate to a client seeking entry into the local network at least in part by verifying (i) an identity of the client included in a first tier certificate and (ii) a first permission of the client to enter the local network which first tier certificate is provided to the client by a certificate authority outside the local network and for a period having a first expiration time, which second tier certificate allows the client a limited access to the local network by accessing a data broker of the local network, which second tier certificate is issued for a period having a second expiration time shorter than the first expiration time; and (B) using, or directing using of, the data broker to issue a second permission to the client at least in part by verifying the second tier certificate, which second permission allows the client an expanded access to the local network as compared to the first permission, which second permission expires at the second expiration time, wherein the one or more processors are configured to operatively couple to the commissioning broker and/or a local certification authority, the data broker, the client and to the local network.

In some embodiments, the operations comprise using, or direct using of, the commissioning broker to block the client from entering into the local network beyond the commissioning broker, before the client receives the second tier certificate. In some embodiments, the operations comprise using, or direct using of, the data broker to block the client from entering into the local network beyond the data broker, before the client receives the second permission. In some embodiments, the commissioning broker and the local certification authority are included in one entity. In some embodiments, the commissioning broker and the local certification authority are included in different entities. In some embodiments, the operations comprise using, or direct using of, the commissioning broker to verify (i) an identity of the client included in a first tier certificate and/or (ii) a first permission of the client to enter the local network. In some embodiments, the operations comprise using, or direct using of, the local certification authority to verify (i) an identity of the client included in a first tier certificate and/or (ii) a first permission of the client to enter the local network. In some embodiments, the operations comprise using, or direct using of, the local certification authority to issue the second tier certificate to the client seeking entry into the local network. In some embodiments, the second tier certificate includes a local authorization. In some embodiments, the second tier certificate comprises a local authentication by the commissioning broker. In some embodiments, the commissioning broker is configured to serve as a local certificate authority. In some embodiments, the commissioning broker is a first controller and/or data broker is a second controller. In some embodiments, the local network includes a plurality of clients operatively coupled to the local network, and wherein the client seeking entry into the local network is configured to exchange messages with the plurality of clients via the data broker. In some embodiments, the exchange of messages uses a publish-subscribe network protocol. In some embodiments, the local network is disposed in a facility, and wherein the plurality of clients includes a sensor, an emitter, an actuator, a controller, and/or a processor. In some embodiments, the at least one controller comprises a microcontroller. In some embodiments, the operations comprise granting, or direct granting of, the first permission according to the client seeking entry being listed is a list and/or ledger of clients configured to be given access to the local network. In some embodiments, the second tier certificate is comprised of a local first tier certificate. In some embodiments, the second tier certificate only allows the client access of the client to the data broker. In some embodiments, the operations comprise verifying, or direct verifying of, the second tier certificate by the data broker at least in part by (i) verifying an authenticity of the second tier certificate and (ii) ascertaining that the second tier certificate has not exceeded its second expiration time. In some embodiments, the operations comprise exchanging, or direct exchanging of, data messages with the client by the data broker after the data broker verifies (i) an identity of the client included in the second permission, (ii) an identity and/or privileges of the client to access the data broker, and (iii) that the second tier certificate has not exceeded its second expiration time. In some embodiments, the expanded access includes permission to access the local network beyond the data broker. In some embodiments, the operations comprise using, or direct using of, the commissioning broker to issue another second tier certificate to the client seeking another entry into the local network, after the second permission expires at the second expiration time. In some embodiments, the certificate authority outside the local network is associated with a primary manufacturer of the client seeking entry, which primary manufacturer issues a root certificate included in the first tier certificate. In some embodiments, the commissioning broker is configured to issue the second tier certificate at least in part by verifying the root certificate. In some embodiments, the certificate authority outside the local network comprises a subordinate manufacturer of the client seeking entry, which subordinate manufacturer is configured to issue a manufacturing certificate included in the first tier certificate, which subordinate manufacturer is subordinate to the primary manufacturer. In some embodiments, the manufacturing certificate comprises the root certificate. In some embodiments, the commissioning broker is configured to issue the second tier certificate at least in part by verifying the root certificate. In some embodiments, the certificate authority outside the local network is associated with a manufacturing facility. In some embodiments, the client is provided and/or manufactured by an establishment generating and/or maintaining the local network. In some embodiments, the client is provided and/or manufactured by an establishment different from the establishment generating and/or maintaining the local network. In some embodiments, the operations comprise authenticating, or direct authenticating of, messages among the certification authority outside the local network, the commissioning broker within the local network, and the data broker within the local network, wherein authenticating the messages is based at least in part on one or more certificates (i) issued by the certification authority and/or (i) which are verified based at least in part on a root certificate. In some embodiments, the operations comprise authenticating, or direct authenticating of, messages among the certification authority, the commissioning broker, and the client seeking entry, wherein authenticating the messages is based at least in part on the first tier certificate issued by the certification authority to the client. In some embodiments, the operations comprise authenticating, or direct authenticating of, messages between the client and the local certification authority in the local network via the commissioning broker, to provide the second tier certificate to the client, wherein authenticating the messages is based at least in part on the first tier certificate. In some embodiments, the operations comprise authenticating, or direct authenticating of, messages between the client and at least one of a plurality of other clients via the data broker based at least in part on the second tier certificate. In some embodiments, the local network is configured to include a control system which controls at least one apparatus in a facility in which the local network is disposed and/or which the local network services, which control system includes or is operatively coupled to the one or more processors. In some embodiments, the control system is configured to include a hierarchy of controllers. In some embodiments, the at least one apparatus includes the client seeking entry. In some embodiments, the at least one apparatus includes a client operatively coupled to the local network. In some embodiments, the at least one apparatus comprises a lighting device, a tintable window, a sensor, an emitter, a media display, a dispenser, a processor, a controller, a headend, a radar, an antenna, a power source, a security system, a fire alarm system, a sound media, a heater, a cooler, a vent, or a heating ventilation and air conditioning system (HVAC). In some embodiments, the at least one apparatus comprises a target of the client. In some embodiments, the at least one apparatus comprises an internal client that is internal to the local network. In some embodiments, the at least one apparatus comprises a device ensemble comprising (i) a plurality of sensors or (ii) a sensor and an emitter. In some embodiments, the control system is configured to include a building management system. In some embodiments, the control system is configured to include a plurality of controllers residing locally in the facility and/or remote from the facility. In some embodiments, remotely comprise cloud computing. In some embodiments, the control system is configured to include a database saving information pertinent to control of the at least one apparatus. In some embodiments, the local network is configured for (i) power and data transmission on a cable, and/or (ii) installation on an envelope structure of a facility in which the local network is disposed and/or which the local network services. In some embodiments, the data comprises (i) at least a fourth generation (4G) or a fifth generation (5G) cellular communication protocol, (ii) media, and/or (iii) control protocol. In some embodiments, the local network is configured for wired and/or communication. In some embodiments, the local network includes coaxial and/or optical cables. In some embodiments, the local network is configured to facilitate adjustment of an internal environment of a facility in which the local network is disposed and/or which the local network services. In some embodiments, at least two of the operations are executed sequentially. In some embodiments, at least two of the operations are executed concurrently at least in part (e.g., overlap in time during their execution). In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, a method for generating a local network comprises: (A) establishing a commissioning broker and/or a local certification authority in the local network, which the commissioning broker and/or the local certification authority is configured to issue a second tier certificate to a client seeking entry into the local network at least in part by verifying (i) an identity of the client included in a first tier certificate and (ii) a first permission of the client to enter the local network, which first tier certificate is provided to the client by a certificate authority outside the local network and for a period having a first expiration time, which second tier certificate allows the client a limited access to the local network by accessing a data broker of the local network, which second tier certificate is issued for a period having a second expiration time shorter than the first expiration time; and (B) establishing the data broker in the local network, which data broker is configured to issue a second permission to the client at least in part by verifying the second tier certificate, which second permission allows the client an expanded access to the local network as compared to the first permission, which second permission expires at the second expiration time.

In some embodiments, the method further comprises establishing a main certification authority outside the local network having a main key and a main root certificate. In some embodiments, the commissioning broker and/or the local certification authority issuing the second tier certificate is comprised of establishing the local certification authority in the local network having a local key and a local root certificate. In some embodiments, the second tier certificate includes a local authorization. In some embodiments, the second tier certificate comprises a local authentication by the commissioning broker and/or the local certification authority. In some embodiments, the method further comprises using the commissioning broker to block the client from entering into the local network beyond the commissioning broker, before the client receives the second tier certificate. In some embodiments, the method further comprises using the data broker to block the client from entering into the local network beyond the data broker, before the client receives the second permission. In some embodiments, the commissioning broker and the local certification authority are included in one entity. In some embodiments, the commissioning broker and the local certification authority are included in different entities. In some embodiments, the method further comprises using the commissioning broker to verify (i) an identity of the client included in a first tier certificate and/or (ii) a first permission of the client to enter the local network. In some embodiments, the method further comprises using the local certification authority to verify (i) an identity of the client included in a first tier certificate and/or (ii) a first permission of the client to enter the local network. In some embodiments, the method further comprises using the local certification authority to issue the second tier certificate to the client seeking entry into the local network. In some embodiments, the second tier certificate includes a local authorization. In some embodiments, the second tier certificate comprises a local authentication by the commissioning broker. In some embodiments, the commissioning broker serves as the local certificate authority. In some embodiments, the commissioning broker is a first controller and/or data broker is a second controller. In some embodiments, the local network includes a plurality of clients operatively coupled to the local network, and wherein the method further comprising exchanging messages between the client seeking entry into the local network and the plurality of clients via the data broker. In some embodiments, the method further comprises using a publish-subscribe network protocol to exchange the messages. In some embodiments, the local network is disposed in a facility, and wherein the plurality of clients includes a sensor, an emitter, an actuator, a controller, and/or a processor. In some embodiments, the controller comprises a microcontroller. In some embodiments, the first permission is granted according to the client seeking entry being listed is a list and/or ledger of clients configured to be given access to the local network. In some embodiments, the second tier certificate is comprised of a local first tier certificate. In some embodiments, the second tier certificate only allows the client access to the data broker. In some embodiments, verifying the second tier certificate by the data broker is comprised of (i) verifying an authenticity of the second tier certificate and (ii) ascertaining that the second tier certificate has not exceeded its second expiration time. In some embodiments, the method further comprises the data broker exchanging data messages with the client after the data broker verifies (i) an identity of the client included in the second permission, (ii) an identity and/or privileges of the client to access the data broker, and (iii) that the second tier certificate has not exceeded its second expiration time. In some embodiments, the expanded access includes permission to access the local network beyond the data broker. In some embodiments, the method further comprises using the commissioning broker to issue another second tier certificate to the client seeking another entry into the local network, after the second permission expires at the second expiration time. In some embodiments, the certificate authority outside the local network is associated with a primary manufacturer of the client seeking entry, which primary manufacturer issues a root certificate included in the first tier certificate. In some embodiments, the commissioning broker issues the second tier certificate at least in part by verifying the root certificate. In some embodiments, the certificate authority outside the local network comprises a subordinate manufacturer of the client seeking entry, which subordinate manufacturer issues a manufacturing certificate included in the first tier certificate, which subordinate manufacturer is subordinate to the primary manufacturer. In some embodiments, the manufacturing certificate comprises the root certificate. In some embodiments, the commissioning broker issues the second tier certificate at least in part by verifying the root certificate. In some embodiments, the certificate authority outside the local network is associated with a manufacturing facility. In some embodiments, the client is provided and/or manufactured by an establishment generating and/or maintaining the local network. In some embodiments, the client is provided and/or manufactured by an establishment different from the establishment generating and/or maintaining the local network. In some embodiments, the method further comprises authenticating messages among the certification authority outside the local network, the commissioning broker within the local network, and the data broker within the local network, wherein authenticating the messages is based at least in part on one or more certificates (i) issued by the certification authority and/or (i) which are verified based at least in part on a root certificate. In some embodiments, the method further comprises authenticating messages among the certification authority, the commissioning broker, and the client seeking entry, wherein authenticating the messages is based at least in part on the first tier certificate issued by the certification authority to the client. In some embodiments, the method further comprises authenticating messages between the client and the local certification authority in the local network via the commissioning broker, to provide the second tier certificate to the client, wherein authenticating the messages is based at least in part on the first tier certificate. In some embodiments, the method further comprises authenticating messages between the client and at least one of a plurality of other clients via the data broker based at least in part on the second tier certificate. In some embodiments, the local network comprises a control system which controls at least one apparatus in a facility in which the local network is disposed and/or which the local network services. In some embodiments, the control system comprises a hierarchy of controllers. In some embodiments, the at least one apparatus includes the client seeking entry. In some embodiments, the at least one apparatus includes a client operatively coupled to the local network. In some embodiments, the at least one apparatus comprises a lighting device, a tintable window, a sensor, an emitter, a media display, a dispenser, a processor, a controller, a headend, a radar, an antenna, a power source, a security system, a fire alarm system, a sound media, a heater, a cooler, a vent, or a heating ventilation and air conditioning system (HVAC). In some embodiments, the at least one apparatus comprises a target of the client. In some embodiments, the at least one apparatus comprises an internal client that is internal to the local network. In some embodiments, the at least one apparatus comprises a device ensemble comprising (i) a plurality of sensors or (ii) a sensor and an emitter. In some embodiments, the control system comprises a building management system. In some embodiments, the control system comprises a plurality of controllers residing locally in the facility and/or remote from the facility. In some embodiments, remotely comprise cloud computing. In some embodiments, the control system comprises a database saving information pertinent to control of the at least one apparatus. In some embodiments, the local network is configured for (i) power and data transmission on a cable, and/or (ii) installation on an envelope structure of a facility in which the local network is disposed and/or which the local network services. In some embodiments, the data comprises (i) at least a fourth generation (4G) or a fifth generation (5G) cellular communication protocol, (ii) media, and/or (iii) control protocol. In some embodiments, the local network is configured for wired and/or communication. In some embodiments, the local network includes coaxial and/or optical cables. In some embodiments, the local network is configured to facilitate adjustment of an internal environment of a facility in which the local network is disposed and/or which the local network services. In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, an apparatus for generating a local network comprises at least one controller comprising circuitry, which at least one controller is configured to: (A) operatively couple to a commissioning broker and/or a local certification authority, a data broker, a client and to the local network; (B) establish, or direct establishment of, the commissioning broker and/or the local certification authority in the local network, which the commissioning broker and/or the local certification authority is configured to issue a second tier certificate to the client seeking entry into the local network at least in part by verifying (i) an identity of the client included in a first tier certificate and (ii) a general permission of the client to enter the local network, which first tier certificate is provided to the client by a certificate authority outside the local network and for a period having a first expiration time, which second tier certificate allows the client a limited access to the local network by accessing the data broker of the local network, which second tier certificate is issued for a period having a second expiration time shorter than the first expiration time; and (C) establish, or direct establishment of, the data broker in the local network, which data broker is configured to issue a second permission to the client at least in part by the at least one controller being configured to verify the second tier certificate, which second permission allows the client an expanded access to the local network as compared to the first local permission, which second local permission expires at the second expiration time.

In some embodiments, the at least one controller is configured to establish, or direct establishment of, a main certification authority outside the local network having a main key and a main root certificate. In some embodiments, the at least one controller is configured to establish, or direct establishment of, the local certification authority in the local network having a local key and a local root certificate. In some embodiments, the second tier certificate includes a local authorization. In some embodiments, the second tier certificate comprises a local authentication by the commissioning broker and/or the local certification authority. In some embodiments, the at least one controller is configured to use, or direct usage of, the commissioning broker to block the client from entering into the local network beyond the commissioning broker, before the client receives the second tier certificate. In some embodiments, the at least one controller is configured to use, or direct usage of, the data broker to block the client from entering into the local network beyond the data broker, before the client receives the second permission. In some embodiments, the commissioning broker and the local certification authority are included in one entity. In some embodiments, the commissioning broker and the local certification authority are included in different entities. In some embodiments, the at least one controller is configured to use, or direct usage of, the commissioning broker to verify (i) an identity of the client included in a first tier certificate and/or (ii) a first permission of the client to enter the local network. In some embodiments, the at least one controller is configured to use, or direct usage of, the local certification authority to verify (i) an identity of the client included in a first tier certificate and/or (ii) a first permission of the client to enter the local network. In some embodiments, the at least one controller is configured to use, or direct usage of, the local certification authority to issue the second tier certificate to the client seeking entry into the local network. In some embodiments, the second tier certificate includes a local authorization. In some embodiments, the second tier certificate comprises a local authentication by the commissioning broker. In some embodiments, the commissioning broker is configured to serve as the local certificate authority. In some embodiments, the commissioning broker is a first controller and/or data broker is a second controller. In some embodiments, the local network includes a plurality of clients operatively coupled to the local network, and wherein the client seeking entry into the local network is configured to exchange messages with the plurality of clients via the data broker. In some embodiments, the exchange of messages uses a publish-subscribe network protocol. In some embodiments, the local network is disposed in a facility, and wherein the plurality of clients includes a sensor, an emitter, an actuator, a controller, and/or a processor. In some embodiments, the at least one controller comprises a microcontroller. In some embodiments, the at least one controller is configured to grant, or direct grant of, the first permission according to the client seeking entry being listed a list and/or ledger of clients configured to be given access to the local network. In some embodiments, the second tier certificate is comprised of a local first tier certificate. In some embodiments, the second tier certificate only allows the client access of the client to the data broker. In some embodiments, the at least one controller is configured to verify, or direct verification of, the second tier certificate by the data broker at least in part by (i) verifying an authenticity of the second tier certificate and (ii) ascertaining that the second tier certificate has not exceeded its second expiration time. In some embodiments, the at least one controller is configured to exchange, or direct exchange of, data messages with the client by the data broker after the data broker verifies (i) an identity of the client included in the second permission, (ii) an identity and/or privileges of the client to access the data broker, and (iii) that the second tier certificate has not exceeded its second expiration time. In some embodiments, the expanded access includes permission to access the local network beyond the data broker. In some embodiments, the at least one controller is configured to use, or direct usage of, the commissioning broker to issue another second tier certificate to the client seeking another entry into the local network, after the second permission expires at the second expiration time. In some embodiments, the certificate authority outside the local network is associated with a primary manufacturer of the client seeking entry, which primary manufacturer issues a root certificate included in the first tier certificate. In some embodiments, the commissioning broker is configured to issue the second tier certificate at least in part by verifying the root certificate. In some embodiments, the certificate authority outside the local network comprises a subordinate manufacturer of the client seeking entry, which subordinate manufacturer is configured to issue a manufacturing certificate included in the first tier certificate, which subordinate manufacturer is subordinate to the primary manufacturer. In some embodiments, the manufacturing certificate comprises the root certificate. In some embodiments, the commissioning broker is configured to issue the second tier certificate at least in part by verifying the root certificate. In some embodiments, the certificate authority outside the local network is associated with a manufacturing facility. In some embodiments, the client is provided and/or manufactured by an establishment generating and/or maintaining the local network. In some embodiments, the client is provided and/or manufactured by an establishment different from the establishment generating and/or maintaining the local network. In some embodiments, the at least one controller is configured to authenticate, or direct authentication of, messages among the certification authority outside the local network, the commissioning broker within the local network, and the data broker within the local network, wherein authenticating the messages is based at least in part on one or more certificates (i) issued by the certification authority and/or (i) which are verified based at least in part on a root certificate. In some embodiments, the at least one controller is configured to authenticate, or direct authentication of, messages among the certification authority, the commissioning broker, and the client seeking entry, wherein authenticating the messages is based at least in part on the first tier certificate issued by the certification authority to the client. In some embodiments, the at least one controller is configured to authenticate, or direct authentication of, messages between the client and the local certification authority in the local network via the commissioning broker, to provide the second tier certificate to the client, wherein authenticating the messages is based at least in part on the first tier certificate. In some embodiments, the at least one controller is configured to authenticate, or direct authentication of, messages between the client and at least one of a plurality of other clients via the data broker based at least in part on the second tier certificate. In some embodiments, the local network is configured to include a control system which controls at least one apparatus in a facility in which the local network is disposed and/or which the local network services, which control system includes or is operatively coupled to the at least one controller. In some embodiments, the control system is configured to include a hierarchy of controllers. In some embodiments, the at least one apparatus includes the client seeking entry. In some embodiments, the at least one apparatus includes a client operatively coupled to the local network. In some embodiments, the at least one apparatus comprises a lighting device, a tintable window, a sensor, an emitter, a media display, a dispenser, a processor, a controller, a headend, a radar, an antenna, a power source, a security system, a fire alarm system, a sound media, a heater, a cooler, a vent, or a heating ventilation and air conditioning system (HVAC). In some embodiments, the at least one apparatus comprises a target of the client. In some embodiments, the at least one apparatus comprises an internal client that is internal to the local network. In some embodiments, the at least one apparatus comprises a device ensemble comprising (i) a plurality of sensors or (ii) a sensor and an emitter. In some embodiments, the control system is configured to include a building management system. In some embodiments, the control system is configured to include a plurality of controllers residing locally in the facility and/or remote from the facility. In some embodiments, remotely comprise cloud computing. In some embodiments, the control system is configured to include a database saving information pertinent to control of the at least one apparatus. In some embodiments, the local network is configured for (i) power and data transmission on a cable, and/or (ii) installation on an envelope structure of a facility in which the local network is disposed and/or which the local network services. In some embodiments, the data comprises (i) at least a fourth generation (4G) or a fifth generation (5G) cellular communication protocol, (ii) media, and/or (iii) control protocol. In some embodiments, the local network is configured for wired and/or communication. In some embodiments, the local network includes coaxial and/or optical cables. In some embodiments, the local network is configured to facilitate adjustment of an internal environment of a facility in which the local network is disposed and/or which the local network services. In some embodiments, the at least one controller is configured to execute at least two of the operations sequentially. In some embodiments, the at least one controller is configured to execute at least two of the operations concurrently at least in part (e.g., overlap in time during their execution). In some embodiments, the at least one controller is configured to direct at least two of the operations sequentially. In some embodiments, the at least one controller is configured to direct at least two of the operations concurrently at least in part (e.g., overlap in time during their execution). In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, disclosed herein is a non-transitory computer readable program instructions (e.g., embedded in one or more program products such as media or medium) for generating a local network, the non-transitory computer readable program instructions, when read by one or more processors, cause the one or more processors to execute operations comprising: (A) establishing, or direct establishing of, a commissioning broker and/or a local certification authority in the local network, which commissioning broker and/or which local certification authority is configured to issue a second tier certificate to a client seeking entry into the local network at least in part by verifying (i) an identity of the client included in a first tier certificate and (ii) a general permission of the client to enter the local network, which first tier certificate is provided to the client by a certificate authority outside the local network and for a period having a first expiration time, which second tier certificate allows the client a limited access to the local network by accessing a data broker of the local network, which second tier certificate is issued for a period having a second expiration time shorter than the first expiration time; and (B) establishing, or direct establishing of, the data broker in the local network, which data broker is configured to issue a second permission to the client at least in part by verifying the second tier certificate, which second permission allows the client an expanded access to the local network as compared to the first local permission, which second local permission expires at the second expiration time, wherein the one or more processors are configured to operatively couple to the commissioning broker and/or the local certification authority, the data broker, the client and to the local network.

In some embodiments, the operations comprise establishing, or direct establishing of, a main certification authority outside the local network having a main key and a main root certificate. In some embodiments, the operations comprise establishing, or direct establishing of, the local certification authority in the local network having a local key and a local root certificate. In some embodiments, the second tier certificate includes a local authorization. In some embodiments, the second tier certificate comprises a local authentication by the commissioning broker and/or the local certification authority. In some embodiments, the operations comprise using, or direct using of, the commissioning broker to block the client from entering into the local network beyond the commissioning broker, before the client receives the second tier certificate. In some embodiments, the operations comprise using, or direct using of, the data broker to block the client from entering into the local network beyond the data broker, before the client receives the second permission. In some embodiments, the commissioning broker and the local certification authority are included in one entity. In some embodiments, the commissioning broker and the local certification authority are included in different entities. In some embodiments, the operations comprise using, or direct using of, the commissioning broker to verify (i) an identity of the client included in a first tier certificate and/or (ii) a first permission of the client to enter the local network. In some embodiments, the operations comprise using, or direct using of, the local certification authority to verify (i) an identity of the client included in a first tier certificate and/or (ii) a first permission of the client to enter the local network. In some embodiments, the operations comprise using, or direct using of, the local certification authority to issue the second tier certificate to the client seeking entry into the local network. In some embodiments, the second tier certificate includes a local authorization. In some embodiments, the second tier certificate comprises a local authentication by the commissioning broker. In some embodiments, the commissioning broker is configured to serve as the local certificate authority. In some embodiments, the commissioning broker is a first controller and/or data broker is a second controller. In some embodiments, the local network includes a plurality of clients operatively coupled to the local network, and wherein the client seeking entry into the local network is configured to exchange messages with the plurality of clients via the data broker. In some embodiments, the exchange of messages uses a publish-subscribe network protocol. In some embodiments, the local network is disposed in a facility, and wherein the plurality of clients includes a sensor, an emitter, an actuator, a controller, and/or a processor. In some embodiments, the at least one controller comprises a microcontroller. In some embodiments, the operations comprise granting, or direct granting of, the first permission according to the client seeking entry being listed is a list and/or ledger of clients configured to be given access to the local network. In some embodiments, the second tier certificate is comprised of a local first tier certificate. In some embodiments, the second tier certificate only allows the client access of the client to the data broker. In some embodiments, the operations comprise verifying, or direct verifying of, the second tier certificate by the data broker at least in part by (i) verifying an authenticity of the second tier certificate and (ii) ascertaining that the second tier certificate has not exceeded its second expiration time. In some embodiments, the operations comprise exchanging, or direct exchanging of, data messages with the client by the data broker after the data broker verifies (i) an identity of the client included in the second permission, (ii) an identity and/or privileges of the client to access the data broker, and (iii) that the second tier certificate has not exceeded its second expiration time. In some embodiments, the expanded access includes permission to access the local network beyond the data broker. In some embodiments, the operations comprise using, or direct using of, the commissioning broker to issue another second tier certificate to the client seeking another entry into the local network, after the second permission expires at the second expiration time. In some embodiments, the certificate authority outside the local network is associated with a primary manufacturer of the client seeking entry, which primary manufacturer issues a root certificate included in the first tier certificate. In some embodiments, the commissioning broker is configured to issue the second tier certificate at least in part by verifying the root certificate. In some embodiments, the certificate authority outside the local network comprises a subordinate manufacturer of the client seeking entry, which subordinate manufacturer is configured to issue a manufacturing certificate included in the first tier certificate, which subordinate manufacturer is subordinate to the primary manufacturer. In some embodiments, the manufacturing certificate comprises the root certificate. In some embodiments, the commissioning broker is configured to issue the second tier certificate at least in part by verifying the root certificate. In some embodiments, the certificate authority outside the local network is associated with a manufacturing facility. In some embodiments, the client is provided and/or manufactured by an establishment generating and/or maintaining the local network. In some embodiments, the client is provided and/or manufactured by an establishment different from the establishment generating and/or maintaining the local network. In some embodiments, the operations comprise authenticating, or direct authenticating of, messages among the certification authority outside the local network, the commissioning broker within the local network, and the data broker within the local network, wherein authenticating the messages is based at least in part on one or more certificates (i) issued by the certification authority and/or (i) which are verified based at least in part on a root certificate. In some embodiments, the operations comprise authenticating, or direct authenticating of, messages among the certification authority, the commissioning broker, and the client seeking entry, wherein authenticating the messages is based at least in part on the first tier certificate issued by the certification authority to the client. In some embodiments, the operations comprise authenticating, or direct authenticating of, messages between the client and the local certification authority in the local network via the commissioning broker, to provide the second tier certificate to the client, wherein authenticating the messages is based at least in part on the first tier certificate. In some embodiments, the operations comprise authenticating, or direct authenticating of, messages between the client and at least one of a plurality of other clients via the data broker based at least in part on the second tier certificate. In some embodiments, the local network is configured to include a control system which controls at least one apparatus in a facility in which the local network is disposed and/or which the local network services, which control system includes and/or is operatively coupled to the one or more processors. In some embodiments, the control system is configured to include a hierarchy of controllers. In some embodiments, the at least one apparatus includes the client seeking entry. In some embodiments, the at least one apparatus includes a client operatively coupled to the local network. In some embodiments, the at least one apparatus comprises a lighting device, a tintable window, a sensor, an emitter, a media display, a dispenser, a processor, a controller, a headend, a radar, an antenna, a power source, a security system, a fire alarm system, a sound media, a heater, a cooler, a vent, or a heating ventilation and air conditioning system (HVAC). In some embodiments, the at least one apparatus comprises a target of the client. In some embodiments, the at least one apparatus comprises an internal client that is internal to the local network. In some embodiments, the at least one apparatus comprises a device ensemble comprising (i) a plurality of sensors or (ii) a sensor and an emitter. In some embodiments, the control system is configured to include a building management system. In some embodiments, the control system is configured to include a plurality of controllers residing locally in the facility and/or remote from the facility. In some embodiments, remotely comprise cloud computing. In some embodiments, the control system is configured to include a database saving information pertinent to control of the at least one apparatus. In some embodiments, the local network is configured for (i) power and data transmission on a cable, and/or (ii) installation on an envelope structure of a facility in which the local network is disposed and/or which the local network services. In some embodiments, the data comprises (i) at least a fourth generation (4G) or a fifth generation (5G) cellular communication protocol, (ii) media, and/or (iii) control protocol. In some embodiments, the local network is configured for wired and/or communication. In some embodiments, the local network includes coaxial and/or optical cables. In some embodiments, the local network is configured to facilitate adjustment of an internal environment of a facility in which the local network is disposed and/or which the local network services. In some embodiments, at least two of the operations are executed sequentially. In some embodiments, at least two of the operations are executed concurrently at least in part (e.g., overlap in time during their execution). In some embodiments, the network is a local network. In some embodiments, the network comprises a cable configured to transmit power and communication in a single cable. The communication can be one or more types of communication. The communication can comprise cellular communication abiding by at least a second generation (2G), third generation (3G), fourth generation (4G) or fifth generation (5G) cellular communication protocol. In some embodiments, the communication comprises media communication facilitating stills, music, or moving picture streams (e.g., movies or videos). In some embodiments, the communication comprises data communication (e.g., sensor data). In some embodiments, the communication comprises control communication, e.g., to control the one or more nodes operatively coupled to the networks. In some embodiments, the network comprises a first (e.g., cabling) network installed in the facility. In some embodiments, the network comprises a (e.g., cabling) network installed in an envelope of the facility (e.g., in an envelope of a building included in the facility).

In another aspect, the present disclosure provides systems, apparatuses (e.g., controllers), and/or non-transitory computer-readable medium (e.g., software) that implement any of the methods disclosed herein.

In another aspect, the present disclosure provides methods that use any of the systems, computer readable media, and/or apparatuses disclosed herein, e.g., for their intended purpose.

In another aspect, an apparatus comprises at least one controller that is programmed to direct a mechanism used to implement (e.g., effectuate) any of the method disclosed herein, which at least one controller is configured to operatively couple to the mechanism. In some embodiments, at least two operations (e.g., of the method) are directed/ executed by the same controller. In some embodiments, at less at two operations are directed/executed by different controllers.

In another aspect, an apparatus comprises at least one controller that is configured (e.g., programmed) to implement (e.g., effectuate) any of the methods disclosed herein. The at least one controller may implement any of the methods disclosed herein. In some embodiments, at least two operations (e.g., of the method) are directed/executed by the same controller. In some embodiments, at less at two operations are directed/executed by different controllers.

In some embodiments, one controller of the at least one controller is configured to perform two or more operations. In some embodiments, two different controllers of the at least one controller are configured to each perform a different operation.

In another aspect, a system comprises at least one controller that is programmed to direct operation of at least one another apparatus (or component thereof), and the apparatus (or component thereof), wherein the at least one controller is operatively coupled to the apparatus (or to the component thereof). The apparatus (or component thereof) may include any apparatus (or component thereof) disclosed herein. The at least one controller may be configured to direct any apparatus (or component thereof) disclosed herein. The at least one controller may be configured to operatively couple to any apparatus (or component thereof) disclosed herein. In some embodiments, at least two operations (e.g., of the apparatus) are directed by the same controller. In some embodiments, at less at two operations are directed by different controllers.

In another aspect, a computer software product, comprising a non-transitory computer-readable medium in which program instructions are stored, which instructions, when read by at least one processor (e.g., computer), cause the at least one processor to direct a mechanism disclosed herein to implement (e.g., effectuate) any of the method disclosed herein, wherein the at least one processor is configured to operatively couple to the mechanism. The mechanism can comprise any apparatus (or any component thereof) disclosed herein. In some embodiments, at least two operations (e.g., of the apparatus) are directed/executed by the same processor. In some embodiments, at less at two operations are directed/executed by different processors.

In another aspect, the present disclosure provides a non-transitory computer-readable medium comprising machine-executable code that, upon execution by one or more processors, implements any of the methods disclosed herein. In some embodiments, at least two operations (e.g., of the method) are directed/executed by the same processor. In some embodiments, at less at two operations are directed/executed by different processors.

In another aspect, the present disclosure provides a non-transitory computer-readable medium comprising machine-executable code that, upon execution by one or more processors, effectuates directions of the controller(s) (e.g., as disclosed herein). In some embodiments, at least two operations (e.g., of the controller) are directed/executed by the same processor. In some embodiments, at less at two operations are directed/executed by different processors.

In another aspect, the present disclosure provides a computer system comprising one or more computer processors and a non-transitory computer-readable medium coupled thereto. The non-transitory computer-readable medium comprises machine-executable code that, upon execution by the one or more processors, implements any of the methods disclosed herein and/or effectuates directions of the controller(s) disclosed herein.

In another aspect, the present disclosure provides a non-transitory computer readable program instructions, the non-transitory computer readable program instructions, when read by one or more processors, causes the one or more processors to execute any operation of the methods disclosed herein, any operation performed (or configured to be performed) by the apparatuses disclosed herein, and/or any operation directed (or configured to be directed) by the apparatuses disclosed herein.

In some embodiments, the program instructions are inscribed in a non-transitory computer readable medium. In some embodiments, the program instructions are inscribed in non-transitory computer readable media. In some embodiments, at least two of the operations are executed by one of the one or more processors. In some embodiments, at least two of the operations are each executed by different processors of the one or more processors.

The content of this summary section is provided as a simplified introduction to the disclosure and is not intended to be used to limit the scope of any invention disclosed herein or the scope of the appended claims.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

These and other features and embodiments will be described in more detail with reference to the drawings.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

Figure 1:
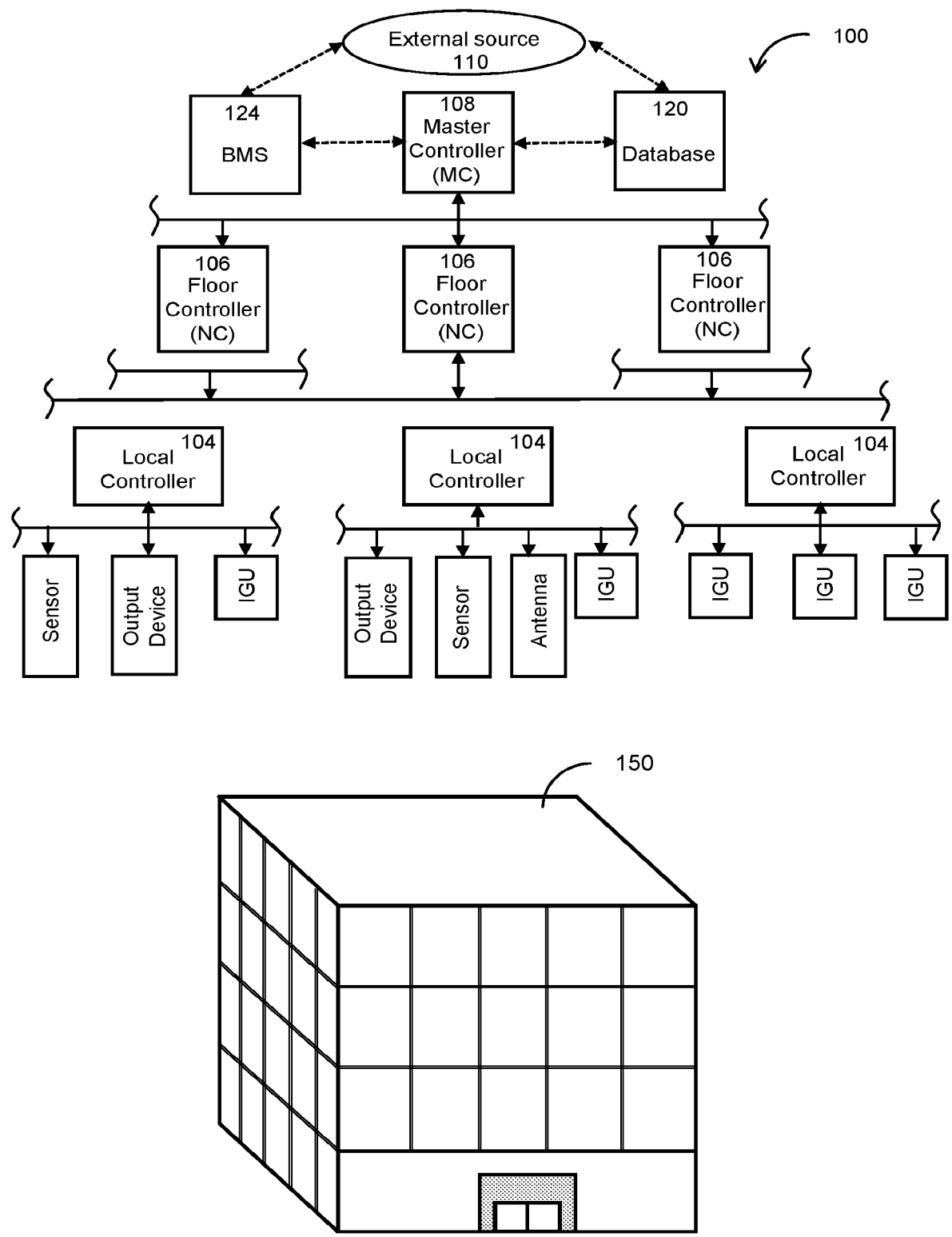
FIG. 1 shows a perspective view of an enclosure (e.g., a building) and a control system.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a," "an," and "the" are not intended to refer to only a singular entity but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

As used herein, including in the claims, the conjunction "and/or" in a phrase such as "including X, Y, and/or Z", refers to in inclusion of any combination or plurality of X, Y, and Z. For example, such phrase is meant to include X. For example, such phrase is meant to include Y. For example, such phrase is meant to include Z. For example, such phrase is meant to include X and Y. For example, such phrase is meant to include X and Z. For example, such phrase is meant to include Y and Z. For example, such phrase is meant to include a plurality of Xs. For example, such phrase is meant to include a plurality of Ys. For example, such phrase is meant to include a plurality of Zs. For example, such phrase is meant to include a plurality of Xs and a plurality of Ys. For example, such phrase is meant to include a plurality of Xs and a plurality of Zs. For example, such phrase is meant to include a plurality of Ys and a plurality of Zs. For example, such phrase is meant to include a plurality of Xs and Y. For example, such phrase is meant to include a plurality of Xs and Z. For example, such phrase is meant to include a plurality of Ys and Z. For example, such phrase is meant to include X and a plurality of Ys. For example, such phrase is meant to include X and a plurality of Zs. For example, such phrase is meant to include Y and a plurality of Zs. The conjunction "and/or" is meant to have the same effect as the phrase "X, Y, Z, or any combination or plurality thereof." The conjunction "and/or" is meant to have the same effect as the phrase "one or more X, Y, Z, or any combination thereof."

The term "operatively coupled" or "operatively connected" refers to a first element (e.g., mechanism) that is coupled (e.g., connected) to a second element, to allow the intended operation of the second and/or first element. The coupling may comprise physical or non-physical coupling (e.g., communicative coupling). The non-physical coupling may comprise signal-induced coupling (e.g., wireless coupling). Coupled can include physical coupling (e.g., physically connected), or non-physical coupling (e.g., via wireless communication). Operatively coupled may comprise communicatively coupled.

An element (e.g., mechanism) that is "configured to" perform a function includes a structural feature that causes the element to perform this function. A structural feature may include an electrical feature, such as a circuitry or a circuit element. A structural feature may include a circuitry (e.g., comprising electrical or optical circuitry). Electrical circuitry may comprise one or more wires. Optical circuitry may comprise at least one optical element (e.g., beam splitter, mirror, lens and/or optical fiber). A structural feature may include a mechanical feature. A mechanical feature may comprise a latch, a spring, a closure, a hinge, a chassis, a support, a fastener, or a cantilever, and so forth. Performing the function may comprise utilizing a logical feature. A logical feature may include programming instructions. Programming instructions may be executable by at least one processor. Programming instructions may be stored or encoded on a medium accessible by one or more processors.

In some embodiments, an enclosure comprises an area defined by at least one structure. The at least one structure may comprise at least one wall. An enclosure may comprise and/or enclose one or more sub-enclosure. The at least one wall may comprise metal (e.g., steel), clay, stone, plastic, glass, plaster (e.g., gypsum), polymer (e.g., polyurethane, styrene, or vinyl), asbestos, fiber-glass, concrete (e.g., reinforced concrete), wood, paper, or a ceramic. The at least one wall may comprise wire, bricks, blocks (e.g., cinder blocks), tile, drywall, or frame (e.g., steel frame).

In some embodiments, the enclosure comprises one or more openings. The one or more openings may be reversibly closable. The one or more openings may be permanently open. A fundamental length scale of the one or more openings may be smaller relative to the fundamental length scale of the wall(s) that define the enclosure. A fundamental length scale may comprise a diameter of a bounding circle, a length, a width, or a height. A surface of the one or more openings may be smaller relative to the surface the wall(s) that define the enclosure. The opening surface may be a percentage of the total surface of the wall(s). For example, the opening surface can measure at most about 30%, 20%, 10%, 5%, or 1% of the walls(s). The wall(s) may comprise a floor, a ceiling or a side wall. The closable opening may be closed by at least one window or door. The enclosure may be at least a portion of a facility. The enclosure may comprise at least a portion of a building. The building may be a private building and/or a commercial building. The building may comprise one or more floors. The building (e.g., floor thereof) may include at least one of: a room, hall, foyer, attic, basement, balcony (e.g., inner or outer balcony), stairwell, corridor, elevator shaft, façade, mezzanine, penthouse, garage, porch (e.g., enclosed porch), terrace (e.g., enclosed terrace), cafeteria, and/or Duct. In some embodiments, an enclosure may be stationary and/or movable (e.g., a train, a plane, a ship, a vehicle, or a rocket).

In some embodiments, the enclosure encloses an atmosphere. The atmosphere may comprise one or more gases. The gases may include inert gases (e.g., comprising argon or nitrogen) and/or non-inert gases (e.g., comprising oxygen or carbon dioxide). The gasses may include harmful gasses such as radon, hydrogen sulfide, Nitric oxide (NO) and/or nitrogen dioxide ($NO_2$)). The enclosure atmosphere may resemble an atmosphere external to the enclosure (e.g., ambient atmosphere) in at least one external atmosphere characteristic that includes: temperature, relative gas content, gas type (e.g., humidity, and/or oxygen level), debris (e.g., dust and/or pollen), and/or gas velocity. The enclosure atmosphere may be different from the atmosphere external to the enclosure in at least one external atmosphere characteristic that includes: temperature, relative gas content, gas type (e.g., humidity, and/or oxygen level), debris (e.g., dust and/or pollen), and/or gas velocity. For example, the enclosure atmosphere may be less humid (e.g., drier) than the external (e.g., ambient) atmosphere. For example, the enclosure atmosphere may contain the same (e.g., or a substantially similar) oxygen-to-nitrogen ratio as the atmosphere external to the enclosure. The velocity of the gas in the enclosure may be (e.g., substantially) similar throughout the enclosure. The velocity of the gas in the enclosure may be different in different portions of the enclosure (e.g., by flowing gas through to a vent that is coupled with the enclosure).

Certain disclosed embodiments provide a network infrastructure in the enclosure (e.g., a facility such as a building). The network infrastructure is available for various purposes such as for providing communication and/or power services. The communication services may comprise high bandwidth (e.g., wireless and/or wired) communications services. The communication services can be to occupants of a facility and/or users outside the facility (e.g., building). The network infrastructure may work in concert with, or as a partial replacement of, the infrastructure of one or more cellular carriers. The network infrastructure can be provided in a facility that includes electrically switchable windows. Examples of components of the network infrastructure include a high speed backhaul. The network infrastructure may include at least one cable, switch, physical antenna, transceivers, sensor, transmitter, receiver, radio, processor and/or controller (that may comprise a processor). The network infrastructure may be operatively coupled to, and/or include, a wireless network. The network infrastructure may comprise wiring. One or more sensors can be deployed (e.g., installed) in an environment as part of installing the network and/or after installing the network.

In some embodiments, a building management system (BMS) is a computer-based control system installed in a building that monitors and otherwise controls (e.g., regulates, manipulates, restricts, directs, monitors, adjusts, modulates, varies, alters, restrains, checks, guides, or manages) the building. For example, the BMS may control the mechanical and/or electrical equipment such as ventilation, lighting, power systems, elevators, fire systems, and/or security systems. Controllers (e.g., nodes and/or processors), e.g., as described herein, may be suited for integration with a BMS. A BMS may consist of hardware, including interconnections by communication channels to one or more computers (e.g., and associated software) for maintaining one or more conditions in the building. The one or more conditions in the building may be according to preference(s) set by a user (e.g., an occupant and/or a building manager). For example, a BMS may be implemented using a local area network, such as Ethernet. The software can be based at least in part on, e.g., internet protocols and/or open standards. One example is software from Tridium, Inc. (of Richmond, Va.). One communication protocol that can be used with a BMS is BACnet (building automation and control networks). A node can be any addressable circuitry. For example, a node can be a circuitry that has an Internet Protocol (IP) address.

In some embodiments, a BMS may be implemented in a building, e.g., a multi-story building. The BMS may function (also) to control one or more characteristics of an environment in the building. The one or more characteristics may comprise: temperature, carbon dioxide levels, gas flow, and/or humidity in a building. There may be many mechanical devices that are controlled by a BMS such as heaters, air conditioners, blowers, and/or vents. To control the building environment, a BMS may turn on and off these various devices under defined conditions. A core function of a BMS may be to maintain a comfortable environment for occupants of the environment, e.g., while minimizing heating and cooling costs/demand. A BMS can be used to control the various systems. A BMS may be used to optimize the synergy between various systems. For example, the BMS may be used to conserve energy and lower building operation costs. The multi-story building may have at least 2, 8, 10, 25, 50, 80, 100, 120, 140, or 160 floors that are controlled by the control system. The number of controlled by the control system may be any number between the aforementioned numbers (e.g., from 2 to 50), from 25 to 100, or from 80 to 160). The floor may be of an area of at least about 160 $m^2$, 250 $m^2$, 500 $m^2$, 1000 $m^2$, 1600 $m^2$, or 2000 square meters ($m^2$). The floor may have an area between any of the aforementioned floor area values (e.g., from about 160 $m^2$ to about 2000 $m^2$, from about 160 $m^2$ to about 500 $m^2$ from about 250 $m^2$ to about 1000 $m^2$, or from about 1000 $m^2$ to about 2000 $m^2$). The facility may comprise a commercial or a residential building. The commercial building may include tenant(s) and/or owner(s). The residential facility may comprise a multi or a single family building. The residential facility may comprise an apartment complex. The residential facility may comprise a single family home. The residential facility may comprise multi-family homes (e.g., apartments). The residential facility may comprise townhouses. The facility may comprise residential and commercial portions.

In some embodiments, a window controller can be integrated with a BMS. For example, the window controller can be configured to control one or more tintable windows (e.g., electrochromic windows). In one embodiment, the one or more electrochromic windows include at least one all solid state and inorganic electrochromic device, but may include more than one electrochromic device, e.g., where each lite or pane of an IGU is tintable. In one embodiment, the one or more electrochromic windows include only all solid state and inorganic electrochromic devices. In one embodiment, the electrochromic windows are multistate electrochromic windows. Examples of tintable windows can be found in, in U.S. patent application Ser. No. 12/851,514, filed on Aug. 5, 2010, titled "MULTI-PANE ELECTROCHROMIC WINDOWS," which is incorporated herein by reference in its entirety.

In some embodiments, sensor(s) and/or emitters/actuators are operatively coupled to at least one controller and/or processor. Sensor readings may be obtained by one or more processors and/or controllers. A controller may comprise a processing unit (e.g., CPU or GPU). A controller may receive an input (e.g., from at least one sensor). The controller may comprise circuitry, electrical wiring, optical wiring, socket, and/or outlet. A controller may deliver an output. A controller may comprise multiple (e.g., sub-) controllers. The controller may be a part of a control system. A control system may comprise a master controller, floor (e.g., comprising network controller) controller, a local controller. The local controller may be a window controller (e.g., controlling an optically switchable window), enclosure controller, or component controller. For example, a controller may be a part of a hierarchal control system (e.g., comprising a main controller that directs one or more controllers, e.g., floor controllers, local controllers (e.g., window controllers), enclosure controllers, and/or component controllers). A physical location of the controller type in the hierarchal control system may be changing. For example: At a first time: a first processor may assume a role of a main controller, a second processor may assume a role of a floor controller, and a third processor may assume the role of a local controller. At a second time: the second processor may assume a role of a main controller, the first processor may assume a role of a floor controller, and the third processor may remain with the role of a local controller. At a third time: the third processor may assume a role of a main controller, the second processor may assume a role of a floor controller, and the first processor may assume the role of a local controller. A controller may control one or more devices (e.g., be directly coupled to the devices). A controller may be disposed proximal to the one or more devices it is controlling. For example, a controller may control an optically switchable device (e.g., IGU), an antenna, a sensor, and/or an output device (e.g., a light source, sounds source, smell source, gas source, HVAC outlet, or heater). In one embodiment, a floor controller may direct one or more window controllers, one or more enclosure controllers, one or more component controllers, or any combination thereof. The floor controller may comprise a floor controller. For example, the floor (e.g., comprising network) controller may control a plurality of local (e.g., comprising window) controllers. A plurality of local controllers may be disposed in a portion of a facility (e.g., in a portion of a building). The portion of the facility may be a floor of a facility. For example, a floor controller may be assigned to a floor. In some embodiments, a floor may comprise a plurality of floor controllers, e.g., depending on the floor size and/or the number of local controllers coupled to the floor controller. For example, a floor controller may be assigned to a portion of a floor. For example, a floor controller may be assigned to a portion of the local controllers disposed in the facility. For example, a floor controller may be assigned to a portion of the floors of a facility. A master controller may be coupled to one or more floor controllers. The floor controller may be disposed in the facility. The master controller may be disposed in the facility, or external to the facility. The master controller may be disposed in the cloud. A controller may be a part of, or be operatively coupled to, a building management system. A controller may receive one or more inputs. A controller may generate one or more outputs. The controller may be a single input single output controller (SISO) or a multiple input multiple output controller (MIMO). A controller may interpret an input signal received. A controller may acquire data from the one or more components (e.g., sensors). Acquire may comprise receive or extract. The data may comprise measurement, estimation, determination, generation, or any combination thereof. A controller may comprise feedback control. A controller may comprise feed-forward control. Control may comprise on-off control, proportional control, proportional-integral (PI) control, or proportional-integral-derivative (PID) control. Control may comprise open loop control, or closed loop control. A controller may comprise closed loop control. A controller may comprise open loop control. A controller may comprise a user interface. A user interface may comprise (or operatively coupled to) a keyboard, keypad, mouse, touch screen, microphone, speech recognition package, camera, imaging system, or any combination thereof. Outputs may include a display (e.g., screen), speaker, or printer. FIG. 1 shows an example of a control system architecture 100 deployed at least partly in an enclosure (e.g., building) 160. Control system architecture 100 comprises a master controller 108 that controls floor controllers 106, that in turn control local controllers 104. In some embodiments, a local controller controls one or more IGUs, one or more sensors, one or more output devices (e.g., one or more emitters), or any combination thereof.

In some embodiments, a BMS includes a multipurpose controller. By incorporating feedback (e.g., of the controller), a BMS can provide, for example, enhanced: (1) environmental control, (2) energy savings, (3) security, (4) flexibility in control options, (5) improved reliability and usable life of other systems (e.g., due to decreased reliance thereon and/or reduced maintenance thereof), (6) information availability and/or diagnostics, and/or (7) higher productivity from personnel in the building (e.g., staff). These enhancements may derive (e.g., automatically) controlling any of the devices. In some embodiments, a BMS may not be present. In some embodiments, a BMS may be present without communicating with a master network controller. In some embodiments, a BMS may communicate with a portion of the levels in the hierarchy of controllers. For example, the BMS may communicate (e.g., at a high level) with a master network controller. In some embodiments, a BMS may not communicate with a portion of the levels in the hierarchy of controllers of the control system. For example, the BMS may not communicate with the local controller and/or intermediate controller. In certain embodiments, maintenance on the BMS would not interrupt control of the devices communicatively coupled to the control system. In some embodiments, the BMS comprises at least one controller that may or may not be part of the hierarchal control system.

FIG. 1 shows an example of a configuration in which the master controller is operatively coupled (e.g., wirelessly and/or wired) to a building management system (BMS) 124 and to a database 120. Arrows in FIG. 1 represents communication pathways. A controller may be operatively coupled (e.g., (i) directly/indirectly and/or (ii) wired and/or wirelessly) to an external source 110. The external source may comprise a network. The external source may comprise one or more sensors or output devices (e.g., emitters). The external source may comprise a cloud-based application and/or database. The communication may be wired and/or wireless. The external source may be disposed external to the facility. For example, the external source may comprise one or more sensors and/or antennas disposed, e.g., on a wall or on a ceiling of the facility. The communication may be monodirectional or bidirectional. In the example shown in FIG. 1, the communication all communication arrows are meant to be bidirectional.

In some embodiments, portions of a building's communications network may be logically and/or physically divided into one or more vertical data planes and one or more horizontal data planes. A function of a vertical data plane may be to provide data communication and, optionally, electrical power vertically with respect to earth (e.g., between floors of a multi-floor building). A function of a horizontal data plane may be to provide data communications and/or power to network nodes on one or more floors of a building. In some embodiments, a building's communications network employs a vertical plane linked to a plurality of horizontal data planes by control panels. At least one control panel may be provided for a (e.g., for each) horizontal data plane.

In some embodiments, infrastructure described herein provides a communication network and/or power resources for the building. The communication infrastructure can be disposed around the perimeter of the facility (e.g., the building) and/or within the facility. The communication infrastructure can provide a separate communications and/or power distribution system on at least one (e.g., on cach) of multiple floors, e.g., on all floors of a building. The infrastructure may be installed when the facility is being constructed and/or as part of a renovation. The infrastructure may provide high speed communications and/or power taps (e.g., at specified locations) throughout a facility. For example, the communication infrastructure can be disposed around perimeter walls of a building, floor, room, along a ceiling, along a floor, or other region of a facility. The communications may be at a rate of at least about 1 Giga bit per second (1 Gbit/s), 2 Gbit/s, 5 Gbit/s, 10 Gbit/s, 50 Gbit/s, 100 Gbit/s, or 500 Gbit/s.

In some embodiments, direct connections to an infrastructure of the facility are provided via power and/or communication docks in devices such as network adaptors. Wires that connect to network adaptors may be strung in various locations such as in the walls of buildings. In certain embodiments, wires are disposed in window frames (e.g., horizontal and/or vertical mullions) above or below windows. Horizontal mullion may be referred to as transom. In certain embodiments, wires are disposed underneath a floor surface, e.g., within a floor plate. In certain embodiments, wires are disposed above a ceiling surface, e.g., within a floor plate. The network may comprise wired and/or wireless network. The wired network may comprise coaxial wires, optical fibers, or twisted wires. The network may provide one or more services. The services can be leased services. Examples of services include Wi-Fi, cellular communications, streaming internet, and/or other IT related services. The communication network may comprise one or more levels of encryption. The communication network may be communicatively coupled to the cloud and/or to one or more servers external to the facility. The communication network may support at least fourth generation wireless (4G), or fifth-generation wireless (5G) communication. The communication network may support cellular signals external and/or or internal to the facility. The downlink communication network speeds may have a peak data rate of at least about 5 Gigabits per second (Gb/s), 10 Gb/s, or 20 Gb/s. The uplink communication network speeds may have a peak data rate of at least about 2 Gb/s, 5 Gb/s, or 10 Gb/s.

In some embodiments, the communication network is distributed in a horizontal and/or vertical plane. A horizontal plane may comprise a linear network topology communicatively coupled to at least one control panel. The control panel may be disposed at a terminus of a data transmission medium. A plurality of devices (e.g., nodes) can be connected along the length of the data transmission medium (downstream from the control panel). In some embodiments, the transmission medium (e.g., a network cable such as a coaxial and/or a twisted pair cable) is located around some or all the perimeter of a floor of a building. In some embodiments, at locations along the network cable there are electrical couplings (e.g., a network adapter) for connecting to one or more nodes (e.g., end nodes). In some embodiments, the electrical couplings are caps, which are passive or active devices. The cap provides an electrical coupling between the network cable and associated nodes (e.g., any one of the devices served by the horizontal data plane). In some embodiments, the electrical couplings are provided at regular intervals such as at vertical mullions (e.g., at about at least every five feet).

In some embodiments, a plurality of clients (e.g., devices or software) may be operatively (e.g., communicatively) coupled to the communication network. The communication network may be operatively (e.g., communicatively) coupled to a control system. The plurality of devices may be disposed in a facility (e.g., including a building and/or room). The control system may comprise the hierarchy of controllers. The communication network may be operatively (e.g., communicatively) coupled to one or more clients (e.g., devices). The clients may comprise an emitter, a sensor, a media display, a personal computer system, a window (e.g., IGU), an HVAC system, lighting, or a software module. Examples of personal computer system, control system, and network can be found in International Patent Application Serial No. PCT/US2018/029406 filed Apr. 25, 2018, which is incorporated herein by reference in its entirety. The client may be a node (e.g., having a unique address and/or a circuitry such as a processor). The unique address can comprise an internet protocol address (abbreviated herein as "IP" address). The devices may comprise an emitter, a sensor, a window (e.g., IGU), an HVAC system, or a light. The heating, ventilation, and air conditioning may be abbreviated herein as "HVAC." The device may be any device as disclosed herein. The client may have a unique identity (e.g., a unique cryptographic identity). At least two of the plurality of clients (e.g., devices) may be of the same type. For example, two or more IGUs may be coupled to the network (e.g., to the control system). At least two of the plurality of devices may be of different types. For example, a sensor and an emitter may be coupled to the network. At times the plurality of clients may comprise at least about 20, 50, 100, 500, 1000, 2500, 5000, 7500, 10000, 50000, 100000, or 500000 clients. The plurality of clients may be of any number between the aforementioned numbers (e.g., from 20) clients to 500000 clients, from 20 clients to 50 clients, from 50 clients to 500 clients, from 500 clients to 2500 clients, from 1000 clients to 5000 clients, from 5000 clients to 10000 clients, from 10000 clients to 100000 clients, or from 100000 clients to 500000 clients). For example, the number of windows (e.g., IGUs) in a floor may be at least 5, 10, 16, 20, 25, 30, 40, or 50. The number of windows in a floor can be any number between the aforementioned numbers (e.g., from 5 to 50, from 5 to 25, or from 25 to 50). At times the clients may be in a multi-story building. At least a portion of the floors of the multi-story building may have clients controlled by the control system (e.g., at least a portion of the floors of the multi-story building may be controlled by the control system). For example, the multi-story building may have at least 2, 8, 10, 25, 50, 80, 100, 120, 140, or 160 floors that are controlled by the control system. The number of floors (e.g., devices therein) controlled by the control system may be any number between the aforementioned numbers (e.g., from 2 to 50, from 25 to 100, or from 80 to 160). The floor may be of an area of at least about 160 $m^2$, 250 $m^2$, 50 $m^2$, 1000 $m^2$, 1600 $m^2$, or 2000 square meters ($m^2$). The floor may have an area between any of the aforementioned floor area values (e.g., from about 160 $m^2$ to about 2000 $m^2$, from about 160 $m^2$ to about 500 $m^2$, from about 250 $m^2$ to about 1000 $m^2$, or from about 1000 $m^2$ to about 2000 $m^2$).

In some embodiments, a client comprises a device or a software. The software may be a software agent. The software agent may server as an intermediately client, e.g., between a device and the controller, or between a device and user. The software agent may perform filtering functions.

Figure 2:
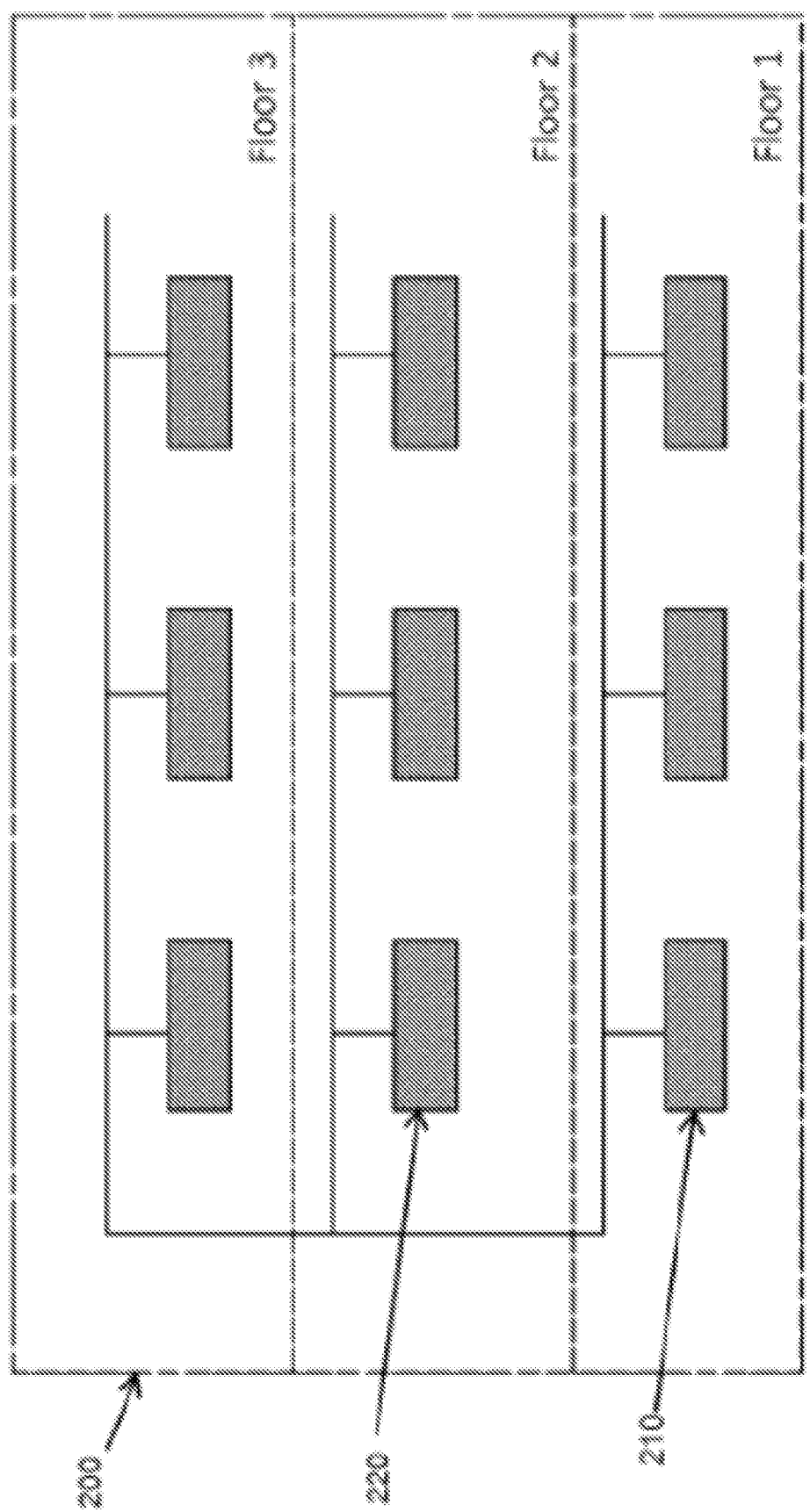
FIG. 2 schematically depicts various devices disposed in enclosures, such as floors of a building.
Figure 3:
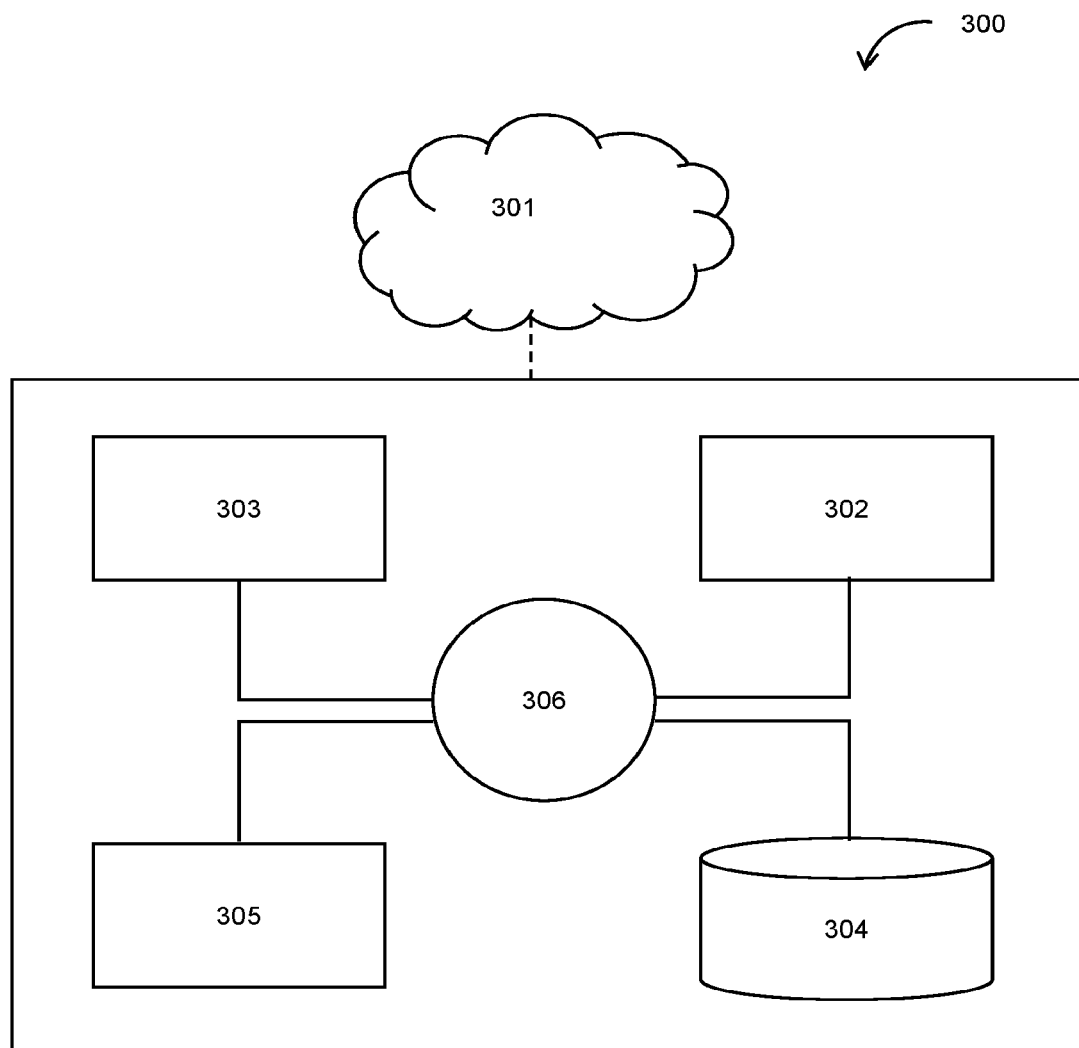
FIG. 3 schematically depicts a processing unit.

In some embodiments, a plurality of clients (e.g., devices) may be provided throughout a facility. FIG. 2 shows a schematic example of a communication network (e.g., controller network) in an enclosure. In the example of FIG. 2, the enclosure 200 is a building having floor 1, floor 2, and floor 3. The enclosure 200 includes a network 220 (e.g., a wired network) that is provided to communicatively couple a community of clients (e.g., devices) 210. In the example shown in FIG. 2, the three floors are sub enclosures within the enclosure 200. The network may be operatively coupled to at least one processor (e.g., to a processing system). FIG. 3 schematically depicts a processing system.

In some embodiments, network nodes operate as clients (e.g., virtual clients and/or physical clients) coupled to the network. The virtual client may comprise a software. Two or more clients (e.g., devices and/or software) can be bundled into an ensemble. The ensemble may comprise sensor(s), emitter(s), and/or software modules (e.g., inscribed on a non-transitory and/or non-volatile media). For example, an ensemble may include a carbon dioxide sensor, a carbon monoxide sensor, a volatile organic chemical sensor, an ambient noise sensor, a visible light sensor, a temperature sensor, and/or a humidity sensor. The ensemble may comprise non-sensor devices (e.g., emitters and/or output devices), such as buzzers or light emitting diodes. The ensemble may comprise physical entities (e.g., devices and/or emitters) and non-physical entities (e.g., software). The ensemble may comprise at least two clients of the same type and/or of the same cryptographic identity. The ensemble may comprise at least two clients of a different type and/or of a different cryptographic identity. The ensemble may comprise a circuitry. The clients may be coupled to the circuitry. The ensemble may comprise, or be operatively coupled to, a controller (e.g., a local controller). Examples of ensembles and their uses can be found in U.S. patent application Ser. No. 16/447,169, filed Jun. 20, 2019, titled "SENSING AND COMMUNICATIONS UNIT FOR OPTICALLY SWITCHABLE WINDOW SYSTEMS," that is incorporated herein by reference in its entirety. A client (e.g., device) can be a standalone client (e.g., not incorporated in an ensemble). The client may comprise a display construct (e.g., a LED construct such as a transparent organic LED display construct). The display construct may be operatively coupled to the window (e.g., IGU), e.g., to display the media in a light of sight with the window (e.g., in front of the window). The standalone client can provide one or more services. These service(s) may be made available to other clients, e.g., through the network. In some embodiments, a (e.g., each) client (e.g., device) encodes for its object identification (abbreviated herein as object "ID"). In some embodiments, each client encodes for its logical ID(s). The object ID may be a unique device address. The logical ID can indicate which service is running on the client. The logical ID may be used to separate each service running on the client (e.g., device) and/or assists in message routing. The service on the client can have a unique logical ID. For example, a client may be a temperature sensor, and the service may be sensing temperature. For example, a client may be a light emitting diode (LED) and the service may be emitting light. For example, a client may be a software to direct tinting of an electrochromic window, and the service may be an output of directions to tint the electrochromic window.

In some embodiments, nodes communicate by sending messages according to a publish-subscribe messaging system. The nodes may be are interconnected according to a network topology (e.g., comprising a star topology or a linear topology). A publish-subscribe network protocol can be a mechanism utilized to route and/or manage messages in various communication channels. Examples for publish-subscribe network protocols are Message Queuing Telemetry Transport (abbreviated herein as "MQTT") and Advanced Message Queuing Protocol (abbreviated herein as "AMQP"). The publish-subscribe network protocol is a software technology for machine to machine communication which can enable the use of topics to distribute pay loads of data. MQTT is an open Organization for the Advancement of Structured Information Standards (OASIS) standard and an International Organization for Standardization (ISO) standard (ISO/IEC PRF 20922) providing a lightweight, publish-subscribe network protocol that transports messages between devices. AMQP is an open standard application layer protocol for message oriented middleware. For example, features of AMQP include message orientation, queuing, routing (including point-to-point and publish-and-subscribe), reliability, and/or security. Publish-subscribe protocols can be suitable for communications between devices capable of a network connection, including any internet of things (IoT) devices (e.g., location sensors to toilets, or fish tanks to computer numerical control (CNC) machines).

With a publish-subscribe protocol, node to node (e.g., client to client) communication is facilitated on a network according to predefined message types (e.g., service based message definition). One message type, for example, is a Broadcast message which uses a communication channel between one client and all other clients (target clients) on the network (e.g., communicatively coupled to the network). All clients communicatively coupled the network may be required to subscribe in order to receive Broadcast messages (e.g., for receiving system critical information). Another message type, for example, is collection-based (e.g., one node to many nodes) wherein messages are identified according to topics (e.g., tasks). Topics can define the relevance of messages (e.g., commands or data) to particular types of nodes (e.g., clients). A node can register its interest in receiving messages (e.g., according to a particular topic) by sending a subscribe request to a message broker. The broker can be an intermediary through which all messages pass within a particular network of nodes. Thereafter, messages can be published to the broker which forwards the published message to the target nodes (e.g., target clients) that are subscribed to the topic of the message. For example, node devices which control the activation of lights can be subscribed to a "Lights" topic. When a command is generated at a control node indicating that a user desires to dim the lights in a particular location x, then the control node can publish a message to the Lights topic with a command directing the nodes to "dim if you are in location x." Topics can be organized into many levels of sub-topics. Topics can be represented as text strings within a message, with a forward slash ("/") placed between topic levels (e.g., "Building3/Settings/Lights").

Figure 4:
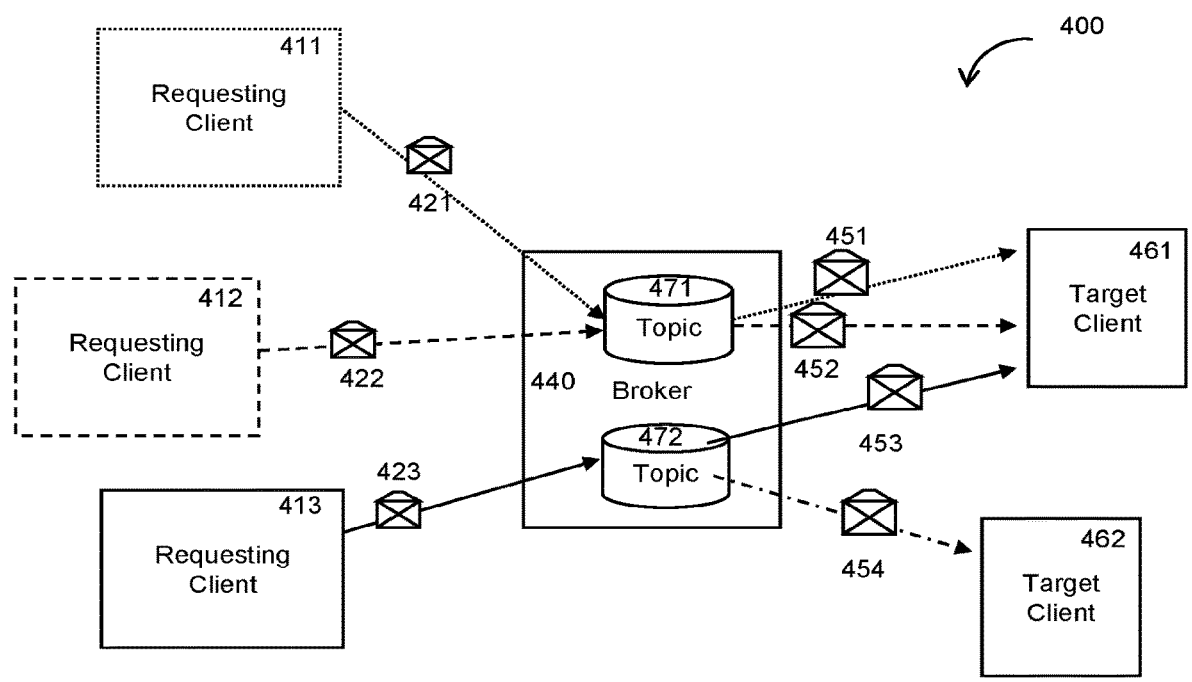
FIG. 4 schematically depicts a publish-subscribe communication network utilizing topics.

FIG. 4 shows an example of message distribution in a publish-subscribe message system 400. A broker 440 is a network component (e.g., a software entity running on a node within the network) communicatively coupled to clients (e.g., nodes) 411, 412, 414, 461, and 462. Broker 440 stores a topic list including topics 471 and 472. Topics 471 and 472 may be initially created in response to subscribe messages identifying the topics sent from clients 461 and 462, respectively. Example messages are shown which are published to broker 440 and relayed to appropriate ones of the client nodes. In the examples, clients 411, 412, and 414 are acting as requesting clients (e.g., clients publishing messages to the topics). Clients 461 and 462 are acting as target clients of the example messages. In some embodiments, published messages can utilize either task-oriented topics (unmodified) or client-ID-oriented topics (modified). For example, message 421 being published by requesting client 411, topic 471 is received and analyzed by broker 440 which finds the subscription to topic 471 that identifies target client 461. In response, broker 440 sends a message 451 to client 461 carrying the contents of message 421. In the example of using a modified topic that uniquely identifies target client 461, only client 461 would be subscribed and broker 440 would only re-publish message 421 to client 461. If instead, topic 471 was a task-oriented topic then additional clients may be subscribed and broker 440 would re-publish corresponding messages to each subscribed client. In another example message 422 from requesting client 412, the same topic 471 is specified. As a result, a corresponding message 452 is forwarded (re-published) as a message 452 to target client 461. An example message 423 may be published by requesting client 414 specifying a topic 472, to which target client 461 is subscribed. In this example, topic 472 may define a group of unique target clients. Consequently, broker 440 re-publishes a message 452 to client 461 and a message 454 to client 462 based at least in part on message 423.

Available software for implementing publish-subscribe network protocols have used an addressing scheme geared towards task identification rather than towards client identification. Task-driven messaging can be cumbersome, especially when applied in a system with many types of different clients, each having different task types. In some embodiments of the invention, use of the topic space is modified so that a topic can uniquely identify the node client (e.g., object) to receive a message. The client can be referred herein as "object." The Object can be a physical object (e.g., a device) or a virtual object (e.g., software). Uniquely identifying the node (e.g., the client. E.g., the object) can facilitate dynamic discovery of services offered by an object (e.g., devices can be dynamically discoverable and agnostic to device addressing). The infrastructure of the publish-subscribe (e.g., queuing) message system may be retained, at least in the broker, as the modified topics that provide client identification can be sent in a similar manner to the task-based topics. The system infrastructure can include on-premises software installed and running on the nodes (e.g., computers) on the premises of the user (e.g., person or organization) that utilizes the software. The system infrastructure can include software installed at a location external to the facility (e.g., in a server farm or cloud). On-premises software is sometimes referred to as "shrink-wrap" software, as compared to off-premises software which is commonly called "software as a service" ("SaaS") or "cloud computing."

The communication sensor may comprise a broker. A requesting client (e.g., a device such as a sensor) may use the network in an attempt to connect (e.g., to the broker or to a target client). The broker may send a message to an authenticating client. For example, the message may be on a known topic that is monitored by the authentication software (e.g., a software client). The device may be discovered on the network through its connection attempt. The broker can verify the identity and/or type of the requesting client. The broker may verify the services advertised by the requesting client. The broker may verify the requesting client. The broker may verify what level of access the device is authorized to have. The level of access may comprise what devices and/or device types the requesting client is allowed to communicate with. The level of access may comprise what message, message section, and/or message content (e.g., data and/or values) the requesting client is allowed to be exposed to (e.g., allowed to have access to). The broker may utilize a software agent client to evaluate the level of access of the requesting client. The broker may validate the identity of the requesting client (e.g., by answering the question: is the requesting client what it proports to be?), e.g., using a software agent (e.g., software client). The software client may be communicatively coupled to the broker as a target client. The broker may send a request (e.g., validation request of a requesting client). The software agent may then respond to the broker and thus disable or enable connection of the requesting client (e.g., a device) to connect to a more restricted communication channels (e.g., communication channel that reveals topics and/or data).

In some embodiments, utilization of the modified topics reduces the overall number of topics required in a system (e.g., and thus improves memory utilization and disc unitization). For example, direct messaging of data can be done (e.g., only) to clients that need to know certain message types. For example, direct messaging of data can provide more control over which clients can access messages. This architecture may be advantageous in a confidential system (e.g., an encrypted system). The confidential system may have various levels of confidentiality (e.g., various levels of encryption) that limit access to information communicatively coupled to the network. For instance, a "dim lights" message can be sent (published) only to the target room instead of telling all lights to "dim if you are in this room."

In some embodiments, the re-defined topic space can uniquely identify any particular client (i.e., object) regardless of the tasks performed. This may further facilitate dynamic discovery of services offered by an object. The dynamic discovery may comprise self-discovery of a (e.g., requesting) client on the network, e.g., (i) by (e.g., communicatively) coupling the client to the network and/or (ii) by sending a service request to the network, which service request is made by the requesting client. The service request may comprise a joining request to the network and/or a service request from a target client. The different types of tasks may be specified in the message data (e.g., pay load) of any particular message. Using the message topic to specify an ID of a targeted client for receiving a message can facilitate a "Message→Acknowledgement" architecture (e.g., providing acknowledgements that confirm reception of a message and/or reception of an acknowledgement).

In some embodiments, a publish-subscribe message protocol (e.g., MQTT on-premises, or AMQP) architecture comprises message types of Broadcast, Group, and Direct. Broadcast-type messages provide a communication channel between one client and all other clients on the network (e.g., all other nodes are the target clients). All clients in the network must subscribe to Broadcast, which may be used to communicate system critical information. Group-type messages provide a communication channel between one client and all clients in a group that are the target clients. Each group can have its own identifier contained in the topic string (which can be, but is not necessarily, a number). The groups can be any group disclosed herein, e.g., according to any criteria disclosed herein (e.g., proximity, utilization, and/or encryption level). Direct-type messages provide a communication channel between one client to a target client (e.g., peer-to-peer). The target client has a unique client ID indicated in the address (e.g., topic string) of the message data (e.g., an address to which a message data or pay load should be sent). An ID of the sending client may be embedded in the message data (payload) sent to the target client to facilitate return messages (e.g., acknowledgements).

In some embodiments, a topic string follows a protocol to enable message handling according to virtual communication channels including:
Entity Name/log
Entity Name/event
Entity Name/broadcast
Entity Name/group/GroupID #
Entity Name/object (client)/ObjectID #/(msg or ack)
Entity Name/object (client)/ObjectID #/(msg or ack)/ logical-ID # of the recipient In these examples, the first element of the topic string (e.g., "Entity Name") can identify a superset of interconnected nodes that interact according to a shared protocol with the enhanced features disclosed herein. The Entity Name can be an owner or renter of the facility or a facility portion. For example, it can be a company or a person. The Entity Name can be the service provider. When multiple service providers utilize the same network, the message should contain the name of the service provider (e.g., company name and/or company ID). In some embodiments, the Entity Name is omitted from the string, e.g., where there is a single service provider. The presence of a direct client ID in the topic string can be identified by including an intermediate sub-string (e.g., "Object" or "Group") before the ObjectID #, which is referred to herein as an address flag sub-topic segment. The address flag signifies that the next level in the topic string provides a unique address of a client or a group name. In some examples, the word "Object" used as the address flag indicates that a topic is formatted according to a direct addressing scheme could instead be replaced with other strings which define particular classes or types of objects. The topic strings ⟨⟨Entity Name/log⟩⟩, ⟨⟨Entity Name/event⟩⟩, and ⟨⟨Entity Name/broadcast⟩⟩ can be system messages in the Broadcast type. The topic string ⟨⟨Entity Name/group/GroupID #⟩⟩ can identify a Group-type message that provides direct addressing to a group of nodes (clients). Peer-to-peer Direct messaging to a single client can be obtained using the topic string ⟨⟨Entity Name/ObjectType (client)/ObjectID #/(msg or ack)⟩⟩ when the object is the identified client and the topic string ⟨⟨Entity Name/ObjectType(client)/ObjectID #/(msg or ack)/logical-ID #⟩⟩ when an object has a plurality of components (e.g., a sensor ensemble) and the intended client interaction is directed to one of the components (e.g., a sensor). The ObjectID # and GroupID # occupy an ID sub-topic segment of the topic string. A topic level which can carry a value of "msg" or "ack" can be used to indicate whether a message is an initial message or an acknowledgement message.

In some embodiments, the logical-ID # is used to identify a service. A service can be hardware information, a tint command, a sensor action, and/or turning on or off a component. Such service can have a unique logical-ID #. For example, a sensor ensemble can be broken up to services including: $CO_2$ level, light, noise, temperature, or humidity. The sensor can be uniquely identified by a respective logical-ID # (that shares the ObjectID of the device). Operation of different objects (e.g., devices such as sensors) would not be required to depend upon each other, but coordination of object operation could be considered (e.g., in sensor coexistence).

In some embodiments, after a message is published by a client using topic addressing then the message is read and acted upon by the broker. A broker receives the communication from the initiating client and sends it to the target client(s), depending on the communication type (e.g., broadcast, group, or direct). The addressing should contain the ID of the target client and optionally a target logical ID (e.g., component) when applicable.

The addressing scheme is analogous to mailing a letter using a street addressed envelope specifying a building (e.g., object) having an apartment (e.g., object ID). Each device will register a self-identifying topic and will collect all known objects that are discoverable. Each device can discover the available object types and what topic is associated with each individual device/object type.

Figure 5:
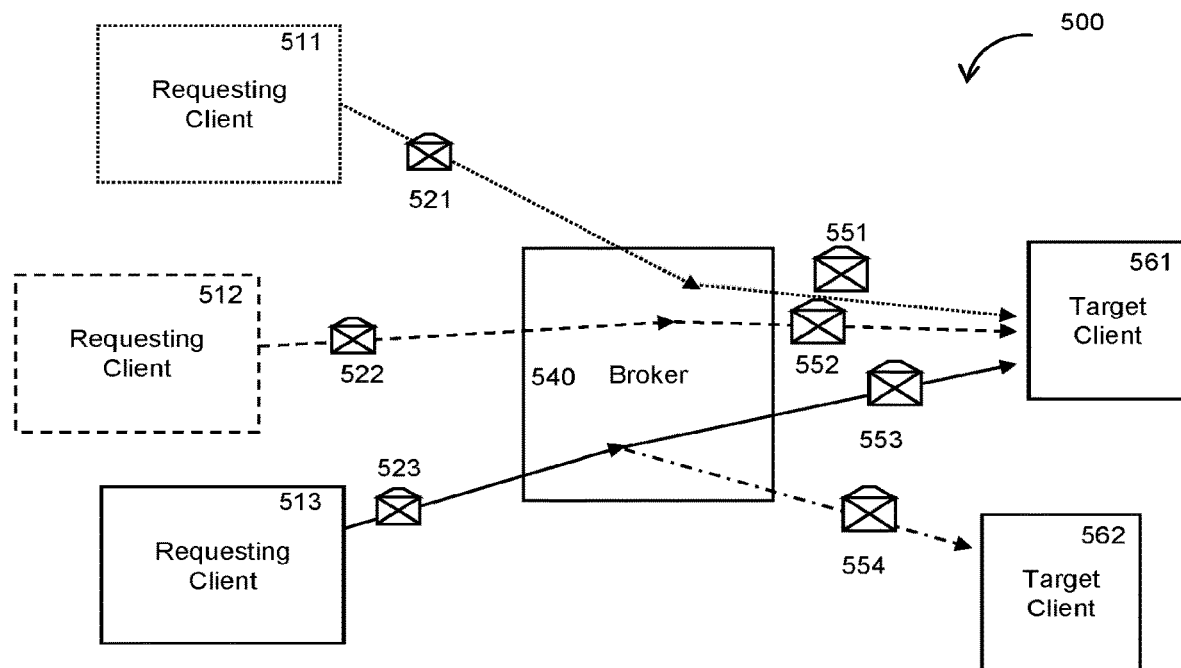
FIG. 5 schematically depicts a publish-subscribe communication network having messaging between clients via the broker.

FIG. 5 shows an example of message publication in a publish-subscribe message system 500 with direct peer-to-peer and group messaging. A broker 540 is a network component (e.g., a software entity running on a node within the network) communicatively coupled to clients (e.g., nodes) 511, 512, 514, 561, and 562. Although broker 540 stores a topic list, messages sent according to the direct addressing hereof pass through broker 540 along a virtual direct channel. Example messages are shown which are published to broker 540 and relayed directly to appropriate ones of the client nodes. In the examples, clients 511, 512, and 514 are requesting clients and clients 561 and 562 are acting as target clients of the example messages. Client 511 sends a peer-to-peer message 521 which is relayed by broker 540 to client 561 as a message 551. Client 512 sends a peer-to-peer message 522 which is relayed by broker 540 to client 561 as a message 552. Client 514 sends a group message 523 to broker 540, which relays messages 553 and 554 to clients 561 and 562, respectively, as identified in a Group # recognized by broker 540.

In some embodiments, the individual device addressing is obtained by the modified use of topics to include a client (e.g., target) type and a client ID, and in some embodiments a service/process (logical ID) of the corresponding client (also referred to herein as "object"). In a traditional publish-subscribe network protocol, the devices do not communicate (directly or indirectly) with each other. In some embodiments of the invention, they communicate via the broker using a topic string that achieves direct addressing. For example, the broker can be used as a message router from one device to another (e.g., as a post office service), which can be useful when the devices have different available services (e.g., actions). In an example messaging system using unmodified task-driven topics, a client 1 and a client 2 may each be subscribed to a different topic. In the example, these clients do not have any connection with one another, however, they are each connected to a broker node. After client 1 publishes a message to a topic which is subscribed to by client 2, the broker publishes the message to client 2. In a known protocol, client 2 can acknowledge receipt of the message to the broker, but no acknowledgement would have been possible to client 1. Furthermore, the traditional publish-subscribe network protocol does not have reassurance as there is no feedback from the client to the broker (e.g., that the broker message was valid and/or that the first client actually received the message sent by the broker).

In an example messaging system with modified use of topics to include direct addresses, a topic string embedding an address can have a form Entity Name/Object/<Object ID>/<Logical ID> for sending a message payload. "Object ID" may be a unique identifier for a real client (e.g., sensor or emitter) or virtual client (e.g., software) instance and Logical ID may be a unique identifier of a service instance (process) of the client. In some embodiments, the Object ID in the topic can support 'Groups' as a means of making device collections. Group assignments can be manual. For example, creation of criteria for group matching implementation may be devoid of heuristics. Services may gather (e.g., and filter) a list of object IDs and then request that a group containing those objects be made. To select the Group, the service can be free to use any heuristics, filters, and/or manual intervention. The Object ID can be categorized (e.g., by ensemble types, by device types, or services) or not categorized (e.g., be a running serial number (e.g., MAC address), or a non-colliding random number).

In some embodiments, the Object ID provides a unique identifier of the client. In some following examples, a simplified "serial number" is used to provide a representation of a unique Object ID as a 4-digit number. Any scheme providing unique labels can be used. Systems (i) having hundreds of nodes and/or (ii) accommodating removal and addition of nodes over time, could require burdensome administration and tracking of labels. In some embodiments, devices may have existing unique identifiers that can be used as Object IDs (e.g., a MAC address of devices having a network interface) which can avoid the need for administration.

In an example, an address formatted to comply with a topic protocol for an electrochromic window controller device can be Entity Name/Object/0125, wherein 0125 indicates a 'serial number' of a window device (e.g., IGU). In an example of a device having a plurality of available services (e.g., a sensor ensemble), an address could be Entity Name/Object/0024/0345, wherein 0345 indicates the serial number of a temperature sensor within the ensemble, and 0024 indicates the serial number of the ensemble in which the temperature sensor is located. In the same sensor ensemble, an address of Entity Name/Object/0024/0043 could represent a different service in the ensemble, e.g., wherein 0043 indicates a buzzer's serial number, and 0024 indicates the serial number of the ensemble in which the temperature sensor and buzzer located.

In some embodiments, objects (e.g., clients) are categorized in groups. The groups can be logically categorized. The groups may be categorized by client type, by a serial number of the client (e.g., object ID), by relative proximity to another client (e.g., within a distance threshold), by relative proximity to an anchor (e.g., within a distance threshold), by communal encapsulation (e.g., into a device such as an ensemble), by location (e.g., in the facility), by client process(es), by client utilization, by cryptographic identity of the client, and/or by connectivity to the network. The clients in the groups may be manually and/or automatically assigned to the groups. The anchor may be a physical location in the facility, e.g., a post, a window, or a particular physical client. The location in the facility may comprise a floor of the facility, a facade of the facility, and/or a portion of the facility that experiences similar (e.g., the same) environmental aspect(s). For example, all the western IGUs in a building may be a group. For example, all the sensor in the third floor of the building may be a group. For example, all the lights in the east-west facade of the building may be one group. For example, all the heaters in the shaded portion of the building may be one group. The environmental aspects may comprise level(s) of cloud coverage, sunlight, wind, or rain. For example, all the controllers disposed with a distance of up to about 30 centimeters from a window (e.g., local controllers) may be one group.

In some embodiments, a client (e.g., a temperature sensor on the Eastern facade of a building) is addressed as a member of a group. The group can be a more general class of items, e.g., a group of all sensors, of all devices, or, clients located on the eastern facade of the building). As an example, if all IGUs of group 1 should be sent to tint level 3, the message would be addressed to ServiceProvider/Group/01/00, and the message content would state {IGU_controller: set_tint:03}. An IGU may comprise a tintable window such as a window comprising an electrochromic device, a window comprising a suspended particle device (e.g., a liquid crystals). In some embodiments, messages not recognized by a client are ignored. For example, a sensor ignores the IGU tint messages.

In some embodiments, a message in the network is directed from a first client to at least one second client. The message may pass through a broker. In some embodiments, all messages in the network pass through the broker. A message may be directed from one client to the broker (e.g., an authentication and/or a request to join the network). In some embodiments, messages may be directed indirectly from one client to another (e.g., as they pass through the intermediately broker). The addressed message is based at least in part on a text string. The message (e.g., message content and/or address thereof) may refer to one or more (e.g., specific) services. The clients may comprise a device or a software.

In some embodiments, the topics reside on a master controller which embodies and/or incorporates the broker. A master controller can be a central processor (e.g., located in the facility such as, e.g., in a basement of the facility), a network controller, or a floor controller. The broker can run on any of the network nodes and/or can be executed in the cloud. In some embodiments, all directives (e.g., message content and/or requested actions) are embedded in the message data (e.g., pay load) rather than in the address, e.g., so that the broker implementation is unaffected.

In some embodiments, the control system has a master controller. The master controller could comprise one or more servers (e.g., a server class system). The control system may include a Broadcom system on a chip (SoC) having and/or an integrated (e.g., ARM-compatible) central processing unit (CPU) and/or on-chip graphics processing unit (GPU). The processor speed may be at least about 0.7 Giga hertz (GHz), 1.0 GHz, 1.4 GHz, or 1.5 GHZ. The on-board memory may be of at least about 0.256 gibibyte (MiB), 0.5 MiB, or 1 gibibyte (GiB) of random-access memory (RAM), with at least about 1 GiB, 2 GiB, 3 GiB, 4 GiB, 5 GiB, or 10 GiB of available memory. The processor may comprise an ARM processor (e.g., ARM processor of at least about 64-bit). The server may comprise a Server Base System Architecture (SBSA). The control system (e.g., the master controller) may comprise hardware redundancy. The hardware redundancy may comprise dual power supplies, Redundant Array of Independent Disks (RAID) system, and/or Error-correcting code (ECC) memory. The hardware may comprise a memory and/or memory architecture which has a reduced occurrence of (e.g., is immune to) single-bit errors. The hardware may comprise multiple physical disk drive components, e.g., that are organized into one or more logical units for the purposes of data redundancy and/or performance improvement.

In some embodiments, there is more than one broker in a network. For example, there can be more than one broker in the facility, in the building, or in the floor. The broker could be executed and/or be disposed on-premises or in the cloud. The broker(s) can receive connection requests and topics from clients (e.g., devices). A client can discover other clients using subject matter messages and/or each client can create one or more topics as direct addresses to itself by publishing them (e.g., sending a subscribe message to the broker containing its own address: Entity Name/Object/<Object ID>/<Logical ID). Thus, a client becomes subscribed to its own modified topics. Thereafter, when a Client A wants to send a message to a Service S of a Client B, then (I) Client A can publish a message to the broker with the topic Entity Name/Object/ObjectID_Type_of_B/msg/LogicalID_of_S, (II) the broker can publish the message to Client B (e.g., since it is subscribed to that topic), (III) Client B can receive the message and examine the payload, and (IV) Client B can publish an acknowledgement message to the broker with a topic address of Entity Name/Object ID of A/ack/LogicalID_of_A, if the message is of a type that warrants a response (e.g., in the form of an acknowledgement). The acknowledgement message is an optional validation feature of the publish-subscribe protocol described herein.

Figure 6:
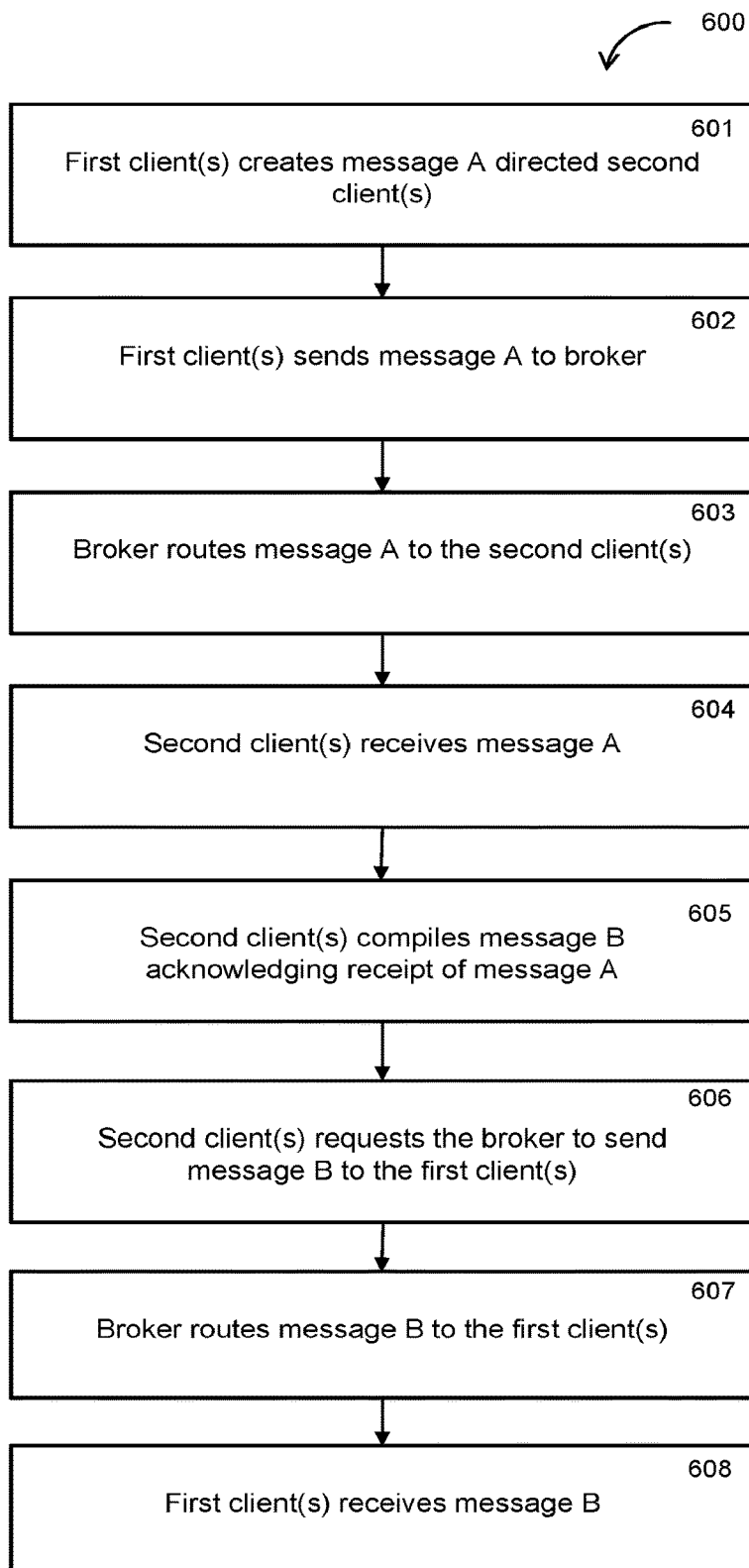
FIG. 6 shows a flowchart of a process for directing a message in a publish-subscribe system.

FIG. 6 shows an example of a flowchart showing one example of a message sequence 600. In block 601, a first client creates a message A directed to a second client (e.g., or group of clients having a same group ID). In block 602, the first client sends message A to the broker. Using the address expressed as a topic string in message A, the broker routes message A to the identified second client or group in block 603. In block 604, the second client receives message A and unpacks the message data (pay load), where it obtains the topic string address of the first client. In block 605, the second client compiles a message B for providing an acknowledgement of its receipt of message A. In block 606, the second client published message B to the broker. The broker routes acknowledgement message B to the first client in block 607. In block 608, the first client receives message B and unpacks its message data to obtain details of the acknowledgement.

In some embodiments, client(s) communicatively coupled to a network become aware of other client(s) and the available services according to a process for discovering client(s) on the network. For example, when a client is coupled into the network it may broadcast a unique ID and the services it can offer. When first starting up, a client (e.g., device) might want to discover all other clients on the network, e.g., to know who to communicate with. The client can accomplish this by broadcasting a discover (abbreviated as "DISC") message in Broadcast mode, wherein the pay load of the message is a discovery request (e.g., resource discovery request). A client receiving this message can acknowledge its receipt, thereby becoming known on the network. A discovery process can be utilized to discover all clients and/or all services on the network, only certain client types, and/or only certain service types by specifying in the payload of the DISC message and/or depending on the security status (e.g., cryptographic ID) of the client. In some embodiments, the capability to provide acknowledgement messages can allow for (e.g., dynamic) discovery of clients on the network. For example, by clients returning acknowledgements which contain their respective object IDs. In a traditional architecture of publish-subscribe message queueing, the client must trust the broker (with which the client is communicatively coupled), and there is no additional feedback (e.g., acknowledgement). In some embodiments, the broadcast topic is used to send a discover message. When a plurality of clients is subscribed to the broadcast topic, the plurality of devices will receive the discover message and can respond as appropriate.

In some embodiments, a message relayed to a client includes message data (e.g., a payload). The message data can be read and acted upon by the client. The broker disregards and/or is unable to interpret any message data. The message data can be encrypted. In some embodiments, the message data has three portions including source client Information, destination client Information, and service-specific Information. The source address information can be populated by the sending device with information about itself that can be used by the destination to respond to the sending client in the future (e.g., as an acknowledgement). The receiving client may (e.g., also) send a future unsolicited message to this client. The destination address information can identify which service on the receiving client should view this message (e.g., using a logical ID to disambiguate service instances). Deciphering the meaning of the service information can be limited to the client (e.g., service running on the client), or the clients in a group. In some instances, the service is understandable by all clients operatively coupled to the network (e.g., a network maintenance service).

In some embodiments, a message structure includes a header (for routing purposes) that includes information pertaining to the source and/or destination client (e.g., target client). Any information in the message structure can be encrypted. For example, the header can be encrypted. The decryption key(s) can be made available to the routing processes. The header may include a transaction ID, a service type ID, a service subtype, source client logical ID, and/or a message type. The service type ID can be used to identify a main functionality of the service running on a client (e.g., device). The service subtype can be used to organize multiple versions of a single service into sub-types. At least one of the sub-types may support additional messages beyond the main service. The service type and subtype can work together in a superclass to sub-class relationship. The publish-subscribe architecture can use messages containing data. The data can be inscribed in the form of fields (e.g., attributes and/or properties), and/or procedures (e.g., methods). The data can be inscribed in code (e.g., computer readable code). A feature of the objects may be a service of the object. The service can access and/or modify one or more data fields of the message associated with the object (e.g., with which the service and/or data is associated). The clients may interact with one another through the network (e.g., using the broker as an intermediary). The object may be an instance of a class or group. The class (or the group) may be determined by the type of the object. This architecture can, for example, be used in a sensor service. The sensor service can be broken up into subtypes which each handle a different subset of sensor data (e.g., $CO_2$, CO, TEMP, etc.). The source logical ID of the client can reveal which client is sending the message data. The message type can be selected from types that are known to the intended service (e.g., as identified by type and optionally by subtype). The message type can indicate what action to take or how to interpret the message data that follows. For example, with a message type may be "temperature." A message type could be a command for getting a sensor state, disabling a sensor, enabling a sensor, sampling a frequency of a sensor, and/or reporting frequency of a sensor. The message type can include an indicator that the message data is service configuration data. In some embodiments, the message data (also referred herein as "payload") may be encrypted such that only the receiving service can decrypt it. The message data can be any application-specific data (e.g., values) or commands. The message data can provide content of a requested task. For example, a commanded tint value (e.g., tint level 1, 2, 3, or 4) and/or a commanded frequency of sensor sampling (e.g., # of Hz). The payload can be analogized to a message placed in a street addressed envelope (e.g., message pay load includes a type of data that may correspond to subject matter which had been defined by the topic).

Figure 7:
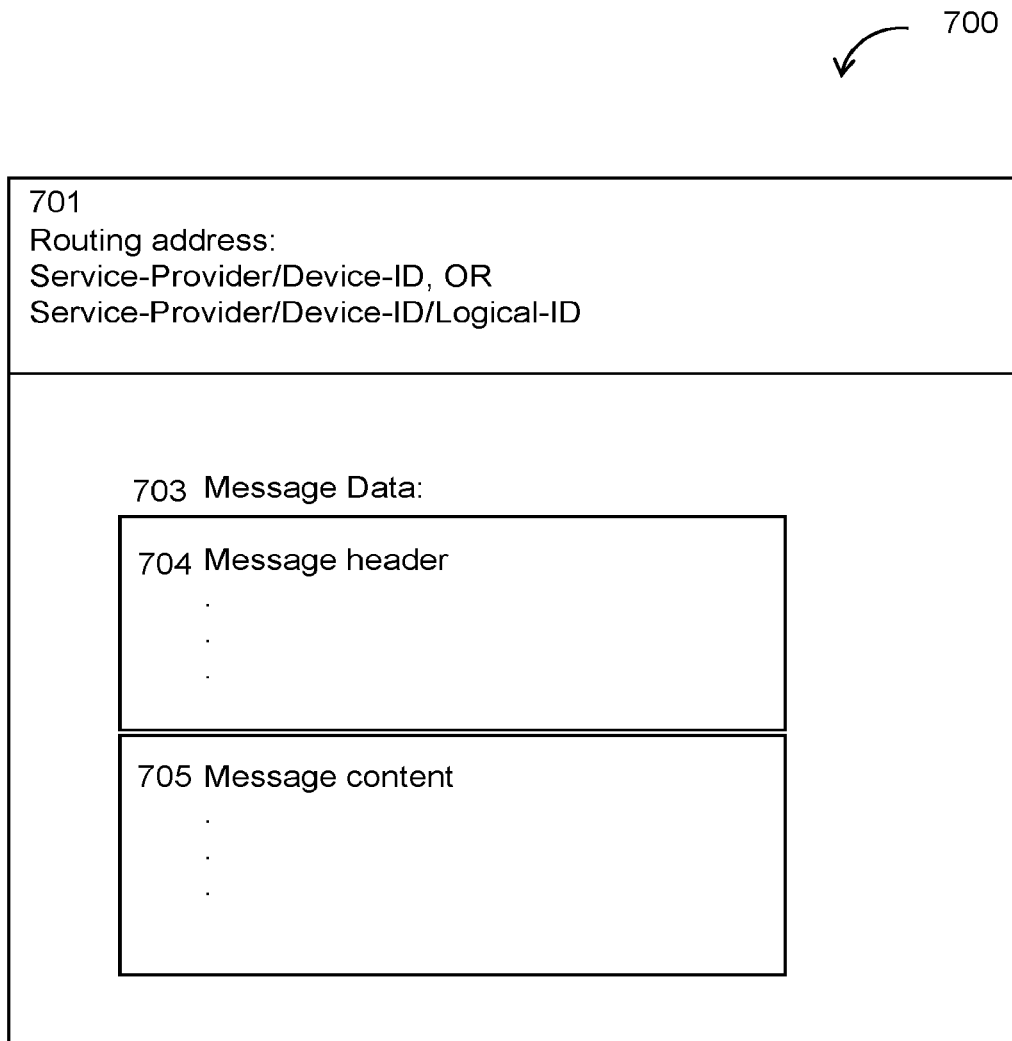
FIG. 7 is a schematic diagram showing a message format.

FIG. 7 shows an example message structure for a message 700 in a publish-subscribe messaging system. A first portion 701 of message 700 provides a routing address to be acted upon by the broker component of the messaging system. The routing address conforms to the protocol for a topic string. In order to provide a direct message, the topic-string routing address can have a form 《Service-Provider/Address-Flag/Object-ID》 or 《Service-Provider/Address-Flag/Object-ID/Logical-ID》. A second portion 703 of message 700 contains message data. In some embodiments, the message data can comprise a message header 704 (e.g., containing a transaction ID, a service type ID, a service subtype, source client logical ID, and/or a message type). In some embodiments, the message data can comprise a message content 705 (e.g., containing pay load data).

In some embodiments, every client can have a unique cryptographic identity. Any part of the message data (e.g., pay load) can be encrypted. The encryption may be (i) in a way that only one particular recipient can read it (and thus can censor the recipients through the encryption), or (ii) in a way that only a particular group of recipients can read it. In an example where only recipients (e.g., all clients on the network) of a particular service provider can read it, then the header (e.g., routing information) can be encrypted independently of message data. In that way, the broker can decrypt the header and route the message to the target service, while the message data remains opaque to (e.g., not accessible to and/or decipherable by) the broker. The target service may not need to decrypt the data, e.g., if its task is to deliver the message data to another client and/or process (e.g., a target device acting as a bridge to several medical devices). This bridge may be tasked with delivering the (e.g., encrypted) message data to a target client (e.g., medical device) where only the target client will be able to decrypt it. For example, the bridge can use the header information to select which target client receives the data, but the bridge has no need to decrypt the data in order to deliver the message to the target client. There can be one or more bridges in the communication path to the target client. In some embodiments, an encryption protocol can be implemented between the broker and the client(s), the encryption protocol can be a single level or a multi-level encryption protocol (e.g., two, or three level encryption protocol). For example, in a two level encryption protocol, one type of encryption can be used for requesting clients and another type of encryption can be used for target clients. In another example, one type of encryption can be used for incoming and outgoing messages from the system to clients outside the system, and a second type of encryption used for pay loads within the system. The encryption protocol can include any combination of these examples. There may be one or more (e.g., two) types and/or levels of encryption between a broker and a client. The encryption may comprise an encryption protocol. There may be a first encryption (level and/or type) for requesting clients; and there may be a second encryption (level and/or type) for requesting clients. There may be a first encryption (level and/or type) for incoming messaged; and there may be a second encryption (level and/or type) for outgoing messages. The outgoing messages may be outgoing from the network to clients outside the network. There may be a first encryption (level and/or type) for communication within the network; and there may be a second encryption (level and/or type) for four communication out of the network (e.g., communication network). The first encryption (level and/or type) may be the same or different from the second encryption (level and/or type). A software agent may assess what software process can be assigned a unique and/or trustable cryptographic identity.

In some embodiments, encryption is based at least in part on a combination of public and private keys (e.g., using public key infrastructure (PKI)). In some embodiments, messages are authenticated using digital certificates that are digitally signed using the private keys, and verified using the public keys. Based at least in part on the authentication, a broker can authorize or revoke access privileges for any local and/or remote clients.

The public key infrastructure (PKI) may include a set of roles, policies, hardware, software and/or procedures, needed to (i) create, manage, distribute, use, store and/or revoke digital certificates and/or (ii) manage public-key encryption, in order to facilitate the secure electronic transfer of information for a range of network activities. For example, it may be used (I) for activities where more rigorous proof than a password is needed to confirm the identity of the parties involved in the communication, (II) to validate the information being transferred, and/or (III) when password is otherwise inadequate. PKI may include an arrangement that binds public keys with respective identities of entities. The binding is established through a process of registration and issuance of certificates at and by a certificate authority (CA). The PKI role may be delegated by a CA to assure valid and correct registration to an entity called a registration authority (RA). In some embodiments, a CA includes a RA. A registration authority may be responsible for accepting requests for digital certificates, and for authenticating the entity making the request. An entity may be uniquely identifiable within each CA domain, e.g., at least in part on the basis of information about that entity. A third-party validation authority (VA) can provide this entity information on behalf of the CA.

In some embodiments, network messages are protected using a protocol configured to provide communications security over a computer network, e.g., Transport Layer Security (TLS) protocol or Secure Sockets Layer (SSL) protocol. TLS allows for communication to be encrypted and decrypted using secure keys and/or certificates. In TLS, the subject of a certificate may be a device, or any other client node. TLS certificates may identify the client node (e.g., device), organization, and/or individual. TLS is part of Hypertext Transfer Protocol Secure (HTTPS), a protocol for securely browsing the web. SSL is a standard security technology for establishing an encrypted link between a server and a client (e.g., a web server (website) and a browser, or a mail server and a mail client (e.g., Microsoft Outlook)).

In some embodiments, a certificate authority (CA) (also known as a "certification authority") is an entity that issues digital certificate that certifies the ownership of a public key by the named subject of the certificate. This allows others (relying parties) to rely upon digital signatures or on assertion(s) made about the private key that corresponds to the certified public key. A CA acts as a trusted third party, e.g., trusted both by the subject (owner) of the certificate and by the party relying upon the certificate (e.g., by the target local network). The certificates may utilize a certificate format that is publicly used and/or is widely available. For example, the certificates may use a format specified by X.509 (defining the format of public key certificates) or by the Europay, Mastercard, and Visa (EMV) standard. A Certificate Authority (CA) may provide the certificate that allows a user to generate signed certificates to use during TLS communication. A root CA may allow for generating child certificates. A certificate which is generated with a child CA may include references to the root certificate (e.g., parent certificate). In some embodiments, the CA is implemented as a CFSSL, which is an open source toolkit developed by CloudFlare, Inc., for signing, verifying, and bundling TLS certificates. CloudFlare Secure Sockets Layer is abbreviated as "CFSSL."

In some embodiments, a double broker system monitors which incoming device(s) and/or third party message(s) receive access into the local (e.g., building) network. A commissioning broker may perform a process that identifies incoming clients (e.g., devices) authorized to access the particular network. For example a commissioning broker may incorporate a plug-in to perform a process that identifies devices authorized to access the particular network. Upon or prior to installation, the commissioning broker may be configured and/or authorized to access a central authority (e.g., a main certification authority such as a manufacturer or service provider that (e.g., remotely) manages the local network). Incoming clients (e.g., $3^{rd}$ party clients such, other new clients, and/or incoming devices) may be configured to obtain certificate(s) (e.g., first tier certificates) from the main CA. The plug-in may be configured to access a local CA (after verifying a first tier certificate and/or signature) to provide a second tier certificate used for authenticating to, and handling encryption for, a data broker. The CAs and/or the brokers may be configured to include data relating to device addresses and/or serial numbers of authorized incoming clients (e.g., devices) for the building network. The incoming clients are new clients that request access to the local network. The incoming client may be configured with (e.g., only) top level key(s) and/or certificates (e.g., to be recognized by the main CA) allowing the incoming client to contact the commissioning broker. Manufactured devices destined to be incorporated in a local network (e.g., of a facility) may not be required to be pre-loaded with specific designations (e.g., specific configurations such as precise network ID) prior to their installation. A general configuration comprising a certification (e.g., including a key) by the main CA and authorization to access the commissioning broker of the local network, may be sufficient. The facility may comprise one or more buildings.

The first (e.g., commissioning) broker may have a list of the general IDs that allow the devices to be identified by the first broker. Thus, devices can be designated to a plurality of facilities, and be installed in either one of the facilities, as long as the first broker in these facilities receives (i) the (same) general certification (e.g., including a general key), and/or (ii) a databased in which these manufactured devices are authorized and/or certified to enter the local network of the specific facility. Such database may be distributed to the various facilities in which the manufactured devices are authorized to couple to their respective local networks. Such a procedure may facilitate configuration of devices at an as-needed basis and/or at the deployment site. Once the incoming client (e.g., device) accesses the first broker, the second broker may provide the incoming client a specific network ID to incorporate the device into the local network. The incoming client may comprise a device, or a software (e.g., a service).

In some embodiments, a facility is provisioned with a local network including a hierarchy of controlled devices by a control network (e.g., controllers, tintable windows, and device ensembles) and links for communication and power. The facility may comprise an enclosure such as a building. The network may provide control and other functions in the building, according to a design intent defined and/or implemented by a building owner, lessor, lessee (e.g., tenant), an equipment manufacturer, equipment aggregator, service provider, and/or network administrator. A manufacturer or service provider may function as a central administrator, e.g., to install and/or manage operation of the network, including managing the protective security functions such as authentication of devices. In some embodiments, the central administrator is located remotely from the managed facility network. The central administrator may include a main CA, which is configured to authenticate any clients (e.g., client devices and/or nodes) that have been designated for access to the local facility network. The central admonitory may issue main-level (e.g., first tier) certificates for use in messaging (1) between the main CA and any clients (e.g., devices) on the building network, and/or (2) between the commissioning broker and the other clients in the local facility network. The clients may comprise node devices operatively (e.g., communicatively and/or physically) coupled to the local facility network (e.g., using messaging within the local facility network). The clients may include remote clients (e.g., using messaging that includes a public network). The remote client may be wirelessly coupled to the local facility network. In some embodiment, the local facility network is a private network.

In some embodiments, the building network includes a local (e.g., second tier) certification authority connected to the commissioning broker. Based at least in part on the certificates obtained and/or signed by the main CA, an incoming client may be enabled (I) to conduct authenticated and/or encrypted communication with the commissioning broker and (II) to interact with the second tier CA to obtain a second tier (e.g., signed) certificate. The second tier certificate may facilitate to the incoming client a time limited access of a deeper portion of the network beyond the data broker. The portion may or may not include the entire local network. The exited of network access beyond the data broker may depend on the incoming client's origin, maker, owner, tenant, and/or type. For example, an incoming client may gain access to a local controller, and may be prevented accessing the main controller. For example, an incoming client may be prevented access from certain databases. The access may or may not be bidirectionally. For example, the incoming client may not be able to gain access to the main controller, and the main controller may be granted access to the incoming client. The data broker (e.g., second tier broker) may be configured for authentication using the local CA. Using the second tier certificates obtained by the incoming client it may be enabled to conduct authenticated and/or encrypted communication with the data broker. The exchange of messages between clients in the local network can be achieved using a publish-subscribe protocol. The second tier certificate may have an expiration time (e.g., designated date and time) after which the certificate is no longer valid, and authentication using the expired certificate is no longer allowed. The expiration time of the second tier certificates may be relatively short (e.g., spanning several minutes, several hours, or a few days) in comparison to an expiration time associated with the first tier certificates. Since most network communication conducted by the clients may be with the data broker (e.g., publishing messages to the data broker and receiving published messages from the data broker), the vulnerability to attack by unauthorized third party (e.g., hackers) may be greater for the network traffic using the second tier certificates. This vulnerability may be limited by the use of shorter expiration times for the second tier certificates.

In some embodiments, the expiration time for a first tier certificate is at least about 100 times (*), 75*, 50*, 40*, 20*, 10* or 5* longer as compared to the second tier certificate. In some embodiments, the expiration time for a first tier certificate is longer by at least about 2, 1, 0.5, or 0.25 order of magnitude as compared to the second tier certificate. The first tier certificate expiration time could be at least about 1 year, 2.5 years, 5 years, 7.5 years, 10 years, 12.5 years, or 16 years. The second tier certificate expiration time could be at most about 0.5 month, 1 months, 2 months, 3 months, 4 months, 5 months, 6 months, 8 months, or 10 months.

Figure 8:
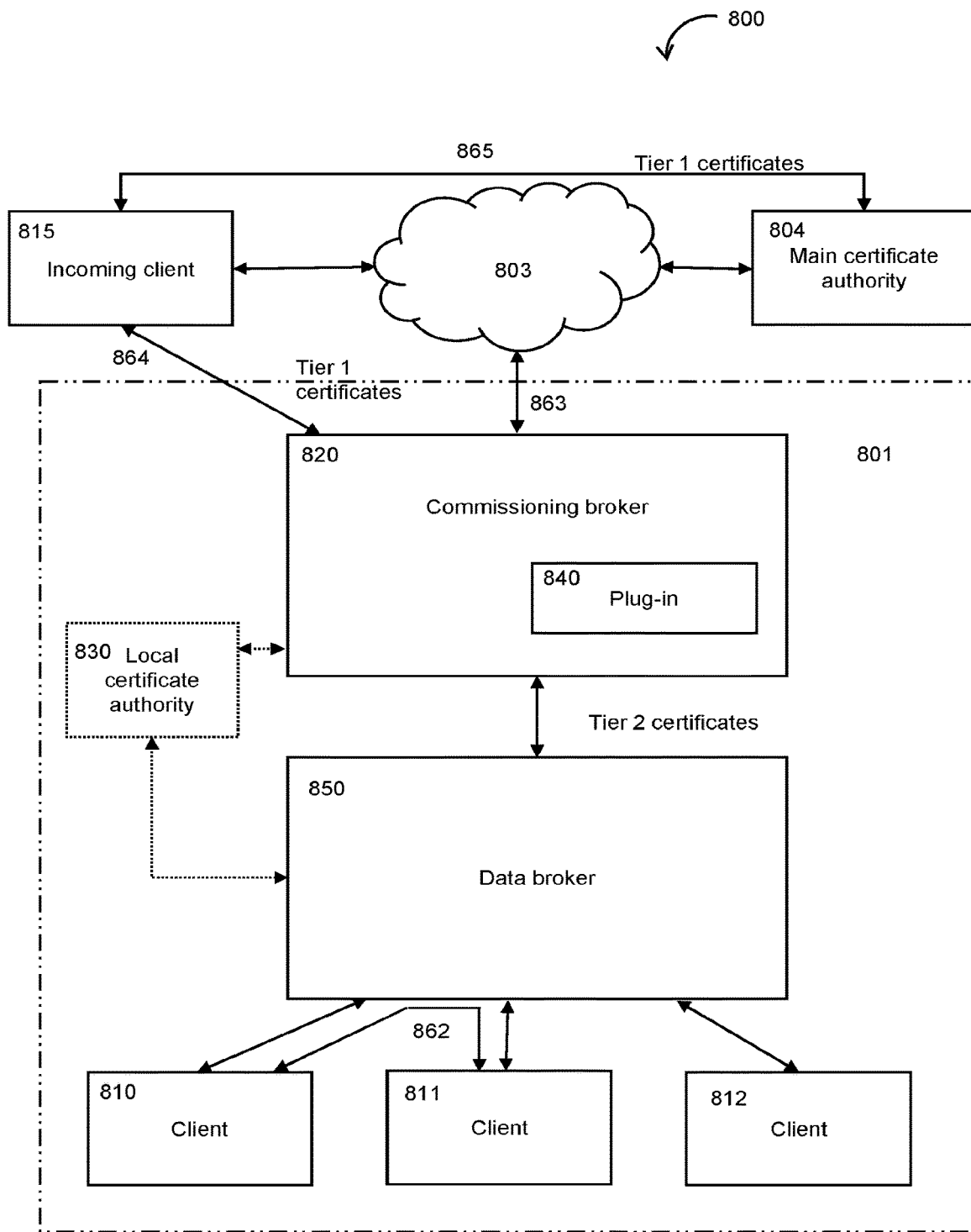
FIG. 8 schematically depicts a public and private network architecture.

FIG. 8 shows an example of communication components 800 in which a local network system 801 is communicatively coupled to a main certificate authority 804 and to an incoming client 815, e.g., via a cloud 803 (e.g., across a public network such as the Internet)). Local network 801 (and optionally the central administrator) may connect to cloud 803 via respective gateways (not shown). Local network 801 includes an internal network facility (e.g., cabling, and/or antenna network) through which the entities in the local network system 801 communicate (e.g., interconnections shown in FIG. 8 depict messaging channels that flow via internal facility network). Network system 801 includes a commissioning broker 820 and a data broker 850. A local certification authority 830 can optionally be implemented on a respective node (e.g., device) in network system 801, accessible to brokers 820 and 850. For example, the local certificate authority may verify the identity of the incoming client, provide the commissioning broker with the second tier certification, and/or oversee expulsion of the incoming client from the local network system once the $2^{nd}$ tier certificate expires. Commissioning broker 820 includes a plug-in 840 for acting an as intermediary in commissioning broker 820 between local CA 830 and the local clients (e.g., devices) such as clients 810, 811 and 812 that are part of the network system 801. An incoming client communicates 865 with the main certificate authority 804 to receive a first tier certificate. The incoming client 816 can communicate 863 with the network system 801 via the cloud 803. The incoming client may communicate 863 with the network system 801 locally and directly (and not via the cloud), e.g., by being physically connected to the network. In order to gain access, the incoming client accesses the commissioning broker 820, which provides the incoming client a second tier certificate, facilitating its communication with the data broker 850. FIG. 8 depicts interaction between the data broker 850 and internal clients 810, 811, and 812 that are coupled to the network. The clients coupled to the network (e.g., 810 and 811) may communicate 862 with each other, e.g., via the data broker. The manufacturing authority may correspond to a manufacturer. The local network system can be managed at least in part by an administrator agent (e.g., a central administrator, not shown in FIG. 8). The administrator may communicatively couple (e.g., or optionally contains) to the main certificate authority 804, to the network system 801, and/or to the cloud 803. For example, the administrator (e.g., administrative agent) may mange certificates provided by the main certificate authority to any client and/or node (e.g., server) coupled to the network 801.

In some embodiments, when the incoming client contacts the commissioning broker (e.g., using a handshake), its tier 1 certificate is validated by the commissioning broker (e.g., first broker), e.g., using the TLS or SSL protocol. For example, when an incoming party (e.g., an incoming client device) attempts to access other network assets, the commissioning broker may hold their request in a communication space termed a "waiting room." In the waiting room, the commissioning broker and requesting client may exchange and/or examine the tier 1 certificate of the incoming client. The first tier (e.g., tier 1) certificate may identify an issuer (e.g., the main CA), a device name, a company, public encryption keys (corresponding to a private key), and/or a first expiration date. If the first tier authentication is successful, the requesting party may issue a request for a tier 2 certificate to the entity issuing the $2^{nd}$ tier certification. The issuing entity may be the commissioning broker, the data broker, or a local certification authority. For example, the request may be issued (e.g., directly) to the data broker, to the commissioning broker, or to a local CA (e.g., 830) that is communicatively coupled to the commissioning broker and to the data broker. The request may be made via a module (e.g., plug-in) in, or operatively coupled to, the commissioning broker. The $2^{nd}$ tier certificate issuing party (e.g., the commissioning broker, data broker, or local CA) may issue a tier 2 certificate that is shorter lived as compared to the $1^{st}$ tier certificate. In some embodiments, when the incoming client (e.g., 816) attempts to message internal network client(s) (e.g., 812) via the data broker, each of the involved clients validates with the data broker usage of their tier 2 certificate. The tier 2 certificate may include an issuer (e.g., a network provider), device name, company, encryption keys, data broker address, and/or a second expiration date that is shorter than the first expiration date. The data broker (e.g., building broker) may grant access to the requesting party (e.g., requesting client) only for a limited amount of time (e.g., the time of the short lived tier 2 certificate). In some embodiments, because the tier 2 certificate is short lived, it requires constant renewal in order to have prolonged local network access beyond access to the commissioning broker. In some embodiments, the main (Tier 1) CA (e.g., 804) is located at the site of the manufacturer/provider of the external client. In some embodiments, the main (Tier 1) CA and the local (Tier 2) CA are located at the building site.

In some embodiments, clients (e.g., devices) to be utilized as client nodes in a building network are manufactured according to a generic configuration. The generic configuration may include aspects common to all deployments for different customers or for different operational requirements being installed (e.g., loaded) into the clients (e.g., devices). The generic configuration might not include other aspects that are adapted to be customizable at a later time and/or place when a customer and/or facility is identified for receiving the client (e.g., device). In some embodiments, by the time a client (e.g., device) is installed within a particular facility network, it has been configured with appropriate details for communicating at a first tier level with the main CA (e.g., administered by the client (e.g., device) manufacturer or service provider) and with the commissioning broker. The commissioning broker and/or the local facility (e.g., building) CA may be initially configured with appropriate details concerning the client (e.g., device) as necessary to enable the first tier communications. After successfully accessing the commissioning broker, a client may request to access the internal facility network in a manner that allows messaging with other client nodes coupled to the network (e.g., via the data broker). In response to the request, the incoming client may receive a local certificate for allowing access to the second tier communication. When a contact in made between the client and the data broker (e.g., to subscribe to a topic, to publish a message, or to receive a published message for a subscribed topic), the tier 2 certificates may be inspected for validity (e.g., validated). If valid, the corresponding communication messages may be routed and/or accepted. If a certificate or signature is not valid (e.g., the tier 2 certificate has expired) then the client may re-initiate the first tier communication to obtain a new tier 2 certificate.

Figure 9:
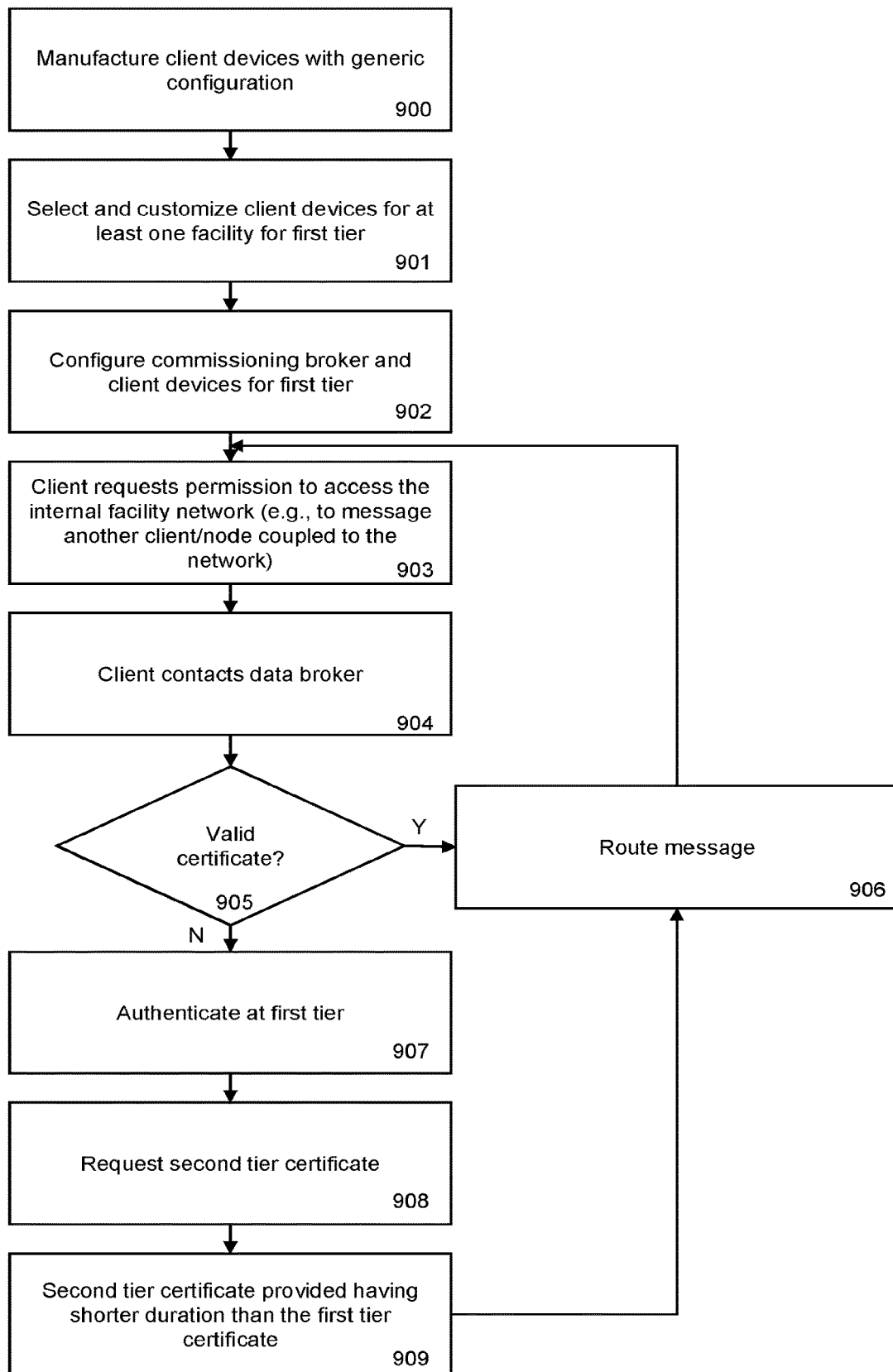
FIG. 9 shows a flowchart of a process for authenticating clients and messaging in a network.

FIG. 9 shows an example of a flowchart of a process in which a manufacturer of client devices manufactures a plurality of client devices at block 900, wherein each device has a generic configuration. At 901, a client device is selected and customized for at least one particular facility or customer. At or around the time of installation at the facility, the client device(s) and the local tier 1 components (e.g., the commissioning broker and the local CA) are configured at block 902 for enabling authenticated communication according to credentials administered by the central (main) CA. For example, the commissioning broker and/or the local CA may be configured to communicate with a database that includes references to authorized clients. At block 903, a local client requests permission to access the internal facility network in such a way that it can message with another client and/or the data broker, and as a result the local client obtains a tier 2 certificate. In 904, the client is in contact with the data broker (e.g., the client may attempt to publish a message or subscribe to a topic). Validity of the certificate(s) exchanged is checked at block 905. If the certificate(s) were valid, then corresponding messages are routed at 906. The messages may be encrypted according to the keys given or referred to in the certificate(s). If verification is unsuccessful, then the client authenticates at the first tier at 907 in order to submit a request to the commissioning broker at 908 for a new or renewed tier 2 certificate. If tier 1 authentication is successful then a new tier 2 certificate is provided from the local CA to the requesting client at 909, wherein the tier 2 certificate has a short duration. In particular, the duration of the tier 2 certificate may be shorter than the duration of its respective tier 1 certificate.

In some embodiments, the network facilitates flexibility with additional (e.g., subordinate) manufacturing entities such as contract manufacturers. The primary manufacturer may comprise a certificate authority. The certificate authority of the primary manufacturer may be referred to herein as a "root certificate authority" or a "primary manufacturing certificate authority." The subordinate manufacturers (that are subordinate to the primary manufacturer) may comprise a certificate authority that is reliant on a certificate from the root certificate authority of the primary manufacturer. The certificate authority of the subordinate manufacturer may be referred to herein as a "subordinate manufacturing certificate authority." The primary manufacturer can have flexibility in enlisting various subordinate (e.g., contract) manufacturers, and keep one root certificate authority.

Figure 10:
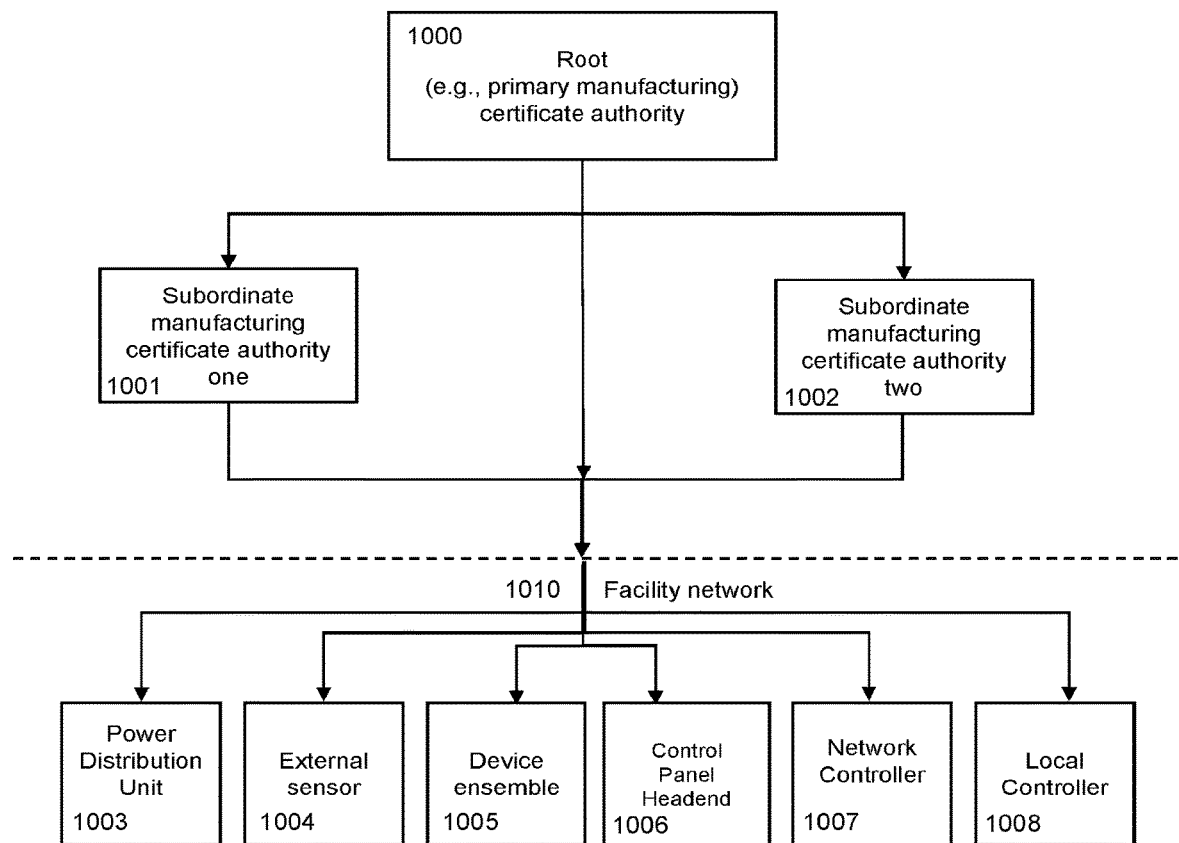
FIG. 10 shows a flowchart related to client(s) requesting entry to a private network.

FIG. 10 shows an example of a flow chart in which block 1000 represents the root certificate authority of the primary manufacturer, blocks 1001 and 1002 represent subordinate manufacturing certificate authorities of various subordinate manufacturers (designated in FIG. 10 as one and two). The primary manufacturer may have two or more subordinate manufacturers (e.g., each having its own subordinate manufacturing certificate authority that relies on the root certificate authority). Clients (e.g., devices) from any of the primary, subordinate manufacturer one, subordinate manufacturer two, or any other subordinate manufacturer (not shown), may receive permission to enter the facility network 1010. For example, by providing the client's certificate received from the respective certificate authority. In some embodiments, the network has a single broker. In some embodiments, the network may have two brokers (e.g., a commissioning broker and a data broker, e.g., as disclosed herein). For example, the facility broker may validate such client certificate and provide access to the network. For example, the commissioning broker of the facility may validate such client certificate and provide an internal network certificate for the facility that is shorter lived than the client certificate. The internal network certificate may be validated by a data broker of the facility, that provides access to at least one internal portion of the network beyond the data broker. The client certificate may be a certificate that the client obtained from any of the certificate authorities mentioned herein. FIG. 10 shows examples of nodes coupled to the internal facility network, which nodes include local controller 1008, network controller 1007, control panel headend 1006, device ensemble 1005, external sensor (e.g., a roof sensor) 1004, and a power distribution unit 1003. The client can be any client disclosed herein (e.g., controller, sensor, or emitter). The client may be a node. The client may comprise a software (e.g., software module). The dotted line above numeral 1010 designates a border beyond which the network of the facility starts, which network includes the clients 1003-1008.

In some embodiments, there may be at least one additional broker coupled to the network beyond the data broker, which at least one additional broker may restrict access to an internal portion of the network of the facility. The at least one additional broker may require shorter lived certificate than the second certificate provided to the data broker. For example, the network may comprise a hierarchy of broker that (i) respectively restrict access to increasingly smaller portions of the network and/or (ii) respectively required increasingly shorter lived internal network certificates.

In some embodiments, first and second level certificate authorities are comprised of a manufacturing (e.g., a manufacturer's, administrator's, or service provider's) CA and a building CA. The manufacturing CA may have a manufacturing CA Root Certificate and a Manufacturing Key. The building CA may have a Building CA Root Certificate and a Building Key. A client node (e.g., device) may maintain a copy of the Manufacturing CA Root Certificate in addition to a Client Tier 1 Certificate and a Client Tier 1 Key. Using these, the client can issue a certificate signature request (CSR) to the manufacturing CA. A commissioning broker may maintain a copy of the Manufacturing CA Root Certificate, e.g., in addition to a Commissioning Certificate and a Commissioning Key which it may use to issue a certificate signature request (CSR) to the manufacturing CA. A building (data) broker may maintain a copy of the Building CA Root Certificate, e.g., in addition to a Broker Certificate and a Broker Key which it may use to issue a certificate signature request (CSR) to the manufacturing CA.

Figure 11:
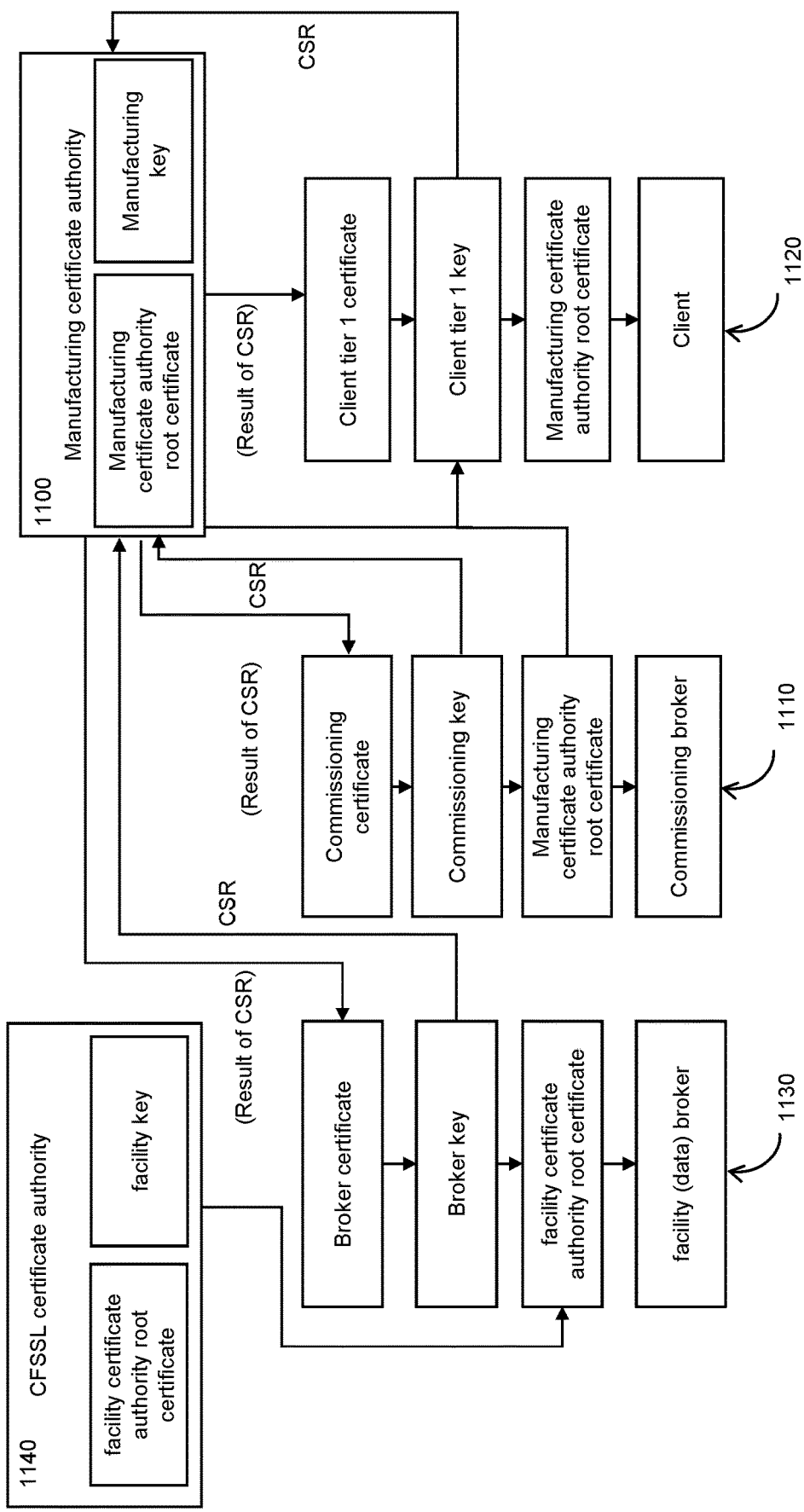
FIG. 11 is a schematic diagram showing certification.

FIG. 11 shows an example of a flow of certificate signature requests between a manufacturing CA 1100, a commissioning broker 1110, a client 1120, and a building broker 1130. To enable secure communication among commissioning broker 1110, client 1120, and building broker 1130, respective certificate signing request (CSR) messages based at least in part on their respective Keys and on the Manufacturing CA root certificate, are sent to manufacturing CA 1100. Corresponding results (e.g., signed certificates) are returned. A local CA 1140 is shown in this example as being implemented with a CFSSL toolkit provided by Cloudflare, Inc. The Building CA Root Certificate provided from local CA 1140 to building broker 1130 can be used later when client 1120 obtains a tier 2 certificate.

In some embodiments, a client that has established access to the commissioning broker using a valid tier 1 certificate proceeds to obtain a tier 2 certificate via a middleware CFSSL plug-in that executes on the commissioning broker. The client may send a pseudo CSR message as a protocol buffer (protobuf) message that is intercepted by the middleware plug-in and forwarded to the local CA. For example, the protobuf message may be sent to a publish-subscribe topic called "request" that is maintained on the commissioning broker. The middleware plug-in generates a CSR message to the local CA, and a result from the local CA to the middleware plug-in is forwarded back to the client to supply the tier 2 certificate.

Figure 12:
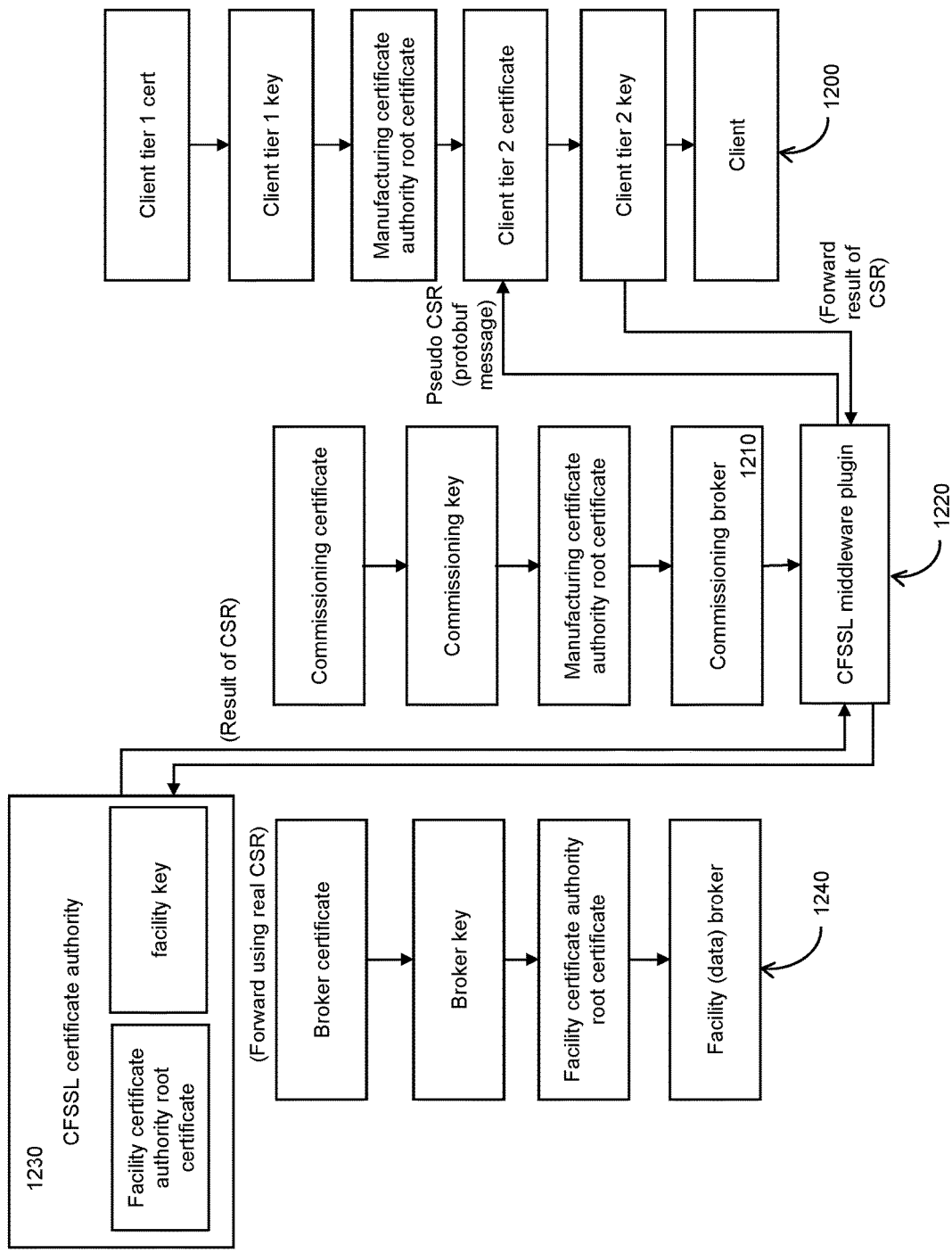
FIG. 12 is a schematic diagram showing certification.

FIG. 12 depicts a process by which a client 1200 requests a tier 2 certificate via a middleware plug-in 1220 on a commissioning broker 1210. The request is shown as a pseudo CSR (protobuf) message that is received by middleware plug-in 1220. A read CSR message is sent by middleware plug-in 1220 to local CA 1240 which responds accordingly. After the response (e.g., a tier 2 certificate) is forwarded to client 1200, access to a building broker 1240 is obtained.

In some embodiments, verification of clients accessing the commissioning broker at the first tier is conducted using the Manufacturing CA Root Certificate. For example, when the client contacts the commissioning broker, it sends its tier 1 certificate which has been signed by the main (manufacturing) CA. The commissioning broker may verify the identity of the client by comparing the client's tier 1 certificate to a copy of the Manufacturing CA Root Certificate maintained on the commissioning broker. Thereafter, the commissioning broker may send its own top-level (commissioning) certificate (which has been signed by the manufacturing CA) to the client in order to assert its identity. The client may verify the identity of the commissioning broker by comparing the top-level commissioning certificate to its copy of the Manufacturing CA Root Certificate.

Figure 13:
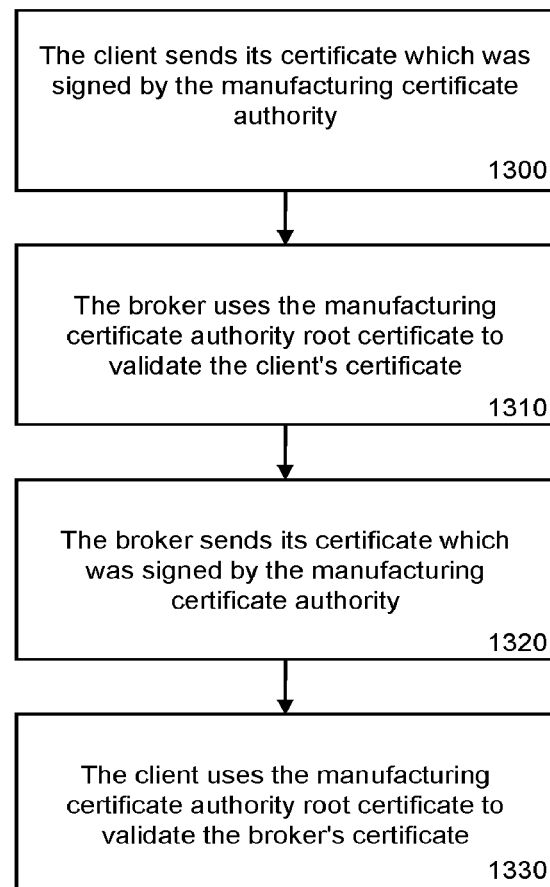
FIG. 13 is a flowchart of a process of authentication.

FIG. 13 shows an example of the commissioning broker verification process in which the client sends its tier 1 certificate (which is signed by the manufacturing CA, e.g., of a subordinate manufacturer such as a contract manufacturer) to the commissioning broker at block 1300. The manufacturing CA certificate may carry a root certificate provided by the primary manufacturer. For example, the manufacturing CA certificate may include, be attached to, or be linked to, the root certificate. After receiving the client's certificate, the commissioning broker uses the Manufacturing CA carried Root Certificate at block 1310 to validate it. If the validation fails, then the commissioning broker would not respond to the request. After a proper validation, the commissioning broker sends its signed certificate (confirming validation by the commissioning broker) in block 1320 to the requesting client. The client uses its copy of the Manufacturing CA carried Root Certificate to validate the certificate of the commissioning broker. If both parties share a successful validation, then a session may be allowed to occur between the client and the commissioning broker. The messaging structure is shown further in FIG. 14.

Figure 14:
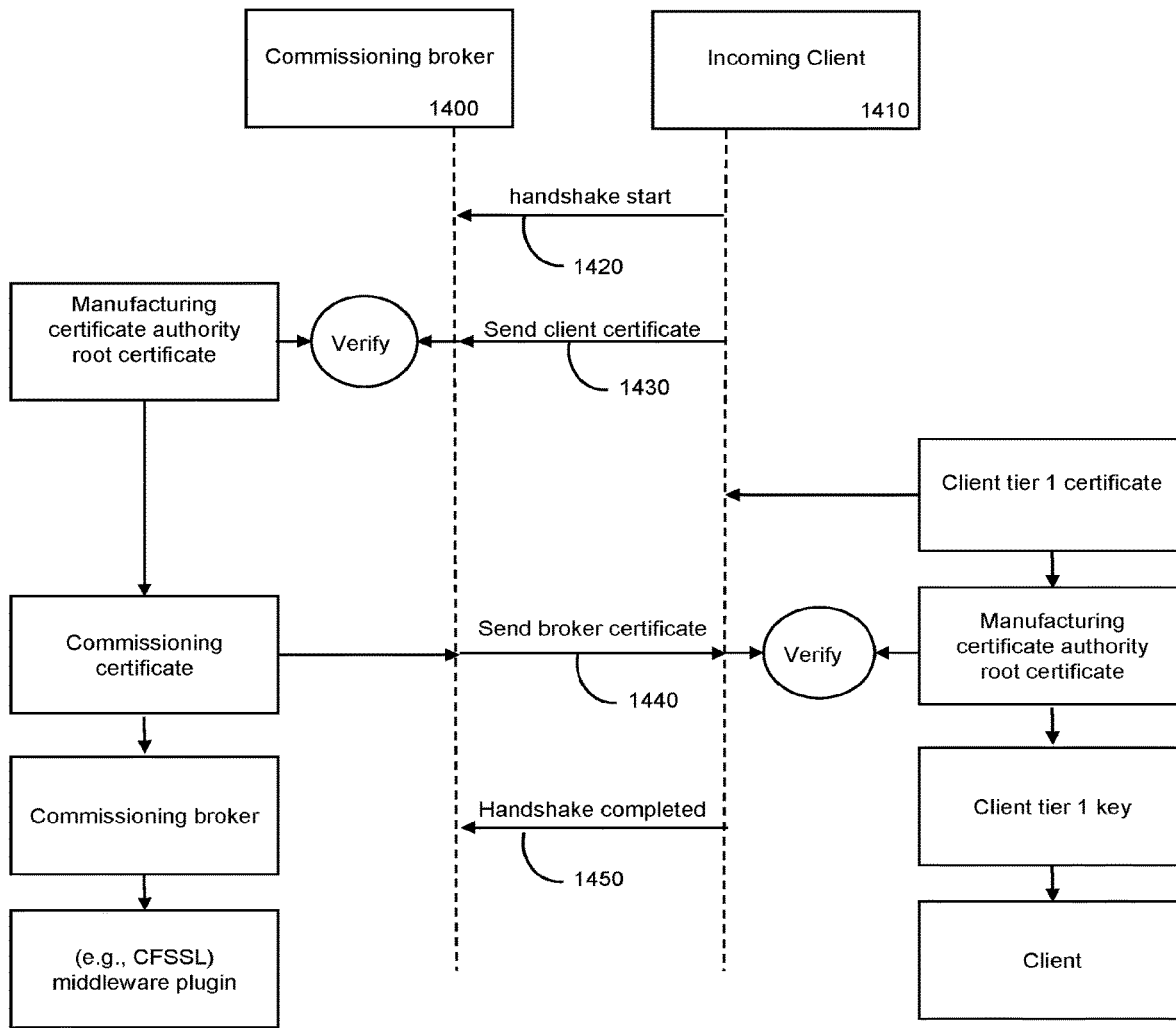
FIG. 14 is a messaging diagram and flowchart related to authentication.

FIG. 14 shows an example of messages sent between a commissioning broker 1400 and an incoming client 1410. To initiate a request, incoming client 1410 sends a (e.g., TLS) Handshake Start message 1420 to broker 1400. This is followed by a Send Client Certificate message 1430. Internally, broker 1400 verifies the received client certificate against the Manufacturing CA Root Certificate. Using its top level commissioning certificate, broker 1400 transmits a Send Broker Certificate message 1440 to client 1410. Internally, client 1410 verifies the received commissioning certificate against the Manufacturing CA Root Certificate. If verification is successful, then client 1410 sends a Handshake Completed message 1450 to broker 1400.

Verification of clients at the second tier may proceed in a manner analogous to the first tier but using the local CA. In some embodiments, the local building CA has a facility (e.g., Building) CA Root Certificate which it uses to sign certificates it issues to the clients for use at the second tier. For example, when the client contacts the facility (data) broker it sends its tier 2 certificate which has been signed by the CFSSL (facility) CA. The data broker may verify the identity of the client by comparing the client's tier 2 certificate to a copy of the Facility CA Root Certificate maintained on the facility broker. The Data broker may be referred to herein as the "facility broker" or "building broker" when the facility is a building. Thereafter, the data broker (e.g., facility broker) may send its own top-level (tier 1) certificate which has been signed by the manufacturing CA to the client in order to assert its identity. The client may verify the identity of the data broker by comparing the received tier 1 certificate to its copy of the Manufacturing CA Root Certificate.

Figure 15:
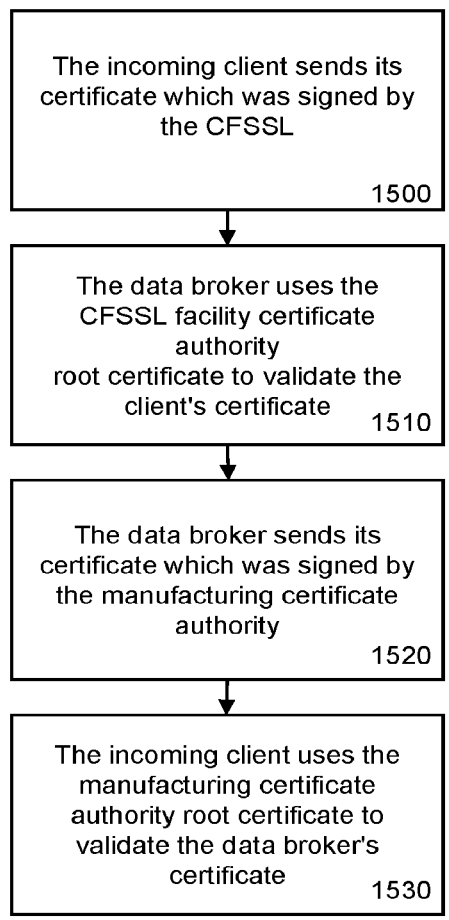
FIG. 15 is a flowchart of an authentication process.

FIG. 15 shows an example of a flow chart in which the data (e.g., building) broker verification process in which the incoming client sends its tier 2 certificate (which is signed by the local CA) to the facility (e.g., building) broker at block 1500. After receiving the client's certificate, the facility (e.g., building) broker uses the facility (e.g., building) CA carried Root Certificate at block 1510 to validate it. For example, the facility CA certificate may include, be attached to, or be linked to, the root certificate. If the validation fails, then the facility (e.g., building) broker would not respond to the request. After a proper validation, the facility (e.g., building) broker sends its signed certificate in block 1520 to the requesting client. The client uses its copy of the Manufacturing CA carried Root Certificate to validate the certificate of the facility (e.g., building) broker. If both parties share a successful validation, then a session may be allowed to occur between the client and the facility (e.g., building) broker. The messaging structure is shown further in FIG. 16. In some embodiments, the primary manufacturing authority of a node (e.g., a client such as a device) may be the primary manufacturing, designing, and/or commissioning authority of the private network of the facility. The node may be part of the network components of the facility, operatively coupled to the network, or a newly incoming client to the facility network.

Figure 16:
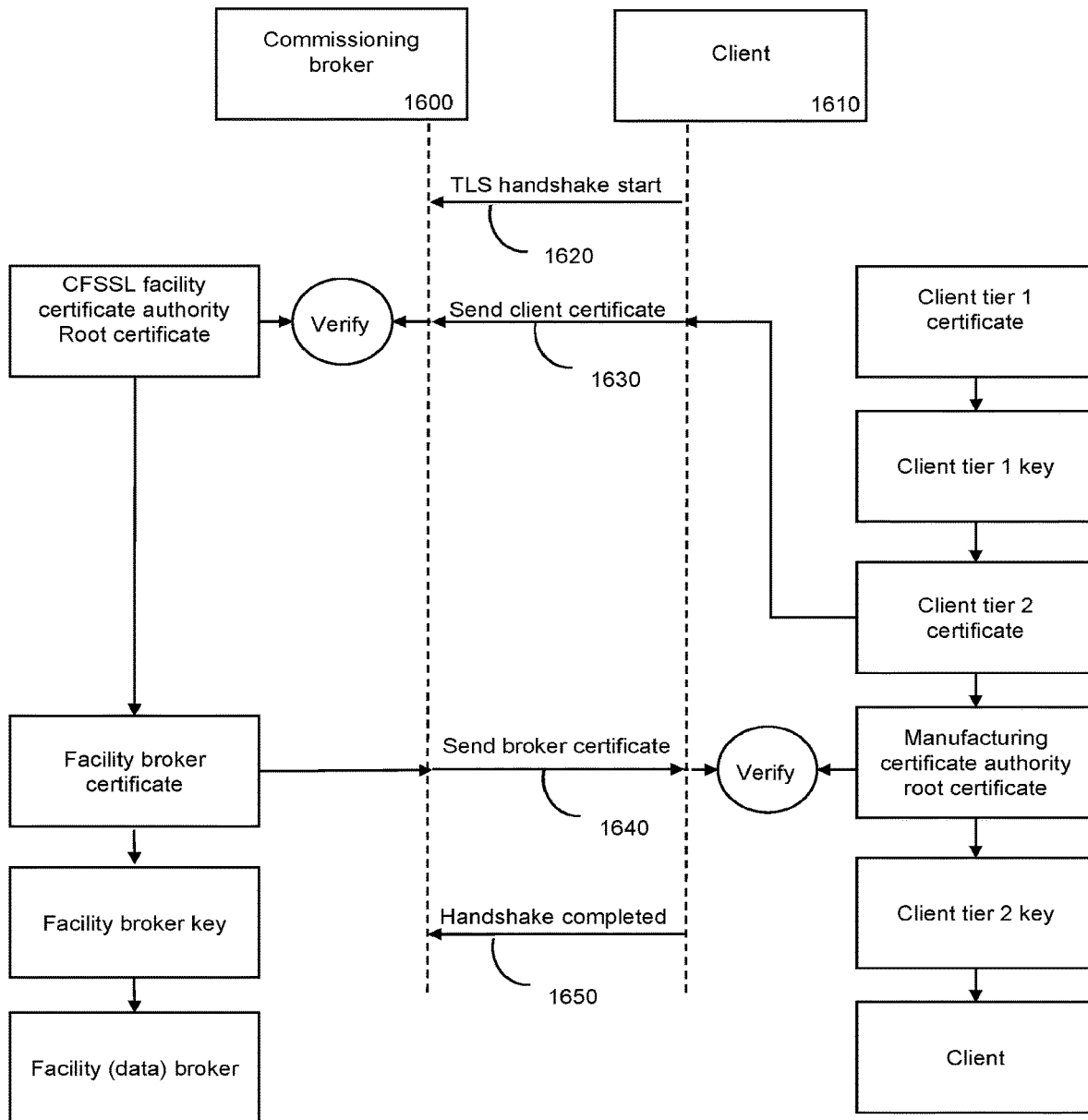
FIG. 16 is a messaging diagram and a flowchart related to client authentication.

FIG. 16 shows an example of a flowchart wherein messages are sent between a facility (e.g., building) broker 1600 and a client 1610. To initiate a request, client 1610 sends a TLS Handshake Start message 1620 to broker 1600. This is followed by a Send Client Certificate message 1630. Internally, broker 1600 verifies the received client certificate against the Facility (e.g., building) CA Root Certificate. Using its tier 1 certificate, broker 1600 transmits a Send Broker Certificate message 1640 to client 1410. Internally, client 1610 verifies the received tier 1 certificate against the Manufacturing CA Root Certificate. If verification is successful, then client 1610 sends a Handshake Completed message 1650 to broker 1600.

Figure 17:
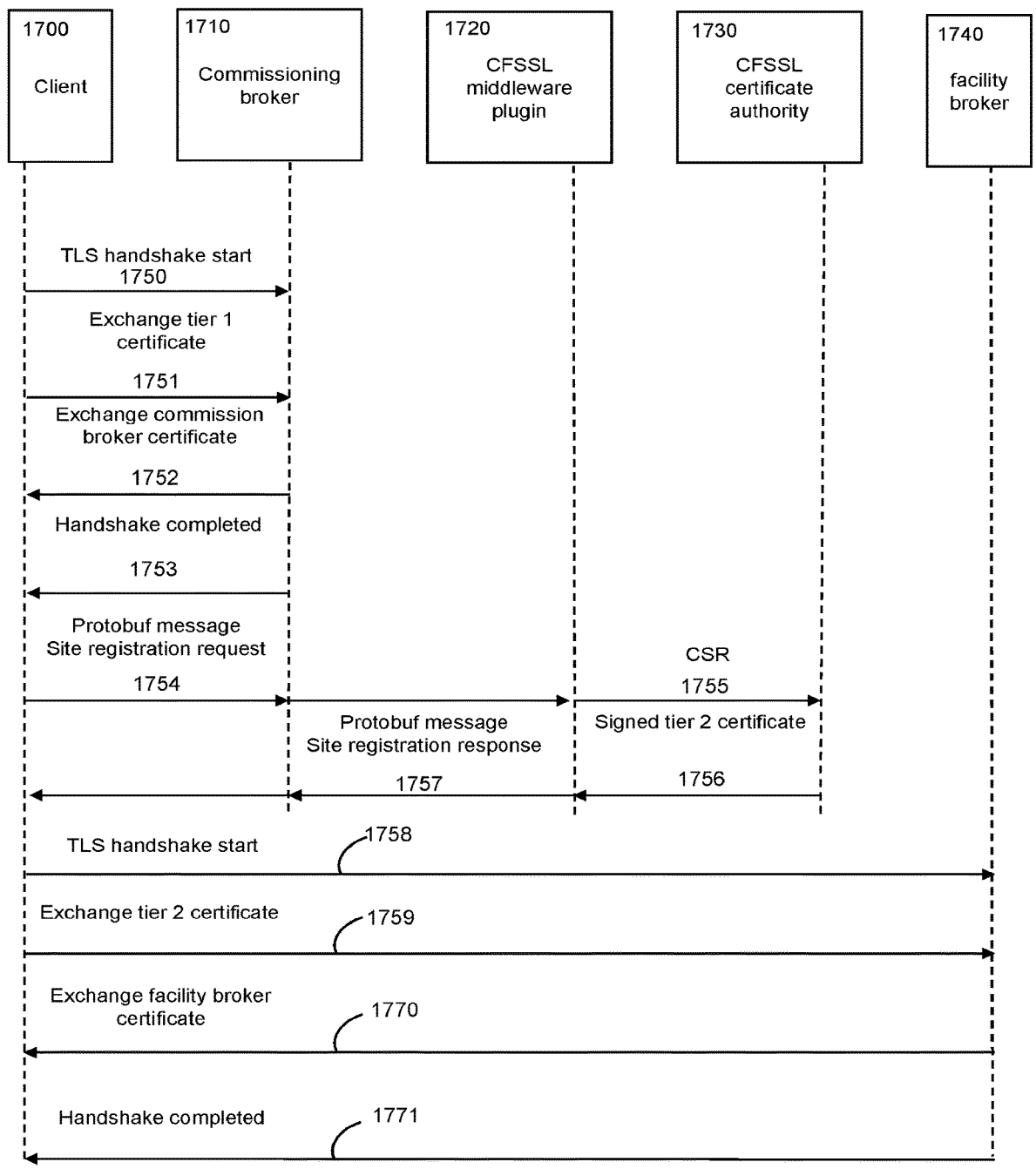
FIG. 17 is a messaging diagram related to client authentication.

FIG. 17 shows a simplified messaging structure of the middleware exchange for accessing the local (building) CA. To establish a communication session for requesting a tier 2 certificate, a client 1700 generates a TLS Handshake Start message 1750 to a commissioning broker 1710. Client 1700 follows up Start message 1750 with an Exchange Tier 1 Certificate message 1751. After commissioning broker 1710 verifies the client's tier 1 certificate, it sends its own commissioning (e.g., tier 1) certificate in an Exchange Certificate message 1752 to client 1700 for verification against the Manufacturing CA Root Certificate (e.g., of the primary manufacturer). If successful, then client 1700 sends a Handshake Completed message 1753. Using the validated session (and using encryption according to the corresponding keys), client 1700 sends a Protobuf Message Site Registration Request message 1754 (e.g., a pseudo CSR) to a CFSSL middleware plug-in 1720. In response, plug-in 1720 sends a CSR message 1755 to a CFSSL CA 1730. In response, CA 1730 sends a signed tier 2 certificate message 1756 to plug-in 1720. Incorporating the signed tier 2 certificate, middleware plug-in 1720 sends a Protobuf Message Site Registration Response message 1757 to client 1700. Now that client 1700 has a signed tier 2 certificate available, it can initiate a session with a facility (e.g., building) broker 1740 by sending a TLS Handshake Start message 1758 and then an Exchange Tier 2 Certificate message 1759. Facility (e.g., building) broker 1740 can verify the tier 2 certificate against a Facility (e.g., building) CA Root Certificate, and if successful will send an Exchange Facility (e.g., building) Broker Certificate message 1770. If client 1700 is able to verify the facility (e.g., building) broker certificate against the Manufacturing CA Root Certificate then a Handshake Completed message 1771 is sent to facility (e.g., building) broker 1740, and publish-subscribe messages can be exchanged between client 1700 and facility (e.g., building) broker 1740 for no longer than the expiration time of the tier 2 certificate.

Figure 18:
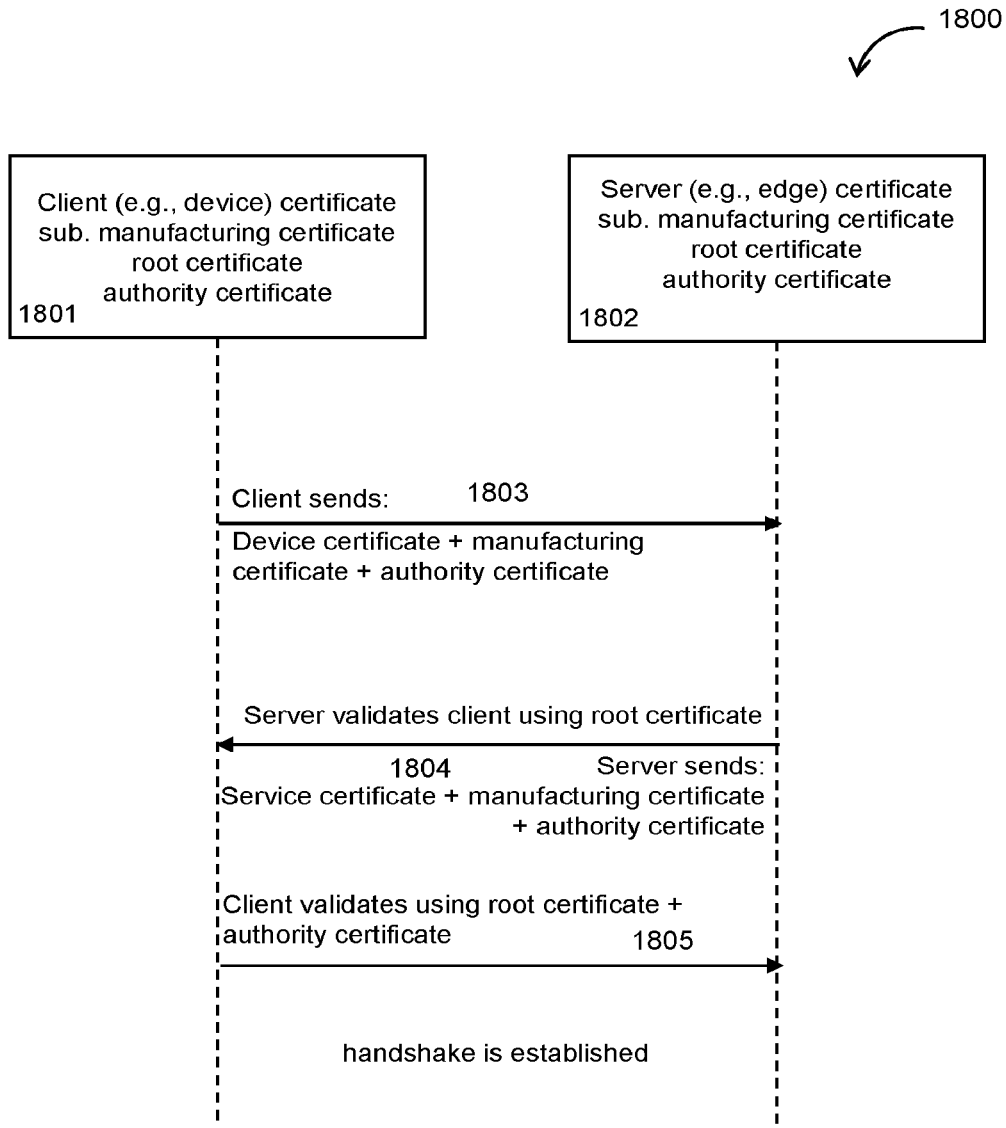
FIG. 18 is a messaging diagram related to client authentication.

FIG. 18 shows an example of establishing a secure handshake. A client (e.g., a device) carries a client (e.g., device) certificate, a subordinate manufacturer's certificate, a root certificate from the primary manufacturer, and/or an authority certificate from a Certification Authority, as depicted in block 1801. A server of the facility (e.g., included in, or operatively coupled to, a controller) carries a server certificate, a subordinate manufacturer's certificate, a root certificate from the primary manufacturer, and/or an authority certificate from a Certification Authority, as depicted in block 1802. The client requests entry into the network by sending to the server the certificate(s) it is carrying in operation 1803. The server validates the client certificates by inspecting the client's root certificate (and optionally also by inspecting the other certificates, e.g., the CA authority certificate) and sends the server certificate(s) in operations 1804. The client validates the certificates of the server using the root certificate and/or the authority certificate (and optionally also by inspecting the other certificates) in operation 1805. Once the client validates the certificate(s), a handshake is established. The protocol for establishing the handshake may be a security protocol such as the Transport Layer Security (TLS) protocol or the Secure Sockets Layer (SSL) protocol.

In some embodiments, a processing unit is included in a node. A node can be a local controller (e.g., a window controller) configured to control an insulated glass unit ("IGU") The node can further receive and execute downloadable apps for various functions or services, such as machine learning apps, message brokers, and/or weather prediction (e.g., to aid in controlling ting of the tintable windows (e.g., IGUs)). In some embodiments, a local controller (e.g., processing unit) can comprise a window controller as disclosed in U.S. Pat. No. 10,533,892, issued Jan. 14, 2020, entitled "MULTI-SENSOR DEVICE AND SYSTEM WITH A LIGHT DIFFUSING ELEMENT AROUND A PERIPHERY OF A RING OF PHOTOSENSORS AND AN INFRARED SENSOR," that is incorporated herein by reference in its entirety.

In some embodiments, a window controller is generally operable and/or adapted (i) to drive optical state transitions in, or (ii) to maintain the optical states of, one or more coupled optically-switchable devices such as electrochromic devices (ECDs). In some implementations, a processing unit can be implemented with any suitable processor or any other logic device, including combinations of such devices, capable of performing the functions or processes described herein. In some implementations, the processing unit comprises a microcontroller (also referred to as a microcontroller unit (MCU)). The processing unit can be a microcontroller particularly designed for embedded applications. For example, the processing unit may include a processor core (for example, a 200 MHz processor core or other suitable processor core) as well as a program memory (for example, a 2018 KB or other suitable non-volatile memory), a random-access memory (RAM) (for example, a 512 KB or other suitable RAM), and various I/O interfaces. The program memory can include, for example, code executable by the processor core to implement the functions, operations or processes of the processing unit. The code (e.g., software code) may comprise a string.

In some embodiments, a device controlled by the processing system includes a tintable window in an insulated glass unit ("IGU"). The terms "IGU," "tintable window," and "optically switchable window" can be used interchangeably herein. It can be desirable to have IGUs serve as the fundamental constructs for holding electrochromic panes (also referred to herein as "lites") when provided for installation in a building. An IGU lite may be a single substrate or a multi-substrate construct. The lite may comprise a laminate, e.g., of two substrates. IGUs (e.g., having double- or triple-pane configurations) can provide a number of advantages over single pane configurations. For example, multi-pane configurations can provide enhanced thermal insulation, noise insulation, environmental protection and/or durability, when compared with single-pane configurations. A multi-pane configuration can provide increased protection for an ECD. For example, the electrochromic films (e.g., as well as associated layers and conductive interconnects) can be formed on an interior surface of the multi-pane IGU and be protected by an inert gas fill in the interior volume of the IGU. The inert gas fill may provide at least some (heat) insulating function for an IGU. Electrochromic IGUs may have heat blocking capability, e.g., by virtue of a tintable coating that absorbs (and/or reflects) heat and light.

In some embodiments, an "IGU" includes two (or more) substantially transparent substrates. For example, the IGU may include two panes of glass. At least one substrate of the IGU can include an electrochromic device disposed thereon. The one or more panes of the IGU may have a separator disposed between them. An IGU can be a hermetically sealed construct, e.g., having an interior region that is isolated from the ambient environment. A "window assembly" may include an IGU. A "window assembly" may include a (e.g., stand-alone) laminate. A "window assembly" may include one or more electrical leads, e.g., for connecting the IGUs and/or laminates. The electrical leads may operatively couple (e.g., connect) one or more electrochromic devices to a voltage source, switches and the like, and may include a frame that supports the IGU or laminate. A window assembly may include a window controller, and/or components of a window controller (e.g., a dock).

In some implementations, the first and the second panes are transparent or translucent, e.g., at least to light in the visible spectrum. For example, each of the panes can be formed of a glass material. The glass material may include architectural glass, and/or shatter-resistant glass. The glass may comprise a silicon oxide ($SO_x$). The glass may comprise a soda-lime glass or float glass. The glass may comprise at least about 75% silica ($SiO_2$). The glass may comprise oxides such as $Na_2O$, or CaO. The glass may comprise alkali or alkali-earth oxides. The glass may comprise one or more additives. The first and/or the second panes can include any material having suitable optical, electrical, thermal, and/or mechanical properties. Other materials (e.g., substrates) that can be included in the first and/or the second panes are plastic, semi-plastic and/or thermoplastic materials, for example, poly (methyl methacrylate), polystyrene, polycarbonate, allyl diglycol carbonate, SAN (styrene acrylonitrile copolymer), poly(4-methyl-1-pentene), polyester, and/or polyamide. The first and/or second pane may include mirror material (e.g., silver). In some implementations, the first and/or the second panes can be strengthened. The strengthening may include tempering, heating, and/or chemically strengthening.

In various embodiments, a network infrastructure supports a control system for one or more windows such as electrochromic (e.g., tintable) windows. The control system may comprise one or more controllers operatively coupled (e.g., directly or indirectly) to one or more windows. While the disclosed embodiments describe electrochromic windows (also referred to herein as "optically switchable windows," "tintable windows", or "smart windows"), the concepts disclosed herein may apply to other types of switchable optical devices comprising a liquid crystal device, an electrochromic device, suspended particle device (SPD), NanoChromics display (NCD), Organic electroluminescent display (OELD), suspended particle device (SPD), NanoChromics display (NCD), or an Organic electroluminescent display (OELD). The display element may be attached to a part of a transparent body (such as the windows). The tintable window may be disposed in a (non-transitory) facility such as a building, and/or in a transitory facility (e.g., vehicle) such as a car, RV, bus, train, airplane, helicopter, ship, or boat.

In some embodiments, a tintable window exhibits a (e.g., controllable and/or reversible) change in at least one optical property of the window, e.g., when a stimulus is applied. The change may be a continuous change. A change may be to discrete tint levels (e.g., to at least about 2, 4, 8, 16, or 32 tint levels). The optical property may comprise hue, or transmissivity. The hue may comprise color. The transmissivity may be of one or more wavelengths. The wavelengths may comprise ultraviolet, visible, or infrared wavelengths. The stimulus can include an optical, electrical and/or magnetic stimulus. For example, the stimulus can include an applied voltage and/or current. One or more tintable windows can be used to control lighting and/or glare conditions, e.g., by regulating the transmission of solar energy propagating through them. One or more tintable windows can be used to control a temperature within a building, e.g., by regulating the transmission of solar energy propagating through the window. Control of the solar energy may control heat load imposed on the interior of the facility (e.g., building). The control may be manual and/or automatic. The control may be used for maintaining one or more requested (e.g., environmental) conditions, e.g., occupant comfort. The control may include reducing energy consumption of a heating, ventilation, air conditioning and/or lighting systems. At least two of heating, ventilation, and air conditioning may be induced by separate systems. At least two of heating, ventilation, and air conditioning may be induced by one system. The heating, ventilation, and air conditioning may be induced by a single system (abbreviated herein as "HVAC). In some cases, tintable windows may be responsive to (e.g., and communicatively coupled to) one or more environmental sensors and/or user control. Tintable windows may comprise (e.g., may be) electrochromic windows. The windows may be located in the range from the interior to the exterior of a structure (e.g., facility, e.g., building). However, this need not be the case. Tintable windows may operate using liquid crystal devices, suspended particle devices, microelectromechanical systems (MEMS) devices (such as microshutters), or any technology known now, or later developed, that is configured to control light transmission through a window. Windows (e.g., with MEMS devices for tinting) are described in U.S. Pat. No. 10,359,681, issued Jul. 23, 2019, filed May 15, 2015, titled "MULTI-PANE WINDOWS INCLUDING ELECTROCHROMIC DEVICES AND ELECTROMECHANICAL SYSTEMS DEVICES," and incorporated herein by reference in its entirety. In some cases, one or more tintable windows can be located within the interior of a building, e.g., between a conference room and a hallway. In some cases, one or more tintable windows can be used in automobiles, trains, aircraft, and other vehicles, e.g., in lieu of a passive and/or non-tinting window.

In some embodiments, the tintable window comprises an electrochromic device (referred to herein as an "EC device" (abbreviated herein as ECD, or "EC"). An EC device may comprise at least one coating that includes at least one layer. The at least one layer can comprise an electrochromic material. In some embodiments, the electrochromic material exhibits a change from one optical state to another, e.g., when an electric potential is applied across the EC device. The transition of the electrochromic layer from one optical state to another optical state can be caused, e.g., by reversible, semi-reversible, or irreversible ion insertion into the electrochromic material (e.g., by way of intercalation) and a corresponding injection of charge-balancing electrons. For example, the transition of the electrochromic layer from one optical state to another optical state can be caused, e.g., by a reversible ion insertion into the electrochromic material (e.g., by way of intercalation) and a corresponding injection of charge-balancing electrons. Reversible may be for the expected lifetime of the ECD. Semi-reversible refers to a measurable (e.g., noticeable) degradation in the reversibility of the tint of the window over one or more tinting cycles. In some instances, a fraction of the ions responsible for the optical transition is irreversibly bound up in the electrochromic material (e.g., and thus the induced (altered) tint state of the window is not reversible to its original tinting state). In various EC devices, at least some (e.g., all) of the irreversibly bound ions can be used to compensate for "blind charge" in the material (e.g., ECD).

In some implementations, suitable ions include cations. The cations may include lithium ions (Li+) and/or hydrogen ions (H+) (i.e., protons). In some implementations, other ions can be suitable. Intercalation of the cations may be into an (e.g., metal) oxide. A change in the intercalation state of the ions (e.g., cations) into the oxide may induce a visible change in a tint (e.g., color) of the oxide. For example, the oxide may transition from a colorless to a colored state. For example, intercalation of lithium ions into tungsten oxide ($WO_3$-y ($0 < y \leq \sim 0.3$)) may cause the tungsten oxide to change from a transparent state to a colored (e.g., blue) state. EC device coatings as described herein are located within the viewable portion of the tintable window such that the tinting of the EC device coating can be used to control the optical state of the tintable window.

Figure 19:
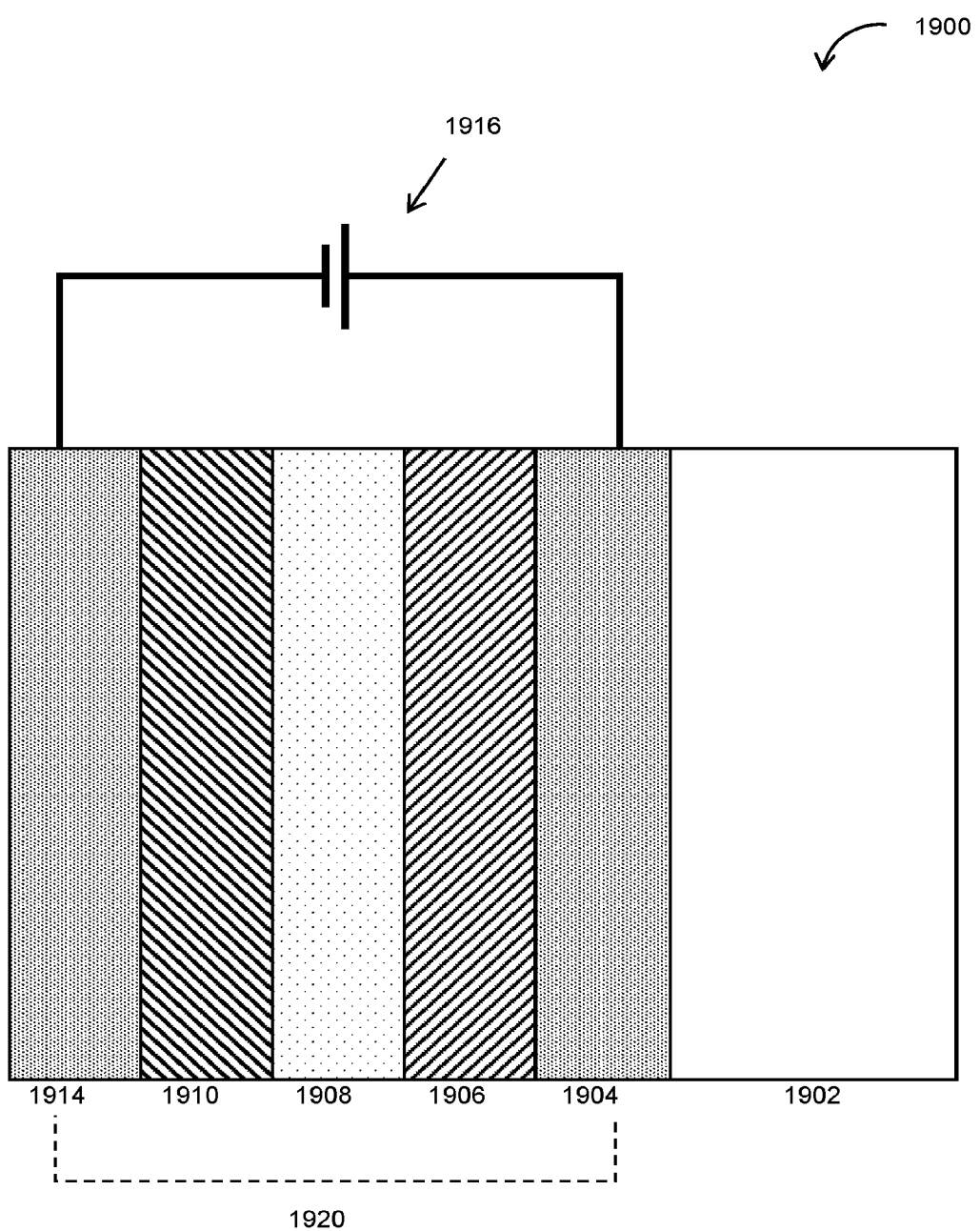
FIG. 19 schematically shows an electrochromic device.

FIG. 19 shows an example of a schematic cross-section of an electrochromic device 1900 in accordance with some embodiments. The EC device coating is attached to a substrate 1902, a transparent conductive layer (TCL) 1904, an electrochromic layer (EC) 1906 (sometimes also referred to as a cathodically coloring layer or a cathodically tinting layer), an ion conducting layer or region (IC) 1908, a counter electrode layer (CE) 1910 (sometimes also referred to as an anodically coloring layer or anodically tinting layer), and a second TCL 1914. Elements 1904, 1906, 1908, 1910, and 1914 are collectively referred to as an electrochromic stack 1920. A voltage source 1916 operable to apply an electric potential across the electrochromic stack 1920 effects the transition of the electrochromic coating from, e.g., a clear state to a tinted state. In other embodiments, the order of layers is reversed with respect to the substrate. That is, the layers are in the following order: substrate, TCL, counter electrode layer, ion conducting layer, electrochromic material layer, TCL. In various embodiments, the ion conductor region (e.g., 1908) may form from a portion of the EC layer (e.g., 1906) and/or from a portion of the CE layer (e.g., 1910). In such embodiments, the electrochromic stack (e.g., 1920) may be deposited to include cathodically coloring electrochromic material (the EC layer) in direct physical contact with an anodically coloring counter electrode material (the CE layer). The ion conductor region (sometimes referred to as an interfacial region, or as an ion conducting substantially electronically insulating layer or region) may form where the EC layer and the CE layer meet, for example through heating and/or other processing steps. Examples of electrochromic devices (e.g., including those fabricated without depositing a distinct ion conductor material) can be found in U.S. patent application Ser. No. 13/462,725 filed May 2, 2012, titled "ELECTROCHROMIC DEVICES," now U.S. Pat. No. 9,261,751 issued Feb. 16, 2016, that is incorporated herein by reference in its entirety. In some embodiments, an EC device coating may include one or more additional layers such as one or more passive layers. Passive layers can be used to improve certain optical properties, to provide moisture, and/or to provide scratch resistance. These and/or other passive layers can serve to hermetically seal the EC stack 1920. Various layers, including transparent conducting layers (such as 1904 and 1914), can be treated with anti-reflective and/or protective layers (e.g., oxide and/or nitride layers).

In certain embodiments, the electrochromic device is configured to (e.g., substantially) reversibly cycle between a clear state and a tinted state. Reversible may be within an expected lifetime of the ECD. The expected lifetime can be at least about 5, 10, 16, 25, 50, 75, or 100 years. The expected lifetime can be any value between the aforementioned values (e.g., from about 5 years to about 100 years, from about 5 years to about 50 years, or from about 50 years to about 100 years). A potential can be applied to the electrochromic stack (e.g., 1920) such that available ions in the stack that can cause the electrochromic material (e.g., 1906) to be in the tinted state reside primarily in the counter electrode (e.g., 1910) when the window is in a first tint state (e.g., clear). When the potential applied to the electrochromic stack is reversed, the ions can be transported across the ion conducting layer (e.g., 1908) to the electrochromic material and cause the material to enter the second tint state (e.g., tinted state).

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, and/or transparent-opaque. In some embodiments, the terms "clear" and "bleached" refer to an optically neutral state, e.g., un-tinted, transparent and/or translucent. In some embodiments, the "color" or "tint" of an electrochromic transition is not limited to any wavelength or range of wavelengths. The choice of appropriate electrochromic material and counter electrode materials may govern the relevant optical transition (e.g., from tinted to un-tinted state).

In certain embodiments, at least a portion (e.g., all of) the materials making up electrochromic stack are inorganic, solid (i.e., in the solid state), or both inorganic and solid. Because various organic materials tend to degrade over time, particularly when exposed to heat and UV light as tinted building windows are, inorganic materials offer an advantage of a reliable electrochromic stack that can function for extended periods of time. In some embodiments, materials in the solid state can offer the advantage of being minimally contaminated and minimizing leakage issues, as materials in the liquid state sometimes do. One or more of the layers in the stack may contain some amount of organic material (e.g., that is measurable). The ECD or any portion thereof (e.g., one or more of the layers) may contain little or no measurable organic matter. The ECD or any portion thereof (e.g., one or more of the layers) may contain one or more liquids that may be present in little amounts. Little may be of at most about 100 ppm, 10 ppm, or 1 ppm of the ECD. Solid state material may be deposited (or otherwise formed) using one or more processes employing liquid components, such as certain processes employing sol-gels, physical vapor deposition, and/or chemical vapor deposition.

In some embodiments, an "IGU" includes two (or more) substantially transparent substrates. For example, the IGU may include two panes of glass. At least one substrate of the IGU can include an electrochromic device disposed thereon. The one or more panes of the IGU may have a separator disposed between them. An IGU can be a hermetically sealed construct, e.g., having an interior region that is isolated from the ambient environment. A "window assembly" may include an IGU. A "window assembly" may include a (e.g., stand-alone) laminate. A "window assembly" may include one or more electrical leads, e.g., for connecting the IGUs and/or laminates. The electrical leads may operatively couple (e.g., connect) one or more electrochromic devices to a voltage source, switches and the like, and may include a frame that supports the IGU or laminate. A window assembly may include a window controller, and/or components of a window controller (e.g., a dock).

Figure 20A:
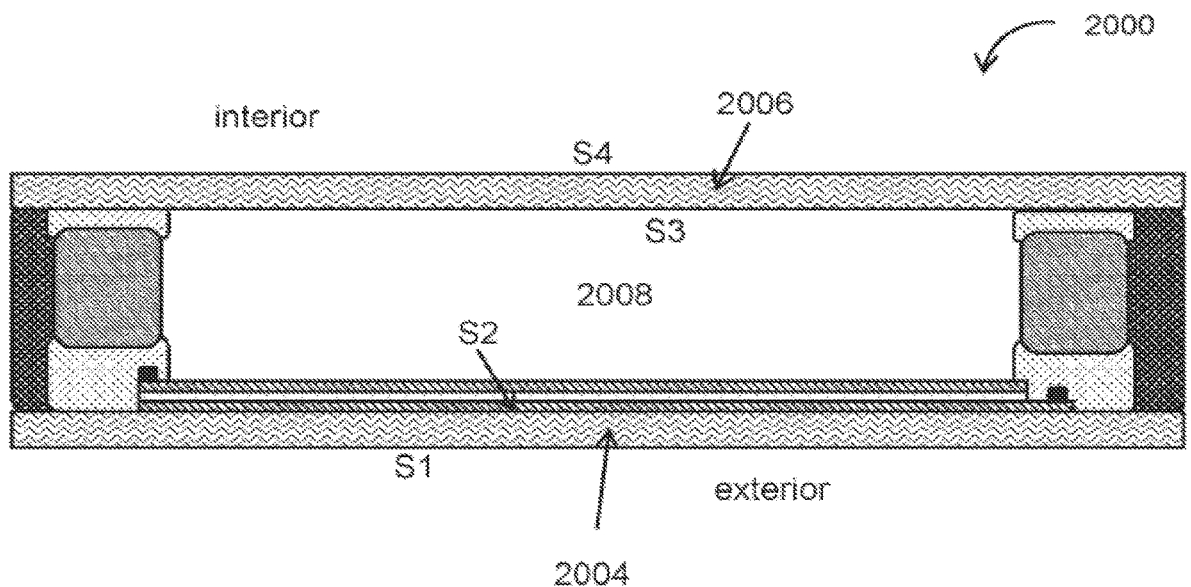
FIGS. 20A and 20B show example implementations of an Integrated Glass Unit (IGU).
Figure 20B:
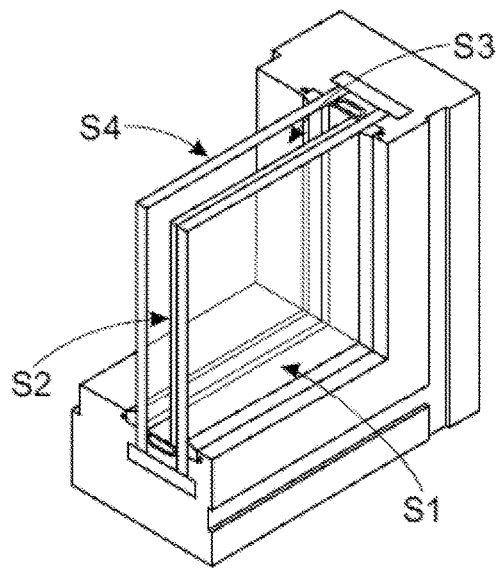

FIGS. 20A and 20B show example implementations of an IGU 2000 that includes a first pane 2004 having a first surface S1 and a second surface S2. In some implementations, the first surface S1 of the first pane 2004 faces an exterior environment, such as an outdoors or outside environment. The IGU 2000 also includes a second pane 2006 having a first surface S3 and a second surface S4. In some implementations, the second surface (e.g., S4) of the second pane (e.g., 2006) faces an interior environment, such as an inside environment of a home, building, vehicle, or compartment thereof (e.g., an enclosure therein such as a room). In some implementations, the first and the second panes (e.g., 2004 and 2006) are transparent or translucent, e.g., at least to light in the visible spectrum. For example, each of the panes (e.g., 2004 and 2006) can be formed of a glass material. The glass material may include any glass material disclosed herein.

The methods, systems and/or the apparatus described herein may comprise a control system. The control system can be in communication with any of the apparatuses (e.g., sensors) described herein. The sensors may be of the same type or of different types, e.g., as described herein. For example, the control system may be in communication with the first sensor and/or with the second sensor. The control system may control the one or more sensors. The control system may control one or more components of a building management system (e.g., lightening, security, and/or air conditioning system). The controller may regulate at least one (e.g., environmental) characteristic of the enclosure. The control system may regulate the enclosure environment using any component of the building management system. For example, the control system may regulate the energy supplied by a heating element and/or by a cooling element. For example, the control system may regulate velocity of an air flowing through a vent to and/or from the enclosure. The control system may comprise a processor. The processor may be a processing unit. The controller may comprise a processing unit. The processing unit may be central. The processing unit may comprise a central processing unit (abbreviated herein as "CPU"). The processing unit may be a graphic processing unit (abbreviated herein as "GPU"). The controller(s) or control mechanisms (e.g., comprising a computer system) may be programmed to implement one or more methods of the disclosure. The processor may be programmed to implement methods of the disclosure. The controller may control at least one component of the forming systems and/or apparatuses disclosed herein.

FIG. 3 shows a schematic example of a computer system 300 that is programmed or otherwise configured to one or more operations of any of the methods provided herein. The computer system can control (e.g., direct, monitor, and/or regulate) various features of the methods, apparatuses and systems of the present disclosure, such as, for example, control heating, cooling, lightening, and/or venting of an enclosure, or any combination thereof. The computer system can be part of, or be in communication with, any sensor or sensor ensemble disclosed herein. The computer may be coupled to one or more mechanisms disclosed herein, and/or any parts thereof. For example, the computer may be coupled to one or more sensors, valves, switches, lights, windows (e.g., IGUs), motors, pumps, optical components, or any combination thereof.

The computer system can include a processing unit (e.g., 306) (also "processor," "computer" and "computer processor" used herein). The computer system may include memory or memory location (e.g., 302) (e.g., random-access memory, read-only memory, flash memory), electronic storage unit (e.g., 304) (e.g., hard disk), communication interface (e.g., 303) (e.g., network adapter) for communicating with one or more other systems, and peripheral devices (e.g., 305), such as cache, other memory, data storage and/or electronic display adapters. In the example shown in FIG. 3, the memory 302, storage unit 304, interface 303, and peripheral devices 305 are in communication with the processing unit 306 through a communication bus (solid lines), such as a motherboard. The storage unit can be a data storage unit (or data repository) for storing data. The computer system can be operatively coupled to a computer network ("network") (e.g., 301) with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 302. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 300 can be included in the circuit.

The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 302 or electronic storage unit 304. The machine executable or machine-readable code can be provided in the form of software. During use, the processor 306 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processer adapted to execute the code or can be compiled during runtime. The code can be supplied in a programming language that can be selected to enable the code to execute in a pre-compiled or as-compiled fashion. In some embodiments, the processor comprises a code. The code can be program instructions. The program instructions may cause the at least one processor (e.g., computer) to direct a feed forward and/or feedback control loop. In some embodiments, the program instructions cause the at least one processor to direct a closed loop and/or open loop control scheme. The control may be based at least in part on one or more sensor readings (e.g., sensor data). One controller may direct a plurality of operations. At least two operations may be directed by different controllers. In some embodiments, a different controller may direct at least two of operations (a), (b) and (c). In some embodiments, different controllers may direct at least two of operations (a), (b) and (c). In some embodiments, a non-transitory computer-readable medium cause each a different computer to direct at least two of operations (a), (b) and (c). In some embodiments, different non-transitory computer-readable mediums cause each a different computer to direct at least two of operations (a), (b) and (c). The controller and/or computer readable media may direct any of the apparatuses or components thereof disclosed herein. The controller and/or computer readable media may direct any operations of the methods disclosed herein.

In some embodiments, the at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may include temperature sensor, weight sensor, material (e.g., powder) level sensor, metrology sensor, gas sensor, or humidity sensor. The metrology sensor may comprise measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, or electromagnetic signal. The electromagnetic signal may comprise a visible infrared, ultraviolet, ultrasound, radio wave, or microwave signal. The gas sensor may sense any of the gas delineated herein. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensor, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The one or more sensors may be connected to a control system (e.g., to a processor, to a computer).

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method comprising:
   delivering a message in a network configured for message communication using a publish-subscribe network protocol, wherein delivering the message includes:
   (a) routing the message from a at least one requesting client node to a broker, wherein the message (i) is intended for at least one target client node having a unique object identification (ID) and (ii) comprises a string identification that comprises a topic string and the unique object ID of the at least one target client node, and/or a group ID with which the at least one target client node is associated;
   (b) receiving the message by the broker; and
   (c) using the broker to route the message to the at least one target client node based on the topic string and one or both of the unique object ID and/or the group ID comprised in the string ID of the message.

2. The method of claim 1, wherein the message comprises (i) a routing address and (ii) a message data.

3. The method of claim 1, wherein the at least one target client node and/or the at least one requesting client node is a device or a computer readable media.

4. The method of claim 3, wherein the device comprises a sensor, an emitter, an antenna, or a tintable window.

5. The method of claim 1, wherein the network comprises a building management system.

6. The method of claim 1, wherein the network is disposed in an envelope of a building, an electrical shaft of the building, a communication shaft of the building, an elevator shaft of the building, and/or an electrical room of the building.

7. The method of claim 1, wherein data of the message comprises (i) a message header having a first encryption level, and (ii) a message content that comprises a second encryption level higher than the first encryption level.

8. A non-transitory computer readable medium comprising instructions inscribed thereon which, when executed by one or more processors, cause the one or more processors to execute operations, comprising:
   delivering a message in a network configured for message communication using a publish-subscribe network protocol, wherein delivering the message includes:
   (a) routing the message from a at least one requesting client node to a broker, wherein the message (i) is intended for at least one target client node having a unique object identification (ID) and (ii) comprises a string identification that comprises a topic string and the unique object ID of the at least one target client node, and/or a group ID with which the at least one target client node is associated;
   (b) receiving the message by the broker; and
   (c) using the broker to route the message to the at least one target client node based on the topic string and one or both of the unique object ID and/or the group ID comprised in the string ID of the message.

9. The non-transitory computer medium of claim 8, wherein the message comprises (i) a routing address and (ii) a message data.

10. The non-transitory computer medium of claim 8, wherein the at least one target client node and/or the at least one requesting client node is a device or a computer readable media.

11. The non-transitory computer medium of claim 10, wherein the device comprises a sensor, an emitter, an antenna, or a tintable window.

12. The non-transitory computer medium of claim 8, wherein the network comprises a building management system.

13. The non-transitory computer medium of claim 8, wherein the network is disposed in an envelope of a building, an electrical shaft of the building, a communication shaft of the building, an elevator shaft of the building, and/or an electrical room of the building.

14. The non-transitory computer medium of claim 8, wherein data of the message comprises (i) a message header having a first encryption level, and (ii) a message content that comprises a second encryption level higher than the first encryption level.

* * * * *